(12) United States Patent
Campbell et al.

(10) Patent No.: US 12,355,063 B2
(45) Date of Patent: Jul. 8, 2025

(54) BATTERY WITH SPINEL CATHODE

(71) Applicant: Nano One Materials Corp., Burnaby (CA)

(72) Inventors: Stephen A. Campbell, Burnaby (CA); Perry Juric, Burnaby (CA); Farhang Nesvaderani, Burnaby (CA)

(73) Assignee: Nano One Materials Corp., Burnaby (CA)

( * ) Notice: Subject to any disclaimer, the term of this patent is extended or adjusted under 35 U.S.C. 154(b) by 947 days.

(21) Appl. No.: 17/494,491

(22) Filed: Oct. 5, 2021

(65) Prior Publication Data

US 2022/0045315 A1 Feb. 10, 2022

Related U.S. Application Data

(63) Continuation-in-part of application No. 16/980,696, filed as application No. PCT/CA2019/050460 on Apr. 15, 2019, now Pat. No. 11,811,056, application No. 17/494,491, filed on Oct. 5, 2021 is a continuation-in-part of application No. 16/866,665, filed on May 5, 2020.

(60) Provisional application No. 63/090,980, filed on Oct. 13, 2020, provisional application No. 62/659,159, filed on Apr. 18, 2018, provisional application No. 62/850,777, filed on May 21, 2019.

(51) Int. Cl.
| | |
|---|---|
| *H01M 4/1391* | (2010.01) |
| *C01G 45/1242* | (2025.01) |
| *C01G 53/50* | (2025.01) |
| *H01M 4/36* | (2006.01) |
| *H01M 4/485* | (2010.01) |
| *H01M 4/505* | (2010.01) |
| *H01M 10/0525* | (2010.01) |

(52) U.S. Cl.
CPC ...... *H01M 4/1391* (2013.01); *C01G 45/1242* (2013.01); *C01G 53/50* (2013.01); *H01M 4/366* (2013.01); *H01M 4/485* (2013.01); *H01M 4/505* (2013.01); *H01M 10/0525* (2013.01)

(58) Field of Classification Search
CPC .................................................. C01G 45/1242
See application file for complete search history.

(56) References Cited

U.S. PATENT DOCUMENTS

| | | |
|---|---|---|
| 9,136,534 B2 | 9/2015 | Frianeza-Kullberg |
| 9,159,999 B2 | 10/2015 | Frianeza-Kullberg |
| 9,478,807 B2 | 10/2016 | Yukawa |
| 11,121,370 B2 | 9/2021 | Wong et al. |

(Continued)

FOREIGN PATENT DOCUMENTS

| | | |
|---|---|---|
| WO | WO 2019/200464 | 10/2019 |
| WO | WO 2020/232531 | 11/2020 |

*Primary Examiner* — Peter F Godenschwager
(74) *Attorney, Agent, or Firm* — Joseph T. Guy; Patent Filing Specialist Inc.

(57) ABSTRACT

Provided is an improved method for forming a battery comprising a cathode and electrolyte. The method of forming the cathode comprises forming a first solution comprising a digestible feedstock of a first metal suitable for formation of a cathode oxide precursor and a multi-carboxylic acid. The digestible feedstock is digested to form a first metal salt in solution wherein the first metal salt precipitates as a salt of deprotonated multi-carboxylic acid thereby forming an oxide precursor and a coating metal is added to the oxide precursor. The oxide precursor is heated to form the coated lithium ion cathode material. The electrolyte is void of salts and additives.

95 Claims, 35 Drawing Sheets

(56) References Cited

U.S. PATENT DOCUMENTS

| | | |
|---|---|---|
| 11,316,157 B1 | 4/2022 | Huang |
| 2014/0271413 A1 | 9/2014 | Frianeza-Kullberg |
| 2014/0272568 A1 | 9/2014 | Frianeza-Kullberg |
| 2014/0272580 A1 | 9/2014 | Frianeza-Kullberg |
| 2019/0088943 A1 | 3/2019 | Kato et al. |

2θ (°)

BATTERY WITH SPINEL CATHODE

RELATED APPLICATIONS

This application claims priority to expired U.S. Provisional Appl. No. 63/090,980 filed Oct. 13, 2020 which is incorporated herein by reference. This application is a continuation-in-part of U.S. patent application Ser. No. 16/980,696 filed Sep. 14, 2020 now U.S. Pat. No. 11,811,056 issued Nov. 7, 2023 which, in turn, claims priority to expired U.S. Provisional Application No. 62/659,159 filed Apr. 18, 2018 and is a 371 of PCT/CA2019/050460 filed Apr. 15, 2019 all of which are incorporated herein by reference. This application is also a continuation-in-part of pending U.S. patent application Ser. No. 16/866,665 filed May 5, 2020 which, in turn, claims priority to expired U.S. Provisional Application No. 62/850,777 filed May 21, 2019 both of which are incorporated herein by reference.

BACKGROUND

The present application is related to an improved method of forming fine and ultrafine powders and nanopowders of lithium ion cathodes for batteries and improved batteries formed there with. More specifically, the present invention is related to, but not limited to, lithium ion battery cathodes and a synergistic electrolyte formulation which provides a battery which can withstand many discharge/recharge cycles and therefore provides a long battery life without degradation.

There is an ever-present demand for improvements in batteries. There are two primary applications for batteries with one being stationary applications and the other being mobile applications. With both stationary and mobile applications there is a desire for increased storage capacity, longer battery life, the ability to reach full charge quicker and lower cost. Lithium ion batteries, comprising a lithium metal oxide cathode, are highly advantageous as a suitable battery for most applications and they have found favor across the spectrum of applications. Still, there is a desire for an improvement in, particularly, the storage capability, recharge time, cost and storage stability of lithium ion batteries. The present invention is focused, primarily on lithium ion batteries in a spinel crystalline form or rock-salt crystalline form, on improvements in the manufacturing process thereof and a synergistic electrolyte.

The preparation of lithium ion batteries comprising lithium and transition metal based cathodes in a rock-salt crystalline form are described in U.S. Pat. Nos. 9,136,534; 9,159,999 and 9,478,807 and U.S. Published Pat. Appl. Nos. 2014/0271413; 2014/0272568 and 2014/0272580 each of which are incorporated herein by reference. Cathode materials having a rock-salt crystalline form have general formula:

wherein X is preferably Co or Al and a+b+c=1. When X is cobalt the cathode materials are referred to as NMC's, for convenience, and when X is aluminum the cathode materials are referred to as NCA's, for convenience. In the preparation of the rock-salt crystalline form the transition metals can be precipitated as carbonates by the addition of a stoichiometric equivalent of lithium carbonate to form cathode material precursors. The cathode material precursors are then sintered to form the cathode material.

Cathode materials having the spinel crystalline structure have general formula:

wherein x+y+z=2. In the spinels the lithium stoichiometry is half that of transition metal stoichiometry. Therefore, the carbonate available from lithium carbonate is insufficient to precipitate the transition metals when synthesizing cathode material precursors. The addition of excess carbonate can only be achieved through the introduction of undesirable counterions, such as sodium when sodium carbonate is used, or complicates pH control and may lead to insufficient precipitation, such as when ammonium carbonate is added. A twice stoichiometric excess of lithium carbonate could be used in principle, and removed through decantation of the aqueous supernatant, however this is undesirable due to the sensitivity of cell performance with variation in lithium stoichiometry.

Spinel cathode materials, such as $LiNi_{0.5}Mn_{1.5}O_4$, often suffer from surface degradation caused by liquid-based electrolyte attack. The result of the electrolyte attack is disproportionation of $Mn^{3+}$. In a cell $Mn^{3+}$ can disproportionate to a soluble $Mn^{2+}$ species which can contaminate the graphite anode and lead to rapid cell failure. This effect is enhanced at high temperature and cell failure can be observed in less than 100 cycles at C-rate (1 hr discharge). Spinel cathodes, such as $LiNi_{0.5}Mn_{1.5}O_4$, are also good candidates for use with solid-state electrolytes; however, due to the difference in $Li^+$ diffusion rates between the cathode and electrolyte, a space-charge is formed at the interface. The space-charge increases Li-transport resistance within the electrolyte/electrode interface which is undesirable.

Without being limited to theory, it is hypothesized that during the formation of high nickel NMC's the particles agglomerate. Since this agglomeration occurs prior to the formation of the lithium niobate coating the agglomerate is coated as illustrated schematically in FIG. 1. In FIG. 1, an agglomerate, 8, of particles, 10, has a coating, 12, formed on the surface of the agglomerate. In the interior regions of the agglomerate particles have uncoated regions at the interstitial interfaces, 14, between particles and at interstitial surfaces, 15, of the particles which are not coated with lithium niobate. If the agglomerate is unperturbed the interior uncoated regions are of no consequence. Unfortunately, during the process of forming a cathode the particles may at least partially de-agglomerate leading to particles with uncoated surface, 11, as illustrated in FIG. 2 wherein the uncoated surface may originate from uncoated interstitial interfaces or interstitial surfaces. Yet another perturbation is believed to be the charging cycle which is hypothesized to also cause some de-agglomeration or, at least, sufficient separation at the particle boundaries to effectively expose uncoated regions of the particles. The uncoated region is believed to be a source of degradation of the high nickel NMCs, particularly, when utilized with a liquid-based electrolyte.

There has been a desire for an improved method of manufacturing lithium ion cathodes and particularly lithium/manganese/nickel based cathodes in a spinel and rock salt crystalline structures. There is a particular desire to provide lithium/manganese/nickel based cathodes in a spinel comprising a surface coating which inhibits degradation, particularly, the degradation which commonly occurs with liquid based electrolytes. The present invention provides such a method.

SUMMARY OF THE INVENTION

It is an object of this invention to provide an improved method of preparing a battery comprising a lithium ion cathode and a synergistic electrolyte.

Another particular feature is the incorporation of a stabilizing coating on the surface of the cathode material wherein the coating inhibits degradation, particularly, the degradation which occurs by liquid-based electrolyte attack.

Another feature of the invention is the synergistic combination of, a preferably spinel, based cathode and an electrolyte for use with the spinel based cathode wherein the cathode and electrolyte are synergistic providing a stability which is unexpected in the art.

An embodiment of the invention is provided in a method of forming a battery comprising:
  forming a coated lithium ion cathode material comprising:
    in one pot;
    forming a first solution comprising a digestible feedstock of a first metal suitable for formation of a cathode oxide precursor and a multi-carboxylic acid;
    digesting the digestible feedstock to form a first metal salt in solution wherein the first metal salt precipitates as a salt of deprotonated multi-carboxylic acid thereby forming an oxide precursor wherein the first metal salt comprises lithium and at least one of Mn, Ni, Co, Al or Fe;
    adding a coating metal precursor salt after digestion; and
    heating said oxide precursor to form lithium ion cathode material with an oxide of coating metal precursor salt as a coating on lithium ion cathode material; and
  providing an anode and an electrolyte; and
  forming the anode and cathode into a battery with the anode and cathode separated by the electrolyte Yet another embodiment is provided in a method of forming a battery comprising:
  forming a coated lithium ion cathode material comprising:
    in one pot;
    reacting lithium carbonate, manganese carbonate and nickel carbonate with oxalic acid, liberating $CO_{2(g)}$ and $H_2O_{(l)}$ to forming a precipitate comprising lithium oxalate, manganese oxalate and nickel oxalate to form an oxide precursor;
    adding a coating metal precursor salt to the oxide precursor; and
    heating the oxide precursor to form the coated lithium ion cathode material; and
  providing an anode and an electrolyte;
  combining the anode and cathode into a battery with the anode and cathode separated by the electrolyte.

Yet another embodiment is provided in an improved lithium ion battery comprising:
  a cathode comprising particles comprising an oxide defined by the formula:

$$LiNi_aMn_bX_cG_dO_2$$

wherein G is an optional dopant;
  X is Co or Al;
  a≥0.5;
  b+c+d≤0.5;
  and d≤0.1; and
  each particle comprises a coating covering a surface of the particle wherein the coating comprises a salt of an oxide of a metal selected from the group consisting of vanadium, tantalum and niobium; and
  an agglomerate comprising the particles wherein the agglomerate comprises interstitial interfaces wherein the interstitial interfaces comprise adjacent coatings on adjacent the particles;
  an anode; and
  an electrolyte.

DESCRIPTION

Figure 1:
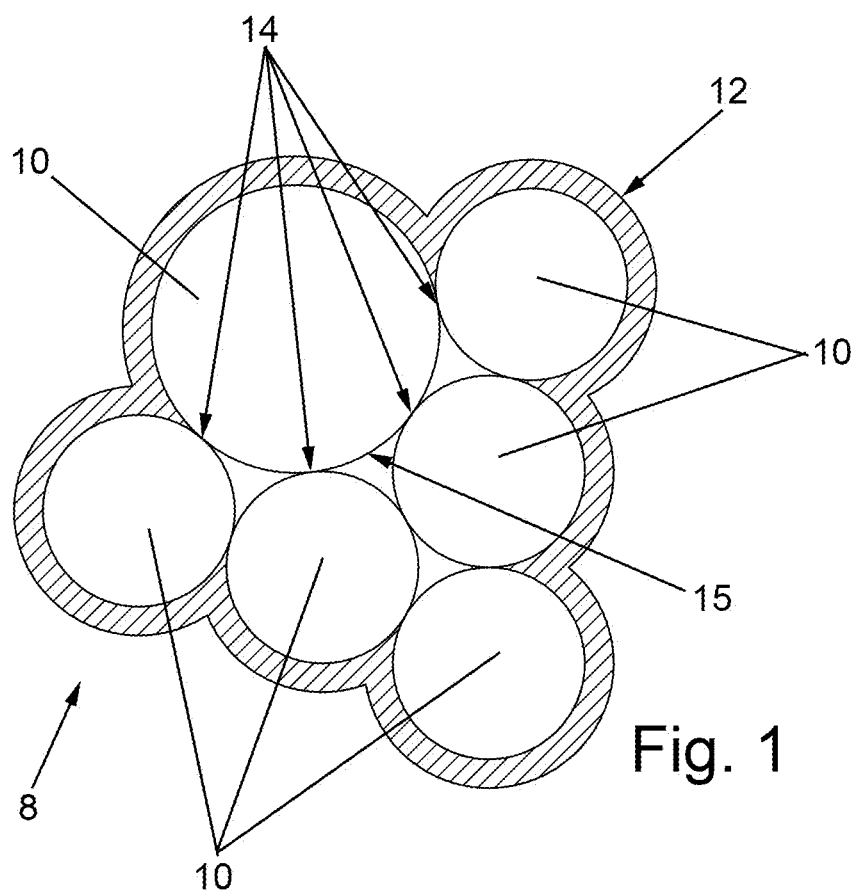
FIG. 1 is a schematic representation.
Figure 2:
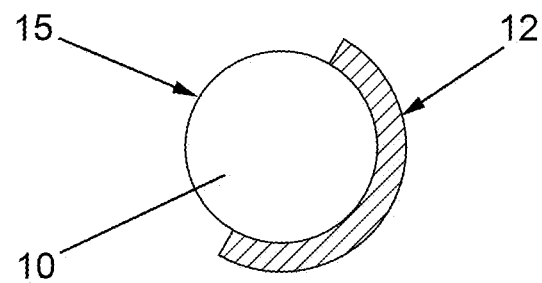
FIG. 2 is a schematic representation of the prior art.

The instant invention is specific to an improved method for preparing a lithium ion battery, and particularly the cathode of a lithium ion battery. More particularly, the present invention is specific to an improved process for forming cathodes for use in a lithium ion battery with a synergistic electrolyte wherein the cathode is in a spinel crystalline form or a rock-salt form with preferred rock salt forms being NMC and NCA materials. Even more specifically, the present invention is specific to the formation of a cathode with a lithium ion battery with a synergistic electrolyte wherein the process forms the cathode comprising a coating which inhibits the formation of space-charge regions at the surface and, more preferably, the coating can be formed in concert with the formation of the cathode material in a common pot.

A particular advantage of the invention is the ability to utilize electrolytes which are void of typical salts and additives typically utilized in electrolytes. Contrary to conventional expectations the typical salts and additives used in electrolytes as stabilizers, and the like, are detrimental to cathodes, particularly spinels, of the instant invention. Particularly preferred electrolytes comprise $LiPF_6$ in a solvent wherein the solvent is preferably an alkyl carbonate selected from ethylene carbonate (EC); dimethyl carbonate (DMC); diethyl carbonate (DEC); ethyl methyl carbonate (EMC); 1,2-dimethoxyethane; 1,3-dioxolane; acetonitrile; ethyl acetate; fluoroethylene carbonate; propylene carbonate and tetrahydrofuran with combinations of ethylene carbonate (EC); dimethyl carbonate (DMC); diethyl carbonate (DEC) and ethyl methyl carbonate (EMC) being most preferred.

The $LiPF_6$ is preferably at least 0.1 M to no more than 10 M. Below about 0.1 M the conductivity is insufficient to function adequately. Above about 10 M solubility becomes a concern and salt can precipitate from the solution. Most preferably the electrolyte comprises about 0.8 to no more than 1.2 M $LiPF_6$ with about 1.0 M being optimum.

The solvent for the electrolyte preferably comprises EC with at least one of DMC, DEC or EMC as a co-solvent. It is preferable that the solvent comprise at least 20 wt % EC to no more than 80 wt % EC with the balance being DMC, DEC, EMC or combinations thereof. More preferably the solvent comprises at least 30 wt % EC to no more than 70 wt % EC with the balance being DMC, DEC, EMC or combinations thereof. Approximately equal wt % of EC and DMC, DEC, EMC or combinations thereof is particularly suitable.

It is preferable that the electrolyte contain no more than 1 wt % of additional salts and additives. More preferably the electrolytes comprise no more than 0.5 wt % of additional salts and additives and preferably no detectable amount of additional salts and additives. Salts and additives preferably avoided include lithium bis (trifluoromethanesulfonyl) imide; lithium hexafluorophosphate; lithium perchlorate; lithium tetrafluoroborate; lithium trifluoromethane sulfonate; tetraethyl-ammonium tetrafluoroborate; biphenyl; propane sultone; vinylene carbonate; methyl ethylene carbonate; lithium bis(oxalate) borate; lithium difluoro oxalate borate; lithium bis(fluorosulfonyl) imide, fluoroethylene carbonate; difluoroethylene carbonate; succinic anhydride and ethylene sulfate.

The particles of the cathode material are coated with a metal oxide of niobium, vanadium or tantalum with lithium niobate ($LiNbO_3$) being most preferred. The coating provides a passivation layer which prevents degradation particularly when using a liquid-based electrolyte such as ethylene carbonate (EC):diethylene carbonate (DEC) 1:1 and decreases the space-charge resistance when using a solid-state electrolyte.

Figure 3:
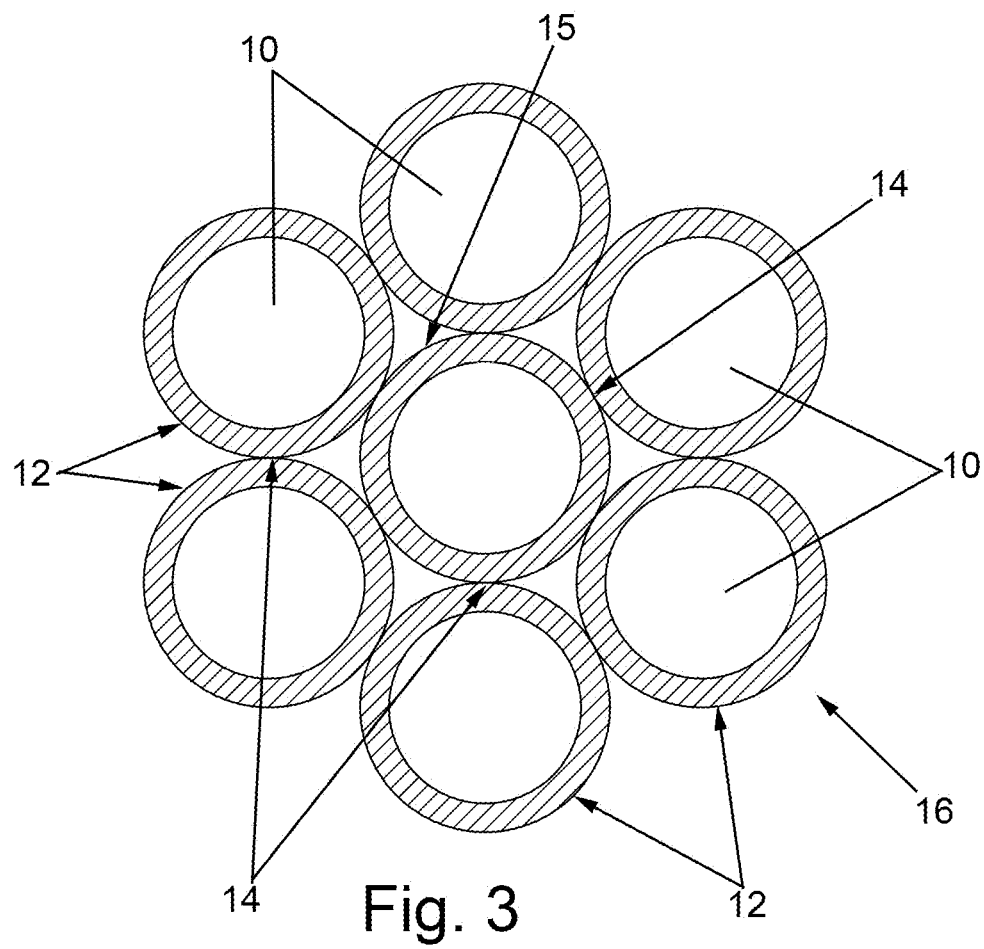
FIG. 3 is a schematic representation.
Figure 4:
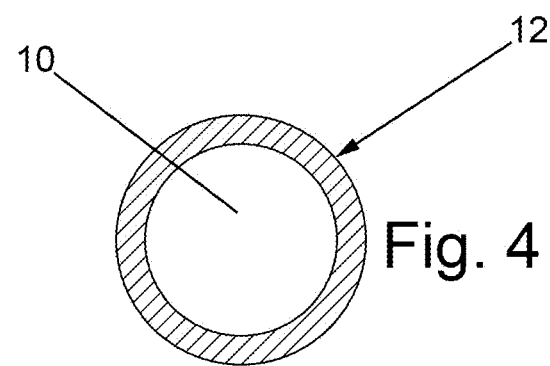
FIG. 4 is a schematic representation of an isolated particle comprising a coating.

An embodiment of the invention will be described with reference to FIG. 3 which forms an integral non-limiting component of the invention. In FIG. 3, an agglomerate, 16, is illustrated schematically in cross-sectional view. The agglomerate comprises particles, 10, wherein the entire surface of the particle is coated with a protective coating, 12. A result of the entire surface being coated is the advantage that the interstitial interfaces, 14, are interfaces comprising coating and the interstitial surfaces, 15, are surfaces comprising coating. If any perturbation disturbs the agglomerate each particle has a completely coated surface as illustrated schematically in FIG. 4 wherein a completely dissociated particle is shown to have a complete surface coating. Complete dissociation of a particle is illustrated in FIG. 4 for the purposes of discussion with the understanding that most of the perturbations expose surfaces of the particles, or in the instant invention the coating on the particles, without necessarily complete dissociation of the particles. For the purposes of illustration and discussion the coatings of adjacent particles are illustrated as distinct and distinguishable. In an actual sample the coatings may form a homogenous layer between adjacent particles without the ability to necessarily distinguish a defined barrier between the coatings of adjacent particles. In other words, the coating may be distinguishable by visual and spectroscopic techniques as being distinct coatings or the coatings may appear as a continuum of coating material.

For the purposes of this disclosure interstitial interfaces of an agglomerate are defined as points of contact of adjacent particles, points of contact of the coating of adjacent particles or points of contact of a particle with the coating of an adjacent particle. For the purposes of this disclosure interstitial surfaces of an agglomerate are defined as a surface of a particle, or the surface of the coating of a particle, which is not in contact with an adjacent particle or the coating of an adjacent particle.

The coating has a preferred thickness of 5 to 10 nanometers over the entirety of the particles.

In a preferred embodiment, the lithium metal compound of the instant invention comprises lithium metal compound in a spinel crystal structure defined by the Formula I:

$$LiNi_xMn_yCo_zE_wO_4 \qquad \text{Formula I}$$

wherein E is an optional dopant; and
x+y+z+w=2 and w≤0.2; or
a rock-salt crystal structure defined by Formula II;

$$LiNi_aMn_bX_cG_dO_2 \qquad \text{Formula II}$$

wherein G is an optional dopant;
X is Co or Al; and
wherein a+b+c+d=1 and d≤0.1.

In a preferred embodiment in the spinel crystal structure of Formula I has 0.5≤x≤0.6; 1.4≤y≤1.5 and z≤0.9. More preferably 0.5≤x≤0.55, 1.45≤y≤1.5 and z≤0.05. In a preferred embodiment neither x nor y is zero. In Formula I it is preferable that the Mn/Ni ratio is no more than 3, preferably at least 2.33 to less than 3 and most preferably at least 2.6 to less than 3.

In a preferred embodiment in the rock-salt crystal structure of Formula II is a high nickel NMC wherein 0.5≤a≤0.9 and more preferably 0.58≤a≤0.62 as represented by NMC 622 or 0.78≤a≤0.82 as represented by NMC 811. In a preferred embodiment a=b=c as represented by NMC 111.

In the formulas throughout the specification, the lithium is defined stoichiometrically to balance charge with the understanding that the lithium is mobile between the anode and cathode. Therefore, at any given time the cathode may be relatively lithium rich or relatively lithium depleted. In a lithium depleted cathode the lithium will be below stoichiometric balance and upon charging the lithium may be above stoichiometric balance. Likewise, in formulations listed throughout the specification the metals are represented in charge balance with the understanding that the metal may be slightly rich or slightly depleted, as determined by elemental analysis, due to the inability to formulate a perfectly balanced stoichiometry in practice. Throughout the specification specifically recited formulations such as those represented by Formula I and Formula II, or specific embodiments thereof, are intended to represent the molar ratio of the metals within 10%. For $LiNi_{0.5}Mn_{0.3}Co_{0.2}O_2$, for example, each metal is stated within 10% of stoichiometry and therefore $Ni_{0.5}$ represents $Ni_{0.45}$ to $Ni_{0.55}$.

Dopants can be added to enhance the properties of the oxide such as electronic conductivity and stability. The dopant is preferably a substitutional dopant added in concert with the primary nickel, manganese and optional cobalt or aluminum. The dopant preferably represents no more than 10 mole % and preferably no more than 5 mole % of the oxide. Preferred dopants include Al, Gd, Ti, Zr, Mg, Ca, Sr, Ba, Mg, Cr, Cu, Fe, Zn, V, Bi, Nb and B with Al and Gd being particularly preferred.

The cathode is formed from an oxide precursor comprising salts of Li, Ni, Mn, Co, Al or Fe as will be more fully described herein. The oxide precursor is calcined to form the cathode material as a lithium metal oxide.

The spinel cathode material, and particularly $LiNi_{0.5}Mn_{1.5}O_4$, is preferably coated with a metal oxide, most preferably lithium niobate ($LiNbO_3$), in the same pot as the spinel formation which is referred to herein as a one-pot synthesis. This process produces a passivation later of $LiNbO_3$ which prevents dissolution of $Mn^{2+}$ when using a liquid-based electrolyte such as ethylene carbonate (EC):diethylene carbonate (DEC) 1:1 and decreasing the space-charge resistance when using a solid-state electrolyte. Through the one-pot synthesis it is hypothesized that niobium prefers to surface segregate rather than being doped within the spinel structure due to the niobium being in the 5+ oxidation state and having a higher molecular weight than the other transition metals.

The oxide precursors are formed by the reaction of salts in the presence of counterions which form relatively insoluble salts. The relatively insoluble salts are believed to form suspended crystals which are believed to Ostwald ripen ultimately precipitating as an ordered lattice. For the purposes of the present invention salts of preferably manganese and nickel, and optionally cobalt or aluminum, combined in a solution comprising counterions which precipitate the manganese, nickel and cobalt or aluminum at a rate sufficient to allow crystalline growth. Soluble counterions of manganese, nickel, cobalt or aluminum are those having a solubility of at least 0.1 g of salt per 100 gram of solvent at 20° C. including acetate, nitrate or hydrogen carbonate. The metals are precipitated as insoluble salts having a solubility of less than 0.05 g of salt per 100 gram of solvent at 20° C. including carbonates and oxalates.

The overall reaction comprises two secondary reactions, in sequence, with the first reaction being the digestion of carbonate feedstock in the presence of an excess of multi-carboxylic acid as represented by Reaction A:

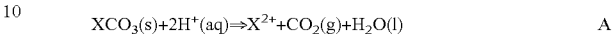

$$XCO_3(s)+2H^+(aq) \Rightarrow X^{2+}+CO_2(g)+H_2O(l) \qquad A$$

wherein X represents a metal suitable for use in a cathode material preferably chosen from $Li_2$, Mn, Ni, Co or Al. In Reaction A the acid is liberated by the multi-carboxylic acid which is not otherwise represented in Reaction A for simplicity. The result of Reaction A is a metal salt in solution wherein the salt is chelated by the deprotonated multi-carboxylic acid as represented by Reaction B:

$$X^{2+}+{}^-OOCR_1COO^- \rightarrow X(OOCR_1COO) \qquad B$$

wherein $R^1$ represents an alkyl chain comprising the multi-carboxylate. The salts represented by $X(OOCR_1COO)$ precipitate in an ordered lattice as discussed elsewhere herein.

The metal carbonates of Reaction A can be substituted with metal acetates such as $Li(O_2CCH_3)$, $Ni(O_2CCH_3)_2$ or $Mn(O_2CCH_3)_2$ which can be added as aqueous solutions or as solid materials.

The pH may be adjusted with ammonium hydroxide, if desired, due to the simplicity and improved ability to accurately control the pH. In the prior art processes the use of ammonium hydroxide caused difficulty due to the propensity for $NH_3$ to complex with nickel in aqueous solution as represented by the reaction:

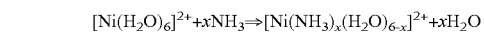

$$[Ni(H_2O)_6]^{2+}+xNH_3 \Rightarrow [Ni(NH_3)_x(H_2O)_{6-x}]^{2+}+xH_2O$$

The result is incomplete precipitation of nickel which complicates determination and control of stoichiometry of the final oxide precursor. Multi-carboxylic acids, and particularly oxalic acid, effectively coordinates nickel preferentially over $NH_{4+}$ thereby increasing the rate of precipitation and incorporation of nickel into the ordered oxide precursor. Preferential precipitation by multi-carboxylic acids drives the reaction towards nickel precipitation and avoids the use of ammonium hydroxide.

A particularly preferred embodiment is represented by the formation of $LiNi_{0.5}Mn_{1.5}O_4$ from the oxide precursor represented by the, preferably aqueous, reaction:

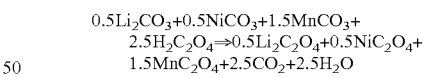

$$0.5Li_2CO_3+0.5NiCO_3+1.5MnCO_3+$$
$$2.5H_2C_2O_4 \Rightarrow 0.5Li_2C_2O_4+0.5NiC_2O_4+$$
$$1.5MnC_2O_4+2.5CO_2+2.5H_2O$$

wherein the, $NiC_2O_4$, and $MnC_2O_4$ precipitate in an ordered lattice as an oxide precursor with $Li_2C_2O_4$ precipitated thereon upon removal of water. The oxide precursor having the gross composition $(Li_2C_2O_4)_{0.5}(NiC_2O_4)_{0.5}(MnC_2O_4)_{1.5}$ is calcined resulting in the reaction:

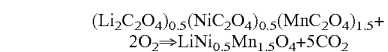

$$(Li_2C_2O_4)_{0.5}(NiC_2O_4)_{0.5}(MnC_2O_4)_{1.5}+$$
$$2O_2 \Rightarrow LiNi_{0.5}Mn_{1.5}O_4+5CO_2$$

The carbonate digestion process in the presence of multi-carboxylic acids includes combining the metal carbonate and oxalic acid into a reactor, preferably in the presence of water, followed by stirring. The slurry is then dried, preferably by spray drying, followed by calcining. The calcination temperature can vary from 400 to 1000° C. to form materials with different structural properties, for example, different degrees of Mn/Ni cation ordering in spinel $LiNi_{0.5}Mn_{1.5}O_4$.

A particular feature of the carbonate digestion process is the fact that there is no need to grind or blend the precursor powders, filter the slurry, or decant the supernatant even though these steps can be done if desired.

The carbonate digestion process or digestion(hydrolysis)-precipitation reaction, using oxalate as an example, can be described by the following equation which occurs preferably in the presence of water:

$$H_2C_2O_{4(aq)} + XCO_{3(s)} \rightarrow CO_{2(g)} + H_2O_{(l)} + XC_2O_{4(s,aq)}$$
(X=transition metals, Li$_2$)

Without being limited to theory, it is hypothesized that the oxalic acid hydrolyses the carbonates to form $CO_{2(g)}$, $H_2O_{(l)}$, and metal ions. Transition metal ions are then precipitated as metal oxalates. Lithium oxalate might be precipitated or remain soluble in water, depending on the water content. The soluble lithium oxalate is expected to be coated on transition metal oxalate particles during spray-drying. There is no need to achieve complete dissolution of metal carbonates or oxalic acid as the water is simply a medium to digest the metal carbonates and precipitate out the metal oxalates in a controlled fashion thereby allowing for nucleation and crystal growth. The rate of the digestion (hydrolysis)-precipitation reaction depends on temperature, water content, pH, gas introduction, the crystal structure and morphology of the feedstocks.

The reaction can be completed in the temperature range of 10-100° C. with water reflux temperature being preferred in one embodiment due to the increased digestion reaction rate.

For each 1 g of oxalic acid the water content can vary from about 1 to about 400 ml with a preference for a decreased water content due to the increased reaction rate and less water must be removed subsequently.

The pH of the solution can vary from 0 to 12. A particular advantage of the carbonate digestion process is that the reaction can be done without additional pH control thereby simplifying the process and eliminating the need for additional process control or additions.

Whereas the reaction can be done under untreated atmospheric air other gases such as $CO_2$, $N_2$, Ar, other inert gases or $O_2$ can be used in some embodiments. In some embodiments $N_2$ and $CO_2$ bubbling into the solution are preferred as they may slightly increase the crystallinity of the precipitated metal oxalates.

The crystallinity and morphology of the precursors, such as amorphous vs. crystalline carbonate feedstocks can influence the rate of digestion due to the differences in solubility and particle size and range of particle size.

The carbonate digestion process proceeds via a cascading equilibrium from solid carbonate feedstocks to solid oxalate precursor materials. The process can be defined by several distinct processes, per the following reactions, for the purposes of discussion without limit thereto:

$$H_2C_2O_{4(s)} \rightarrow H_2C_2O_{4(aq)} \text{ (dissolution of oxalic acid)} \quad (1)$$

$$H_2C_2O_{4(aq)} \leftrightarrow H^+_{(aq)} + HC_2O_4^-_{(aq)} \text{ (oxalic acid dissociation step one, p}K_a=1.25) \quad (2)$$

$$HC_2O_4^-_{(aq)} \leftrightarrow H^+_{(aq)} + C_2O_4^{2-}_{(aq)} \text{ (oxalic acid dissociation step two, p}K_a=4.19) \quad (3)$$

$$XCO_{3(s,\,aq)} + 2H^+_{(aq)} \rightarrow X^{2+} + H_2O_{(l)} + CO_{2(g)} \text{ (carbonate hydrolysis)} \quad (4)$$

$$X^{2+}_{(aq)} + C_2O_4^{2-}_{(aq)} \rightarrow XC_2O_{4(s)} \text{ (precipitation of metal oxalates)} \quad (5)$$

If this reaction were to be used to create the high voltage $LiNi_{0.5}Mn_{1.5}O_4$ material, the following reaction would be take place which would be preferably, but not necessarily, in the presence of $H_2O$:

$$0.25Li_2CO_{3(s)} + 0.25NiCO_{3(s)} + 0.75MnCO_{3(s)} + 1.25H_2C_2O_{4(aq)} \rightarrow 0.25Li_2C_2O_{4(aq)} + Ni_{0.25}Mn_{0.75}C_2O_{4(s)} + 1.25CO_{2(g)} + 1.25H_2O_{(l)} \quad (6)$$

For the purposes of discussion and explanation the reactions are written stepwise with the understanding that under operational reaction conditions the reactions may be occurring simultaneously. By varying different reaction parameters such as water content/ionic strength, excess oxalic acid content, batch size, temperature, atmosphere, refluxing the reaction mixture, pH control, etc. the rates of each step can be controlled and other desirable parameters such as solids content can be optimized.

The carbonate digestion process can be described as proceeding in a cascading equilibrium as the evolution of $CO_{2(g)}$ from solution, as in Reaction 4 above, and precipitation of highly insoluble metal oxalates, as in Reaction 5 above. Both $CO_2$ evolution and precipitation drive the reaction to completion.

Rates of carbonate hydrolysis are correlated to $K_{sp}$ of the metal carbonate with the following provided for convenience:

Lithium carbonate, $Li_2CO_3$, 8.15×10$^{-4}$ Very fast (seconds to minutes);

Nickel(II) carbonate, $NiCO_3$, 1.42×10$^{-7}$ Fast (minutes);

Manganese(II) carbonate, $MnCO_3$, 2.24×10$^{-11}$ Slower (hours to days); and

Aluminum hydroxide ($Al(OH)_3$, 3×10$^{-34}$ Very slow

The homogeneity of co-precipitation could depend on rates of carbonate hydrolysis. For example, if Nickel(II) carbonate is fully hydrolyzed before Manganese(II) carbonate, it may subsequently precipitate as $NiC_2O_4$ and $MnC_2O_4$ separately.

Temperature can be controlled as it influences the rates of dissolution of oxalic acid, carbonate hydrolysis, and precipitation of metal oxalates. Specifically, it would be useful to perform the reaction at water reflux temperature. $CO_{2(g)}$ is produced in this reaction, and raising the temperature will increase the rate of removal of $CO_{2(g)}$, and therefore due to lower aqueous $CO_{2(g)}$ solubility at high temperatures increasing the temperature may increase the rate of carbonate hydrolysis.

Gas bubbling may also be an effective method of controlling the rates of reaction by altering the rate of $CO_2$ evolution. Bubbling of $N_{2(g)}$, $O_{2(g)}$, $CO_{2(g)}$, and/or atmospheric air may be beneficial as the gases may function to displace dissolved $CO_{2(g)}$ or improve mixing of reactants.

The carbonates may digest faster if they are first in the form of the metastable bicarbonate. For example, the following reaction occurs for $Li_2CO_3$:

$$Li_2CO_{3(s)} + CO_{2(g)} + H_2O_{(l)} \leftrightarrow 2LiHCO_{3(aq)}$$

The metastable lithium bicarbonate is far more soluble than $Li_2CO_3$ and the subsequent hydrolysis can proceed stoichiometrically with a single proton as shown below:

$$LiHCO_{3(aq)} + H^+_{(aq)} \rightarrow H_2O_{(l)} + CO_{2(g)} + Li^+_{(aq)}$$

as opposed to proceeding as Reaction 4 above.

Divalent metal oxalates such as $NiC_2O_4$, $MnC_2O_4$, $CoC_2O_4$, $ZnC_2O_4$, etc. are highly insoluble, however monovalent metal oxalates such as $Li_2C_2O_4$ are somewhat soluble with a solubility of 8 g/100 mL at 25° C. in water. If it is necessary to have the lithium oxalate in solution and homogeneously dispersed throughout a mixed metal oxalate precipitate, then keeping the water volume above the solubility limit of lithium oxalate may be advantageous.

The rates of carbonate hydrolysis, metal oxalate precipitation, and the crystal structure and particle size of the metal oxalate precipitate is influenced by pH and water content or ionic strength. In some embodiments it may be beneficial to work at higher ionic strength, or lower water content as this increases the proton activity of oxalic acid, and rates of precipitation of metal oxalates. Water content can be normalized to carbonate feedstock content with a preferred ratio of moles of carbonates to volume of water in L being in the range of about 0.05 to about 20. A water content of about 1.64 L per 1.25 moles of carbonates provides a ratio of moles of carbonates to volume of water in L of 1.79 which is suitable for demonstration of the invention.

A stoichiometric amount of oxalate to carbonate is sufficient to achieve complete precipitation. However, adding excess oxalic acid can increase the reaction rate as the second proton on oxalic acid is much less acidic and is involved in the hydrolysis. About 5% excess oxalic acid by mole to carbonates is sufficient to ensure completion of carbonate hydrolysis. ICP analyses have shown that 10% excess oxalic acid leaves a similar number of Mn/Ni ions in solution as 0% stoichiometric excess by the completion of the reaction. A small stoichiometric excess of oxalic acid should be effective in achieving complete precipitation however a low stoichiometric excess may impact the rate of carbonate hydrolysis.

A particular advantage of the carbonate digestion process is the ability to do the entire reaction in a single reactor until completion. As the lithium source is ideally in solution prior to the spray drying and calcination steps, it may be useful and/or possible to precipitate the transition metals separately and to add the lithium source after co-precipitation as a solution of an aqueous lithium salt such as oxalate.

A coating metal precursor salt, wherein the metal will not incorporate into the lattice, can be added after digestion to eventually form the metal oxide coating. A particularly preferred metal is niobium and a particularly preferred niobium precursor, as the coating metal precursor salt, is a dicarboxylic acid salt with oxalate being most preferred. The preferred niobium oxalate can be formed in-situ from niobium carbonate or niobium oxalate can be prepared separately and added to the cathode metal precursors. It is preferable that the coating comprise predominantly the coating material as a lithium salt, preferably lithium niobate, wherein at least 95 mole percent of the coating is the lithium salt of the coating metal oxide or less than 5 mole percent of the metal ion in the coating is a lithium salt of an active cathode material as defined in Formula I or Formula II. In a particularly preferred embodiment the metal in the coating is at least 95 mole percent lithium niobate.

The invention is suitable for use with transition metal acetates and mixed carbonate feedstocks thereby allowing the solubility of the metal complexes to be more closely matched. Mixed carbonate feedstock such as $Ni_{0.25}Mn_{0.75}CO_3+Li_2CO_3$ to produce a $LiNi_{0.5}Mn_{1.5}O_4$ material are contemplated. Feedstock impurities may be critical to the performance of final materials. In particular, samples of $MnCO_3$ may have small quantities of unknown impurities which are not hydrolyzed during refluxing.

Multi-carboxylic acids comprise at least two carboxyl groups. A particularly preferred multi-carboxylic acid is oxalic acid due, in part, to the minimization of carbon which must be removed during calcining. Other low molecular weight di-carboxylic acids can be used such as malonic acid, succinic acid, glutaric acid and adipic acid. Higher molecular weight di-carboxylic acids can be use, particularly with an even number of carbons which have a higher solubility, however the necessity of removing additional carbons and decreased solubility renders them less desirable. Other acids such as citric, lactic, oxaloacetic, fumaric, maleic and other polycarboxylic acids can be utilized with the proviso they have sufficient solubility to achieve at least a small stoichiometric excess and have sufficient chelating properties. It is preferable that acids with hydroxyl groups not be used due to their increased hygroscopic characteristics.

To accomplish the reaction to form the oxide precursor solutions of the starting salts are prepared. It is preferable to prepare added solutions, preferably comprising the nickel, manganese and cobalt or aluminum solutions either collectively, separately, or in some combination, and a bulk solution preferably comprising the lithium. The added solution is then added, as described elsewhere herein, to the bulk solution. The solutions can be reversed, however, it is preferable that the transition metals be added in the intended stoichiometry and it is therefore advantageous to add as a single solution comprising all transition metals to a lithium containing bulk solution.

Each solution is prepared by dissolving the solid in a selected solvent, preferably a polar solvent, such as water, but not limited thereto. The choice of the solvent is determined by the solubility of the solid reactant in the solvent and the temperature of dissolution. It is preferred to dissolve at ambient temperature and to dissolve at a fast rate so that solubilization is not energy intensive. The dissolution may be carried out at a slightly higher temperature but preferably below 100° C. Other dissolution aids may be addition of an acid or a base.

During mixing it is preferable to bubble gas into the bulk solution. For the purposes of discussion the gas is defined as inert, which has no contribution to the chemical reaction, or the gas is defined as reactive, which either adjust the pH or contributes to the chemical reaction. Preferred gases include air, $CO_2$, $NH_3$, $SF_6$, HF, HCl, $N_2$, helium, argon, methane, ethane, propane or mixtures thereof. A particularly preferred gas includes ambient air unless the reactant solutions are air-sensitive. Carbon dioxide is particularly preferred if a reducing atmosphere is required and it can also be used as a dissolution agent, as a pH adjusting agent or as a reactant if carbonates are formed. Ammonia may also be introduced as a gas for pH adjustment. Ammonia can form ammonia complexes with transition metals and may assist in dissolving such solids. Mixtures of gases may be employed such as 10% $O_2$ in argon as an example.

For the formation of the oxide precursor the pH is preferably at least about 1 to no more than about 9.6 without limit thereto. Ammonia, or ammonium hydroxide, is suitable for increasing pH as is any soluble base with LiOH being particularly preferred for adjustment if necessary. Acids, particularly formic acid, are suitable for decreasing pH if necessary. In one embodiment lithium can be added, such as by addition of lithium acetate to achieve adequate solids content, typically about 20 to 30 wt %, prior to drying.

A particular advantage of the instant invention is the ability to form gradients of transition metal concentration throughout the body of the oxide wherein regions, the center for example, can have one ratio of transition metals and that ratio can vary in either continuous fashion or step-wise fashion through the body of the oxide. Considering NMC for the purposes of discussion and clarification without limit thereto, the concentration of Ni, Mn and Co can change radially from the core towards the surface of a particle. In an exemplary embodiment provided for clarity, the Ni content can be in a gradient thereby allowing a relatively low nickel concentration on or near the surface of the oxide particle and relatively high nickel concentration in the core of the oxide particle. The ratio of Li to transition metals would remain constant, based on neutral stoichiometry, throughout the oxide particle. By way of clarifying example, the overall compositions of Ni:Mn:Co may be 6:2:2 and 8:1:1 for NMC 622 and NMC 811, respectively, with the core being relatively rich in one transition metal and the shell being relative poor in the same transition metal. Even more specifically, the core may be rich in one transition metal, nickel for example, with a radially decreasing ratio in that transition metal relative to the others. An NMC 8:1:1 core, for example may have exterior thereto an NMC 6:2:2 shell with an NMC 1:1:1 shell on the exterior as a non-limiting step-wise example. These reactions can be done in step-wise additions, or in a continuous gradient by altering the pump rates of the transition metals. The ratio of transition metals in each addition and the number of additions can be altered to obtain desired gradient distributions.

A particular feature of the instant invention is the ability to incorporate dopants and other materials either preferentially in the interior of the oxide or towards the surface or even at the surface. With prior art techniques dopants, for example, are homogenously dispersed within the oxide. Furthermore, any surface treatment, such as with aluminum, is on a formed oxide as a surface reactant not necessarily as an atom incorporated into the oxide lattice. The present invention allows dopants to be dispersed systematically at the core, as would be the case if the dopant were incorporated into the initial transition metal slurry, in a radial band, as would be the case if the dopant were incorporated into a subsequent transition metal slurry, or in an outer shell, as would be the case if the dopant were incorporated into the final transition metal slurry.

For the purposes of the instant invention, each radial portion of the oxide particle will be defined based on the percentage of transition metal used to form the portion. By way of example, if the initial slurry has a first ratio of transition metals, and the initial slurry comprises 10 mol % of the total transition metal used to form the oxide, the core will be considered to be 10% of the volume of the oxide and the composition of the core will be defined as having the same ratio as the first ratio of transition metals. Similarly, each shell surrounding the core will be defined by the percentage of transition metal therein. By way of non-limiting example, a precursor to the oxide formed with three slurries, each of equal moles of transition metal, wherein the first slurry had a Ni:Mn:Co ratio of 8:1:1, the second slurry had a Ni:Mn:Co ratio of 6:2:2 and the third slurry had a Ni:Mn:Co ratio of 1:1:1 would be considered to form an oxide representing ⅓ of the volume of the oxide particle being a core with transition metals in the ratio of 8:1:1, a first shell on the core representing ⅓ of the volume of the oxide particle with a transition metal ratio of 6:2:2 and an outer shell on the first shell representing ⅓ of the volume of the oxide particle with a transition metal ratio of 1:1:1 without regards for the migration of transition metals which may occur during sintering of the precursor to the oxide.

In a particularly preferred embodiment, a dopant is incorporated into an outer shell with a particular dopant being aluminum. More preferably, the outer shell comprising the dopant represents less than 10% of the volume of the oxide particle, even more preferably less than 5% of the volume of the oxide particle and most preferably no more than 1% of the volume of the oxide particle. For the purposes of the present invention a dopant is defined as a material precipitated during the formation of the precursor to the oxide in concert with at least one transition metal selected from Ni, Mn, Co, Al and Fe. More preferably, the precursor to the oxide comprises Ni and Mn and optionally either Co or Al. A material added after completion of the precipitation of at least one transition metal is defined herein as a surface treatment with niobium, and particularly lithium niobate, being preferred.

Upon completion of the reaction to form the oxide precursor, the resulting slurry mixture is dried to remove the solvent and to obtain the dried precursor powder. Any type of drying method and equipment can be used including spray dryers, tray dryers, freeze dryers and the like, chosen depending on the final product preferred. The drying temperatures would be defined and limited by the equipment utilized and such drying is preferably at less than 350° C. and more preferably 200-325° C. Drying can be done using an evaporator such that the slurry mixture is placed in a tray and the solvent is released as the temperature is increased. Any evaporator in industrial use can be employed. A particularly preferred method of drying is a spray dryer with a fluidized nozzle or a rotary atomizer. These nozzles are preferably the smallest size diameter suitable for the size of the oxide precursor in the slurry mixture. The drying medium is preferably air due to cost considerations.

The particle sizes of the oxide precursor are of nanosize primary and secondary particles and up to small micron size secondary particles ranging to less than 50 micron aggregates which are very easily crushed to smaller size. It should be known that the composition of the final powder influences the morphology as well. The oxide precursor has a preferred particle size of about 1-5 μm. The resulting mixture is continuously agitated as it is pumped into the spray dryer head if spray dryers, freeze dryers or the like are used. For tray dryers, the liquid evaporates from the surface of the solution.

The dried powders are transferred into the calcining system batch-wise or by means of a conveyor belt. In large scale production, this transfer may be continuous or batch. The calcining system may be a box furnace utilizing ceramic trays or saggers as containers, a rotary calciner, a fluidized bed, which may be co-current or counter-current, a rotary tube furnace and other similar equipment without limit thereto.

The heating rate and cooling rate during calcinations depend on the type of final product desired. Generally, a heating rate of about 5° C. per minute is preferred but the usual industrial heating rates are also applicable.

The final powder obtained after the calcining step is a fine, ultrafine or nanosize powder that may not require additional crushing, grinding or milling as is currently done in conventional processing. Particles are relatively soft and not sintered as in conventional processing.

The final calcined oxide powder is preferably characterized for surface area, particle size by electron microscopy, porosity, chemical analyses of the elements and also the performance tests required by the preferred specialized application.

The spray dried oxide precursor is preferably very fine and nanosize.

A modification of the spray dryer collector such that an outlet valve opens and closes as the spray powder is transferred to the calciner can be implemented. Batchwise, the spray dried powder in the collector can be transferred into trays or saggers and moved into a calciner. A rotary calciner or fluidized bed calciner can be used to demonstrate the invention. The calcination temperature is determined by the composition of the powder and the final phase purity desired. For most oxide type powders, the calcination temperatures range from as low as 400° C. to slightly higher than 1000° C. After calcination, the powders are sieved as these are soft and not sintered. The calcined oxide does not require long milling times nor classifying to obtain narrow particle size distribution.

The $LiM_2O_4$ spinel oxide has a preferred crystallite size of 1-5 μm. The $LiMO_2$ rock salt oxide has a preferred crystallite size of about 50-250 nm and more preferably about 150-200 nm.

A particular advantage of the present invention is the formation of metal chelates of multi-carboxylic acids as opposed to acetates. Acetates function as a combustion fuel during subsequent calcining of the oxide precursor and additional oxygen is required for adequate combustion. Lower molecular weight multi-carboxylic acids, particularly lower molecular weight dicarboxylic acids, and more particularly oxalic acid, decompose at lower temperatures without the introduction of additional oxygen. The oxalates, for example, decompose at about 300° C., without additional oxygen, thereby allowing for more accurate control of the calcining temperature. This may allow for reduced firing temperatures thereby facilitating the formation of disordered $Fd\bar{3}m$ spinel crystalline structures with minimal impurity phase occurring as seen at high temperature This method for forming the oxide precursor is referred to herein as the complexometric precursor formulation (CPF) method which is suitable for large scale industrial production of high performance fine, ultrafine and nanosize powders requiring defined unique chemical and physical properties that are essential to meet performance specifications for specialized applications. The CPF method provides an oxide precursor wherein the metals are precipitated as salts into an ordered lattice. The oxide precursor is then calcined to form the oxide. While not limited to theory, it is hypothesized that the formation of an ordered lattice, as opposed to an amorphous solid, facilitates oxide formation during calcination.

The CPF method provides for the controlled formation of specialized microstructures or nanostructures and a final product with particle size, surface area, porosity, phase purity, chemical purity and other essential characteristics tailored to satisfy performance specifications. Powders produced by the CPF method are obtained with a reduced number of processing steps relative to currently used technology and can utilize presently available industrial equipment.

The CPF method is applicable to any inorganic powder and organometallic powders with electrophilic or nucleophilic ligands. The CPF method can use low cost raw materials as the starting raw materials and if needed, additional purification or separation can be done in-situ. Inert or oxidative atmospheric conditions required for powder synthesis are easily achieved with the equipment for this method. Temperatures for the reactions can be ambient or slightly warm but preferably not more than 100° C.

The CPF method produces fine, ultrafine and nanosize powders of precursor oxides in a simple efficient way by integrating chemical principles of crystallization, solubility, transition complex formation, phase chemistry, acidity and basicity, aqueous chemistry, thermodynamics and surface chemistry.

The time when crystallization begins and, in particular, when the nucleation step begins, is the most crucial stage of formation of nanosize powders. A particular advantage provided by CPF is the ability to prepare the nanosize particles at the onset of this nucleation step. The solute molecules from the starting reactants are dispersed in a given solvent and are in solution. At this instance, clusters are believed to begin forming on the nanometer scale under the right conditions of temperature, supersaturation, and other conditions. The clusters constitute the nuclei wherein the atoms begin to arrange themselves in a defined and periodic manner which later defines the crystal microstructure. Crystal size and shape are macroscopic properties of the crystal resulting from the internal crystal lattice structure.

After the nucleation begins, crystal growth also starts and both nucleation and crystal growth may occur simultaneously as long as supersaturation exists. The rate of nucleation and growth is determined by the existing supersaturation in the solution and either nucleation or growth occurs over the other depending on the supersaturation state. It is critical to define the concentrations of the reactants required accordingly in order to tailor the crystal size and shape. If nucleation dominates over growth, finer crystal size will be obtained. The nucleation step is a very critical step and the conditions of the reactions at this initial step define the crystal obtained. By definition, nucleation is an initial phase change in a small area such as crystal forming from a liquid solution. It is a consequence of rapid local fluctuations on a molecular scale in a homogeneous phase that is in a state of metastable equilibrium. Total nucleation is the sum effect of two categories of nucleation—primary and secondary. In primary nucleation, crystals are formed where no crystals are present as initiators. Secondary nucleation occurs when crystals are present to start the nucleation process. It is this consideration of the significance of the initial nucleation step that forms the basis for the CPF method.

In the CPF method, the reactants are dissolved in a solution preferably at ambient temperature or, if needed, at a slightly elevated temperature but preferably not more than 100° C. Selection of inexpensive raw materials and the proper solvent are important aspects of this invention. The purity of the starting materials are also important since this will affect the purity of the final product which may need specified purity levels required for its performance specifications. As such, low cost starting materials which can be purified during the preparation process without significantly increasing the cost of processing must be taken into consideration.

CPF uses conventional equipment to intimately mix reactants and preferably includes a highly agitated mixture preferably with bubbling of gas, particularly, when reactant gas is advantageous.

It is preferred that the gas be introduced directly into the solution without limit to the method of introduction. The gas can be introduced into the solution within the reactor by having several gas diffusers, such as tubes, located on the side of the reactor, wherein the tubes have holes for the exit of the gas. Another configuration is to have a double wall reactor such that the gas passes through the interior wall of the reactor. The bottom of the reactor can also have entry ports for the gas. The gas can also be introduced through the agitator shaft, creating the bubbles upon exiting. Several other configurations are possible and the descriptions of these arrangements given herein are not limited to these.

In one embodiment an aerator can be used as a gas diffuser. Gas diffusing aerators can be incorporated into the reactor. Ceramic diffusing aerators which are either tube or dome-shaped are particularly suitable for demonstration of the invention. The pore structures of ceramic bubble diffusers can produce relatively fine small bubbles resulting in an extremely high gas to liquid interface per cubic feet per minute (cfm) of gas supplied. A ratio of high gas to liquid interface coupled with an increase in contact time due to the slower rate of the fine bubbles can provide for a higher transfer rates. The porosity of the ceramic is a key factor in the formation of the bubble and significantly contributes to the nucleation process. While not limited thereto for most configurations a gas flow rate of at least one liter of gas per liter of solution per minute is suitable for demonstration of the invention.

A ceramic tube gas diffuser on the sides of the reactor wall is particularly suitable for demonstration of the invention. Several of these tubes may be placed in different positions, preferably equidistant from each other, to more uniformly distribute gas throughout the reactor. The gas is preferably introduced into the diffuser within the reactor through a fitting connected to the header assembly which slightly pressurizes the chamber of the tube. As the gas permeates through the ceramic diffuser body, fine bubbles may start to form by the porous structure of the material and the surface tension of the liquid on the exterior of the ceramic tube. Once the surface tension is overcome, a minute bubble is formed. This small bubble then rises through the liquid forming an interface for transfer between gas and liquid before reaching the surface of the liquid level.

A dome-shaped diffuser can be placed at the bottom of the reactor or on the sides of the reactor. With dome shaped diffusers a plume of gas bubbles is typically created which is constantly rising to the surface from the bottom providing a large reactive surface.

A membrane diffuser which closes when gas flow is not enough to overcome the surface tension is suitable for demonstration of the invention. This is useful to prevent any product powder from being lost into the diffuser.

In order to have higher gas efficiencies and utilization, it is preferred to reduce the gas flow and pressure and expend less pumping energy. A diffuser can be configured such that for the same volume of gas, smaller bubbles are formed with higher surface area than if fewer larger bubbles are formed. The larger surface area means that the gas dissolves faster in the liquid. This is advantageous in solutions wherein the gas is also used to solubilize the reactant by increasing its solubility in the solution.

Nozzles, preferably one way nozzles, can be used to introduce gas into the solution reactor. The gas can be delivered using a pump and the flow rate should be controlled such that the desired bubbles and bubble rates are achieved. A jet nozzle diffuser, preferably on at least one of the sides or bottom of the reactor, is suitable for demonstration of the invention.

The rate of gas introduction is preferably sufficient to increase the volume of the solution by at least 5% excluding the action of the agitator. In most circumstances at least about one liter of gas per liter of solution per minute is sufficient to demonstrate the invention. It is preferable to recycle the gas back into the reactor.

Transfer of the added solution into the bulk solution is preferably done using a tube attached to a pump connecting the solution to be transferred to the reactor. The tube into the reactor is preferably a tube with a single orifice or several orifices of a chosen predetermined internal diameter such that the diameter size can deliver a stream of the added solution at a given rate. Atomizers with fine nozzles are suitable for delivering the added solution into the reactor. The tip of this transfer tube can comprise a showerhead thereby providing several streams of the added solution simultaneously. In large scale production, the rate of transfer is a time factor so the transfer rate should be sufficiently rapid to produce the right size desired.

The agitator can be equipped with several propellers of different configurations, each set comprising one or more propellers placed at an angle to each other or on the same plane. Furthermore, the mixer may have one or more sets of these propellers. The objective is to create sufficient turbulence for adequate solution turnover. Straight paddles or angled paddles are suitable. The dimensions and designs of these paddles determine the type of flow of the solution and the direction of the flow. A speed of at least about 100 rotations per minute (rpm's) is suitable for demonstration of the invention.

The rate of transfer of added solution to the bulk solution has a kinetic effect on the rate of nucleation. A preferred method is to have a fine transfer stream to control the local concentration of the reactants which influences nucleation and the rate of nucleation over the rate of crystal growth. For smaller size powder, a slower transfer rate will yield finer powders. The right conditions of the competing nucleation and growth must be determined by the final powder characteristics desired. The temperature of reaction is preferably ambient or under mild temperatures if needed.

Special nanostructures are preformed which are carried over to the final product thus enhancing the performance of the material in the desired application. For the purposes of the present invention nanostructures are defined as structures having an average size of 100 to 300 nm primary particles.

Neither surfactants nor emulsifiers are necessary. In fact, it is preferable that surfactants and emulsifiers are not used since they may inhibit drying.

Size control can be done by concentration of the solutions, flow rate of the gas or transfer rate of added solution to the bulk solution.

No repetitive and cumbersome milling and classification steps are used.

Reduced calcination time can be achieved and repetitive calcinations are typically not required.

Reaction temperature is ambient. If need for solubilization, temperature is increased but preferably not more than 100° C.

Tailored physical properties of the powder such as surface area, porosity, tap density, and particle size can be carefully controlled by selecting the reaction conditions and the starting materials.

The process is easily scalable for large scale manufacturing using presently available equipment and/or innovations of the present industrial equipment.

EXAMPLES

Electrode Preparations:

The composite electrodes were prepared by mixing the active material with 10 wt % conductive carbon black, as a conductive additive, 5 wt % polyvinylidene fluoride (PVDF), as a binder, dissolved in N-methyl-2-pyrrolidinone (NMP) solvent. The slurry was cast on graphite-coated aluminum foil and dried overnight at 60° C. under vacuum. Electrode disks with an area of 1.54 cm$^2$ were cut form the electrode sheets with a typical loading of 4 mg·cm$^{-2}$.

Coin Cell Assembly:

Coin cells were assembled in an argon-filled glovebox. Lithium foil (340 µm) was used as counter and reference electrodes in half-cells, and commercial $Li_4Ti_5O_{12}$ (LTO) composite electrodes were used as counter and reference electrodes in full-cells. 1 M $LiPF_6$ in 7:3 (vol %) ethylene carbonate (EC):diethylene carbonate (DEC) was used as the electrolyte. The electrodes were separated by one or two 25 μm thick sheets of Celgard® membranes in half-cells, and one sheet of Celgard membrane full-cells.

Cycling Protocol:

The spinel cathode cells were galvanostatically cycled in the voltage range of 3.5 V-4.9 V at various C-rates (1 C rate equivalent to 146 mAg$^{-1}$) at 25° C., using an Arbin Instrument battery tester (model number BT 2000). A constant voltage charging step at 4.9 V for 10 minutes was applied to the cells at the end of 1 C or higher rate galvanostatic charging steps. The rock-salt NMC cells were galvanostatically cycled in the voltage range of 2.7 V-4.35 V at various C-rates (1 C rate equivalent to 200 mAg$^{-1}$) at 25° C. A constant voltage charging step of 4.35 V for 10 minutes was applied to the cells at the end of 1 C or higher rate galvanostatic charging step.

Example 1

Figure 5:
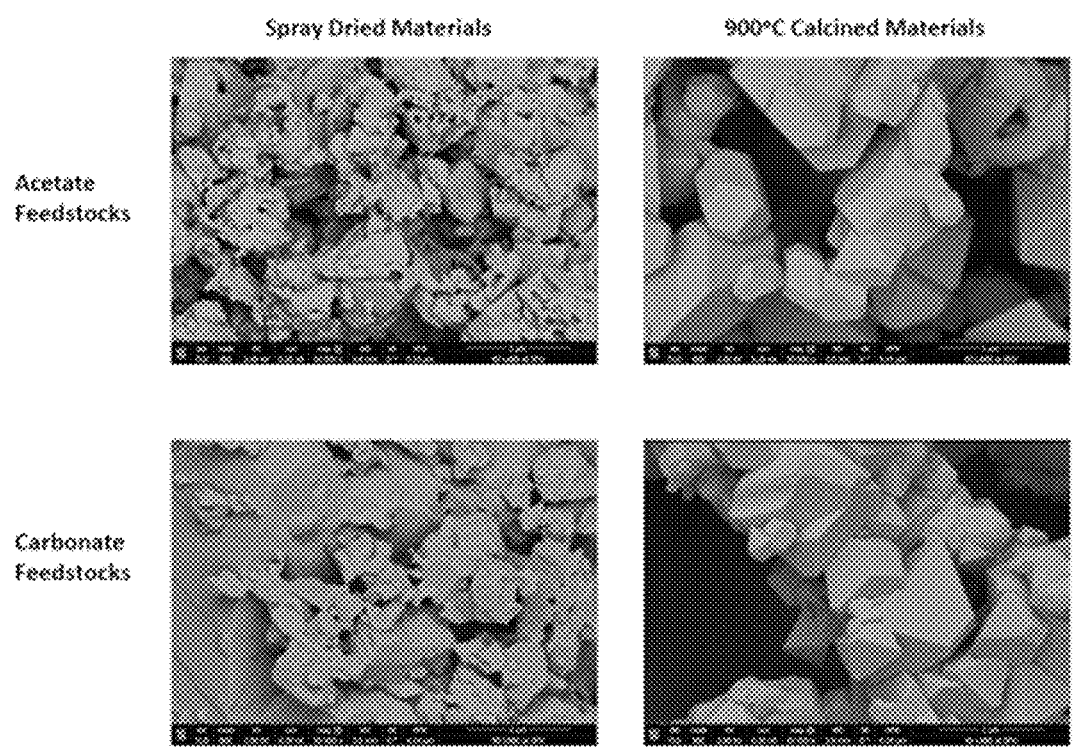
FIG. 5 provides SEM micrographs of oxalate spray dried precursors and $LiNi_{0.5}Mn_{1.5}O_4$ material calcined at 900° C. for 15 hours when using transition metal acetate (top) and carbonate (bottom) feedstocks.

An SEM analysis of spray dried mixed oxalate precursor and calcined material from the production of $LiNi_{0.5}Mn_{1.5}O_4$ cathode material are both crystalline and the use of transition metal acetate and carbonate feedstocks provide a similar material morphology as illustrated in FIG. 5.

Example 2

Figure 6:
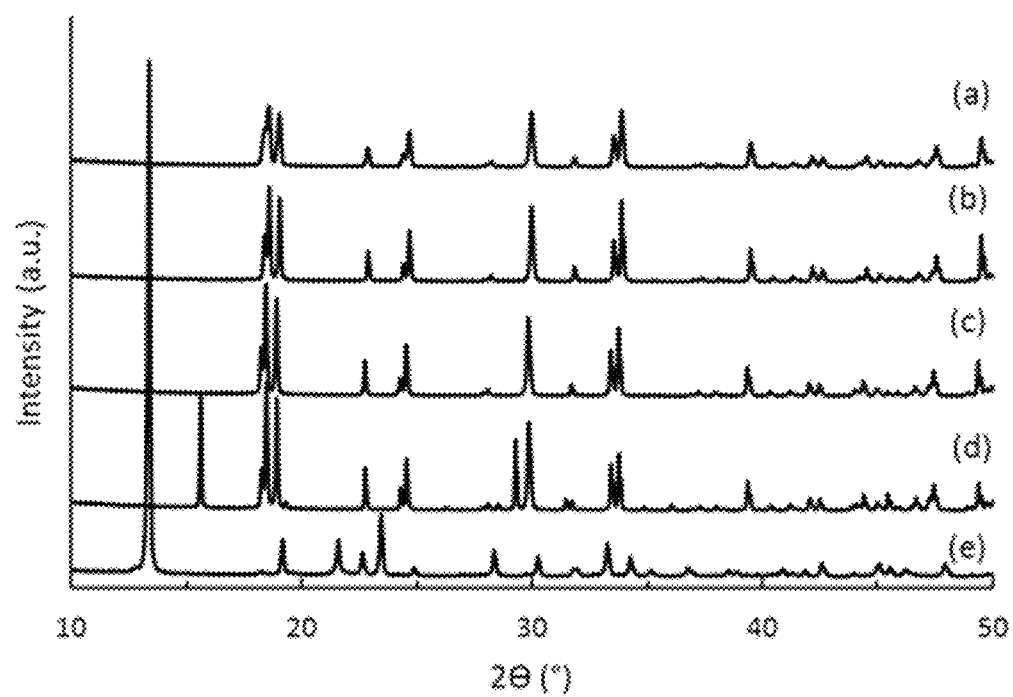
FIG. 6 provides X-ray Diffraction (XRD) patterns of manganese oxalate hydrates precipitated from the reaction of manganese carbonate and oxalic acid in water in different conditions.

FIG. 6 shows the XRD patterns of manganese oxalate hydrates precipitated from the reaction of manganese carbonate and oxalic acid (5% excess by mole) in water for 6 hours (a) at room temperature in air (b) at room temperature with nitrogen bubbling (c) at room temperature with carbon dioxide bubbling (d) at water reflux temperature in air and (e) at room temperature in air with water content of 10 times of those in experiments (a-d). The XRD patterns of the materials precipitated in experiments (a-c) matches with that of manganese oxalate dihydrate with space group C2/c. $N_2$ and $CO_2$ gas bubbling have slightly affected the crystallinity of the material. The reaction at water reflux temperature (b) has produced two different manganese oxalate dihydrate phases; one in C2/c space group and one in $P2_12_12_1$ space group. A decrease in concentration of the reactants to 1/10th of that in experiments (a-d) resulted in formations of catena-Poly[[[diaquamanganese(II)]-μ-oxalato]monohydrate], which has a one-dimensional chain structure with space group Pcca. These experiments demonstrate the significant effect of reaction conditions, such as temperature, concentration, and atmosphere, on the precipitated product of the reaction of manganese carbonate and oxalic acid in water.

Example 3

Figure 7:
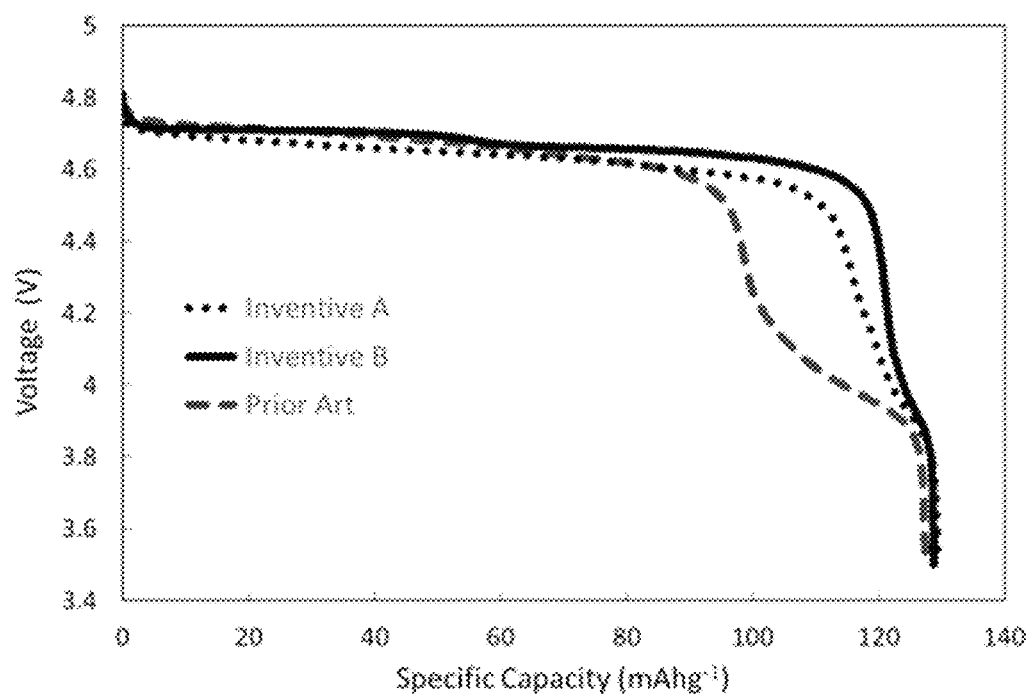
FIG. 7 demonstrates improvements in the specific capacity as a function of voltage for the spinel material formed by the improved process.

A particular problem with $LiNi_{0.5}Mn_{1.5}O_4$ spinels is the phenomenon referred to as the 4V plateau wherein the voltage drops from 4.7 V to 4.0 V at the end of discharge as illustrated in FIG. 7. The plateau is believed to be the result of $Mn^{3+}$ being formed due to oxygen loss during firing in air. In the results with the prior art process illustrated in FIG. 7 an ordered precursor to the oxide was formed as a precipitate comprising nickel carbonate and manganese carbonate, with stoichiometric lithium acetate, the precursor to the oxide was calcined providing a spinel of $LiNi_{0.43}Mn_{1.57}O_4$ wherein the Mn:Ni ratio was 3.70. The charge capacity as a function of voltage was measured resulting in the significant 4 volt plateau illustrated in FIG. 7.

In Inventive A the oxalate salts were formed from transition metal acetates resulting in a significant reduction in the 4-volt plateau as illustrated in FIG. 7. In Inventive A, an ordered precursor to the oxide was formed from lithium carbonate, nickel acetate and manganese acetate with oxalic acid digestion in a process referred to in FIG. 7. The precursor to the oxide was then calcined providing a spinel of $LiNi_{0.48}Mn_{1.52}O_4$ wherein the Mn:Ni ratio was 3.13. The discharge capacity as a function of voltage was measured resulting in a significant reduction of the 4 volt plateau as illustrated in FIG. 7.

In Inventive B metal carbonates are used as the feedstock, with oxalate digestion of the carbonates resulting in the 4-volt plateau being essentially eliminated particularly with the use of a slight excess of nickel wherein the ratio of Mn to Ni is no more than 3, preferably at least 2.33 to less than 3 and most preferably 2.64 to less than 3. An ordered precursor to the oxide was formed from lithium carbonate, nickel carbonate and manganese carbonate with oxalic acid digestion in a process referred to in FIG. 7 as the optimized process. The precursor to the oxide was calcined providing a spinel of $LiNi_{0.51}Mn_{1.49}O_4$ wherein the Mn:Ni ratio was 2.90. The discharge capacity as a function of voltage was measured resulting in almost complete elimination of the 4 volt plateau as illustrated in FIG. 7.

Example 4

Figure 8:
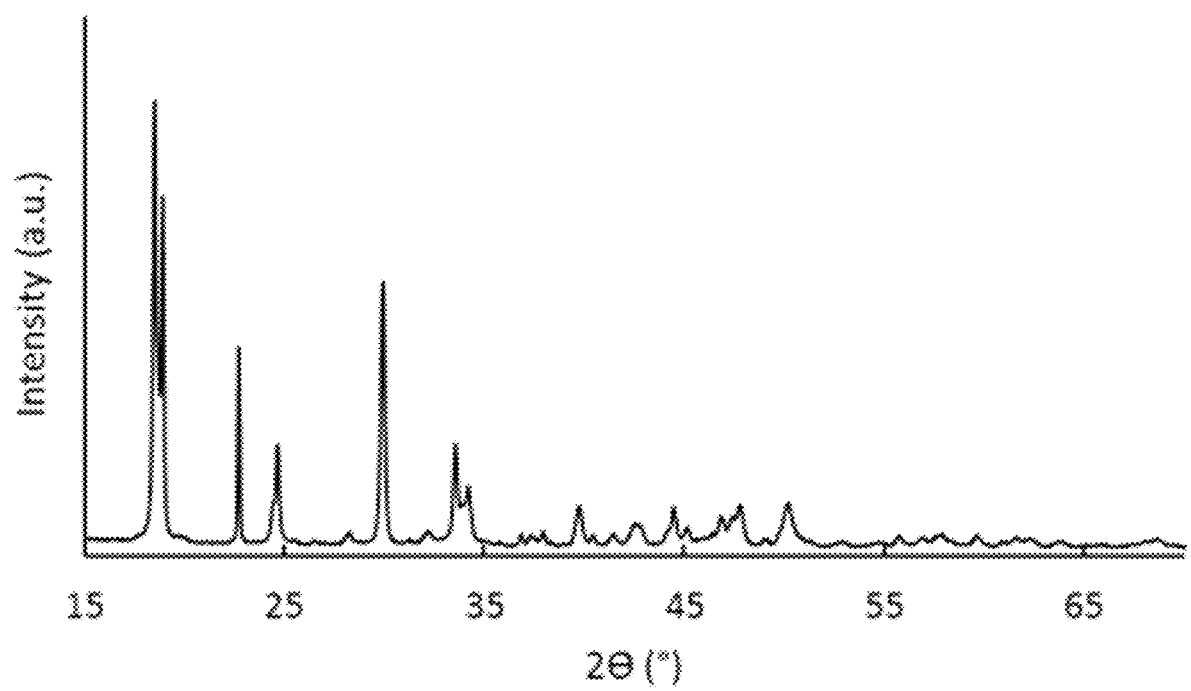
FIG. 8 is an XRD pattern.
Figure 9:
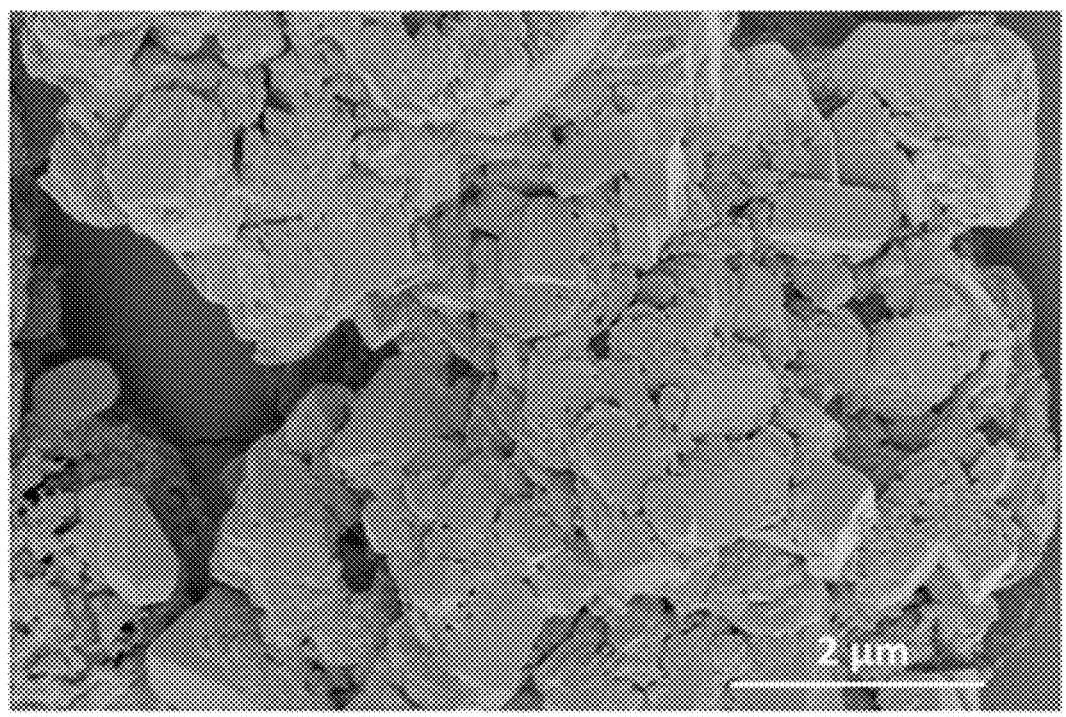
FIG. 9 is an SEM micrograph.

A precursor for a high voltage spinel having a formula of $LiNi_{0.5}Mn_{1.5}O_4$ was synthesized using lithium carbonate, nickel carbonate, manganese carbonate, and oxalic acid. 820.0 g of $H_2C_2O_4 \cdot 2H_2O$ was added to 2.0 L of water in a chemical reactor vessel at temperature of about 40° C. In a second vessel a carbonate mixture slurry was prepared comprising $Li_2CO_3$ (96.1 g), $NiCO_3$ (148.4 g), $MnCO_3$ (431.1 g) in 1.2 L of deionized water. The carbonate mixture slurry was pumped into the chemical reactor vessel at a rate of about 0.2-0.3 L/h. The mixture within the reactor was vigorously mixed at 40° C. in ambient atmosphere to form a slurry. The slurry was dried using a spray drier, producing the high voltage spinel precursor material. The X-ray diffraction (XRD) pattern is provided in FIG. 8 and a scanning electron microscopy (SEM) image of the dried powder is provided in FIG. 9. The XRD diffraction indicates a highly ordered crystalline lattice and the SEM demonstrates nanostructured crystalline material.

Example 5

Figure 10:
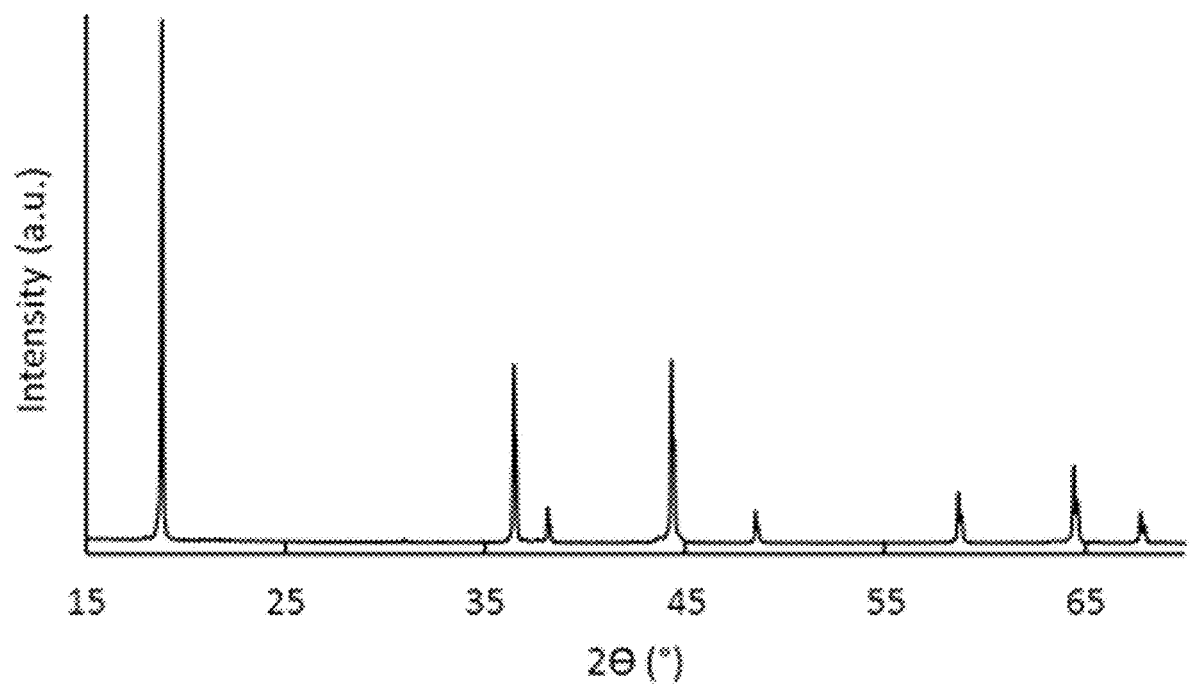
FIG. 10 is an XRD pattern.
Figure 11:
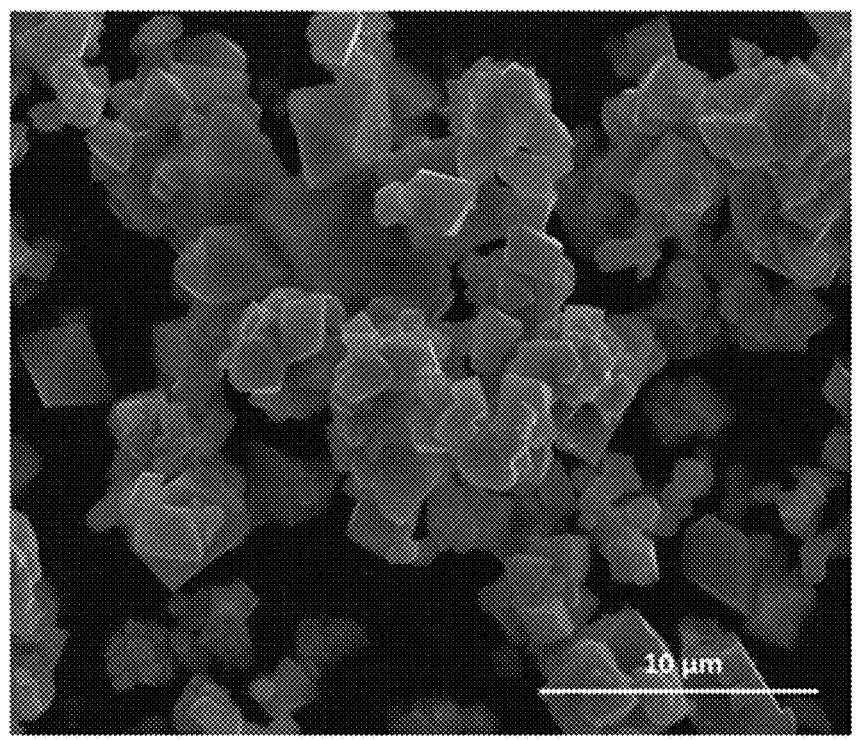
FIG. 11 is SEM micrograph.
Figure 12:
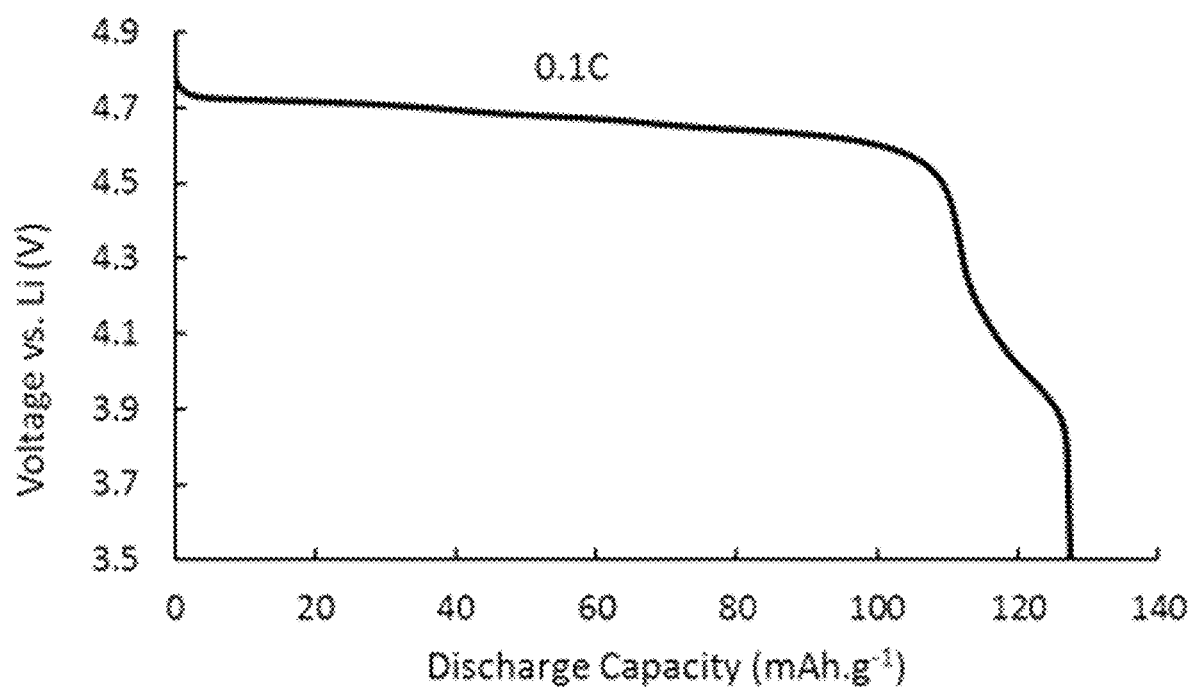
FIG. 12 is a graphical representation.
Figure 13:
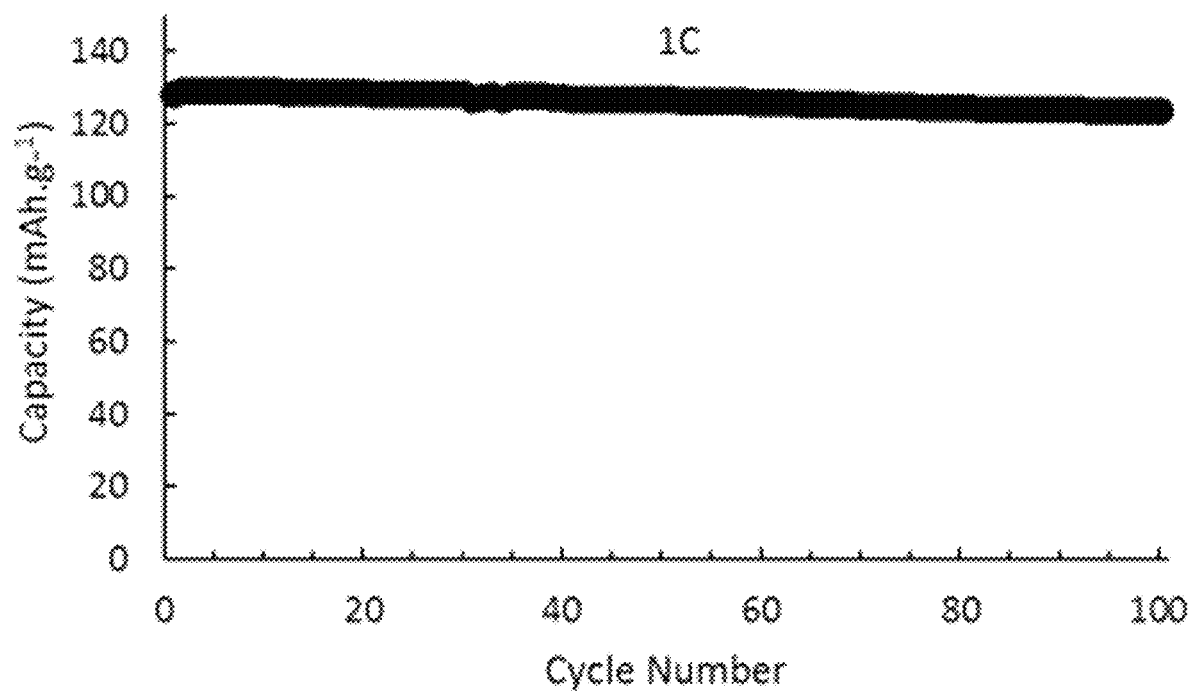
FIG. 13 is a graphical representation.
Figure 14:
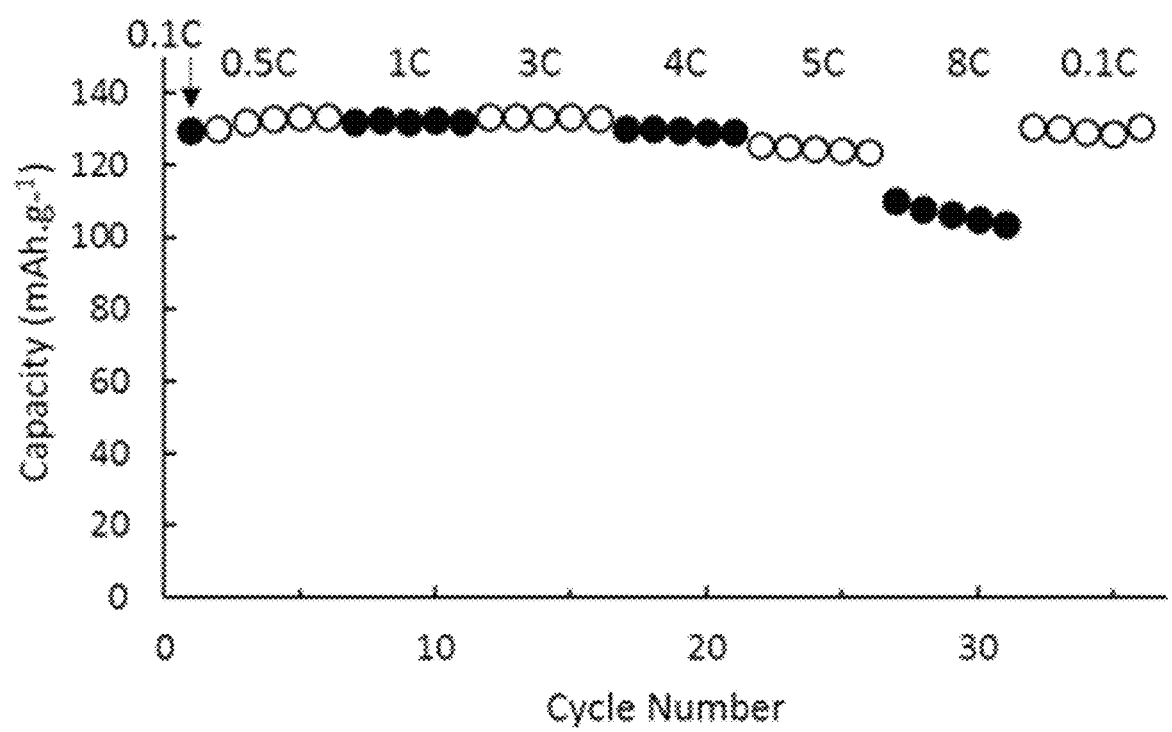
FIG. 14 is a graphical representation.
Figure 15:
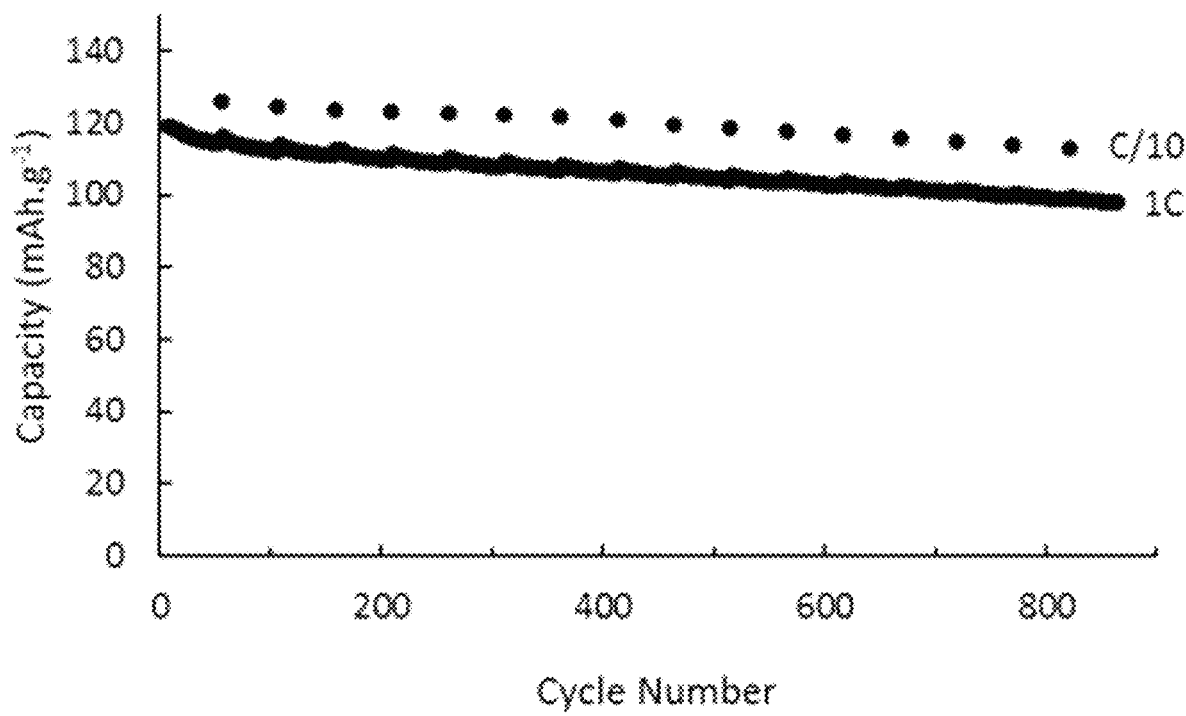
FIG. 15 is a graphical representation.

A high voltage spinel having a formula $LiNi_{0.5}Mn_{1.5}O_4$ was prepared from the precursor of Example 4. The precursor of Example 4 was placed in alumina crucibles and fired in a box furnace in air at 900° C. for 15 h in ambient atmosphere. The resulting powder was analyzed by powder X-ray diffraction analysis resulting in the diffraction pattern provided in FIG. 10. The SEM provided in FIG. 11 illustrates that the nanostructure of the precursor was largely maintained. The lattice parameter of the spinel structure was calculated to be 8.174(1) Å. The electrochemical performance of the synthesized material was evaluated as the cathode in half cells versus lithium metal anodes and in full cells versus $Li_4Ti_5O_{12}$ (LTO) anodes. The voltage as a function of discharge capacity in a half cell at 0.1 C is illustrated in FIG. 12. The specific capacity as a function of cycles at a 1 C rate at 25° C. in a half cell is illustrated in FIG. 13. The specific capacity at various discharge rates at 25° C. in a half cell is illustrated in FIG. 14. The specific capacity at 1 C at 25° C. in a full cell with a LTO anode is illustrated in FIG. 15.

Example 6

Figure 17:
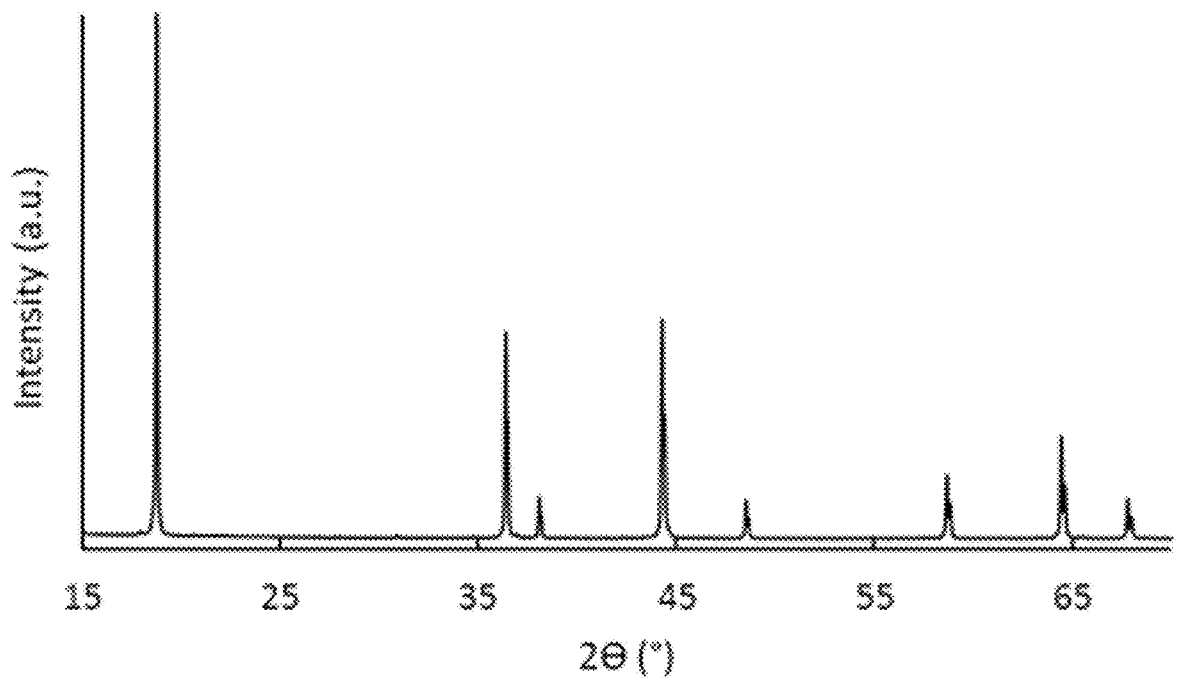
FIG. 17 is an XRD pattern.
Figure 18:
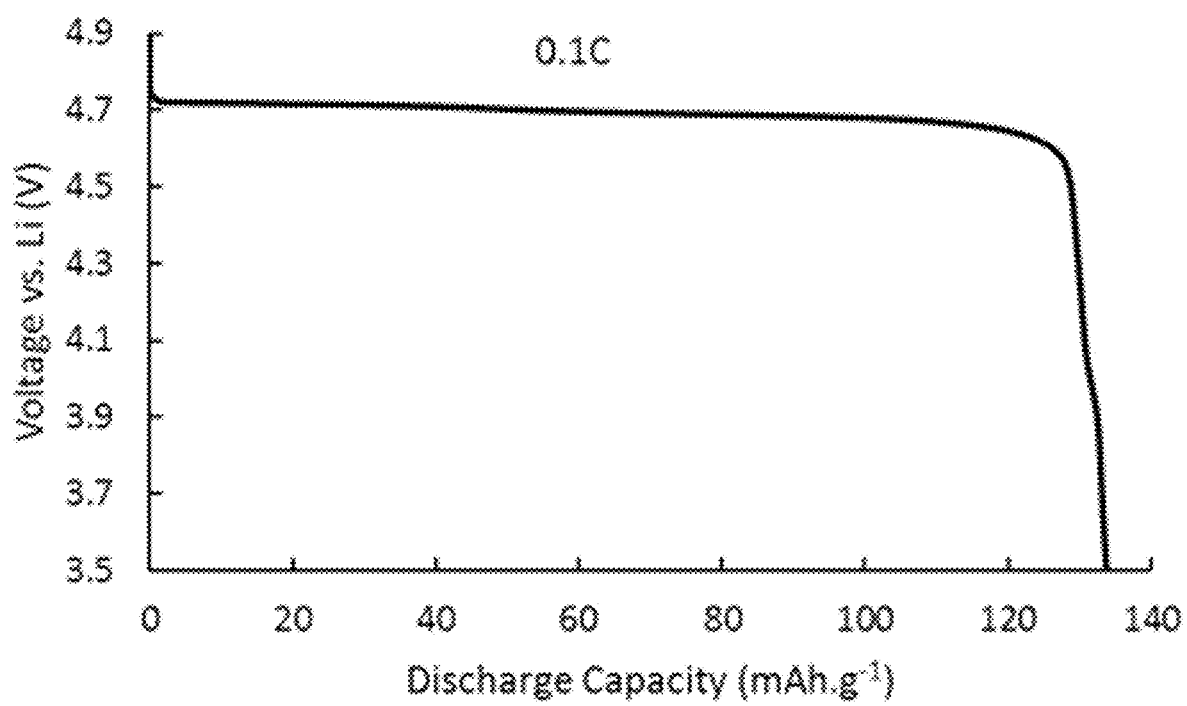
FIG. 18 is a graphical representation.
Figure 19:
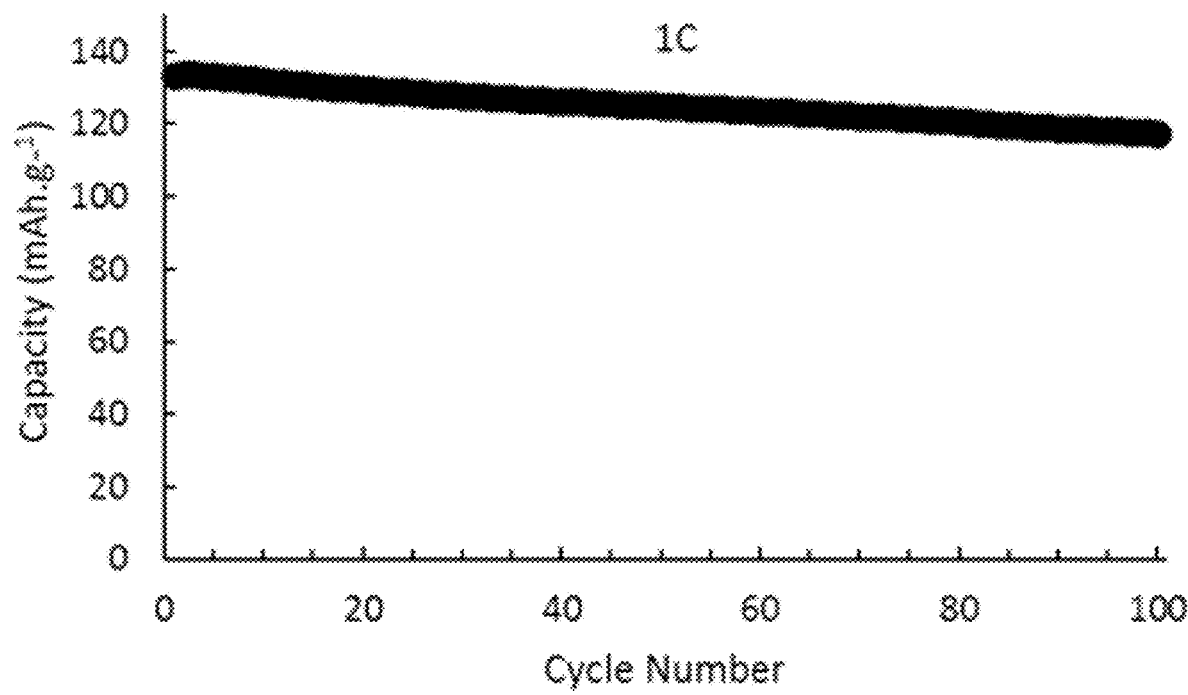
FIG. 19 is a graphical representation.
Figure 20:
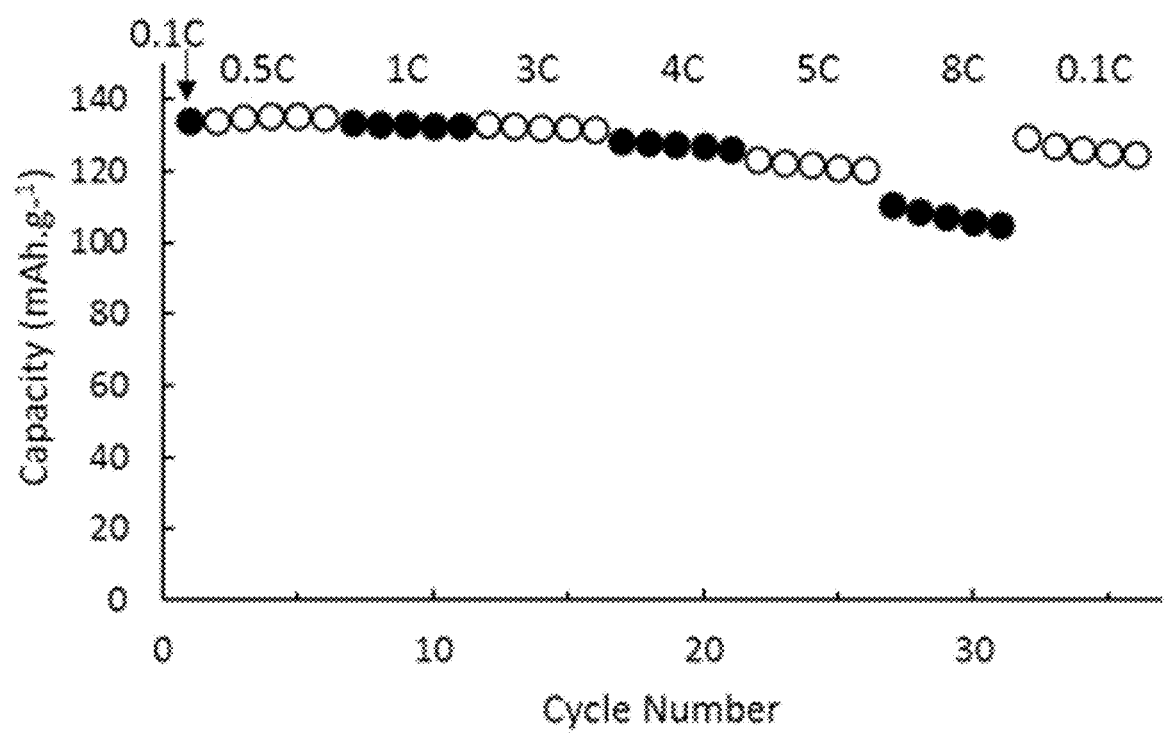
FIG. 20 is a graphical representation.

A high voltage spinel having a formula $LiNi_{0.5}Mn_{1.5}O_4$ was prepared from the precursor of Example 4. The precursor material was placed in alumina boats and fired in a tube furnace under an oxygen flow of 50 cm³/min. The firing procedure, illustrated in FIG. 16, included a pre-firing step at 350° C., firing at 900° C. and slow cooling to and annealing at 650° C. Firing in oxygen in addition to slow cooling mitigates the oxygen deficiency and leads to a reduction in the 4V plateau commonly observed in these materials. The X-ray diffraction of the obtained powder is provided in FIG. 17 and, based thereon, the lattice parameter of the Spinel structure was calculated to be 8.168(1) Å. The electrochemical performance of the synthesized material was evaluated as the cathode in half cells versus lithium metal anodes. The voltage profile obtained at a discharge rate of 0.1 C at 25° C. in a half cell is illustrated in FIG. 18. A particular feature is the absence of a 4V voltage plateau commonly observed in these materials. The specific capacity obtained at a 1 C cycle rate at 25° C. in a half cell is illustrated in FIG. 19. The specific capacity obtained at various discharge rates at 25° C. in a half cell is illustrated in FIG. 20.

Example 7

Figure 16:
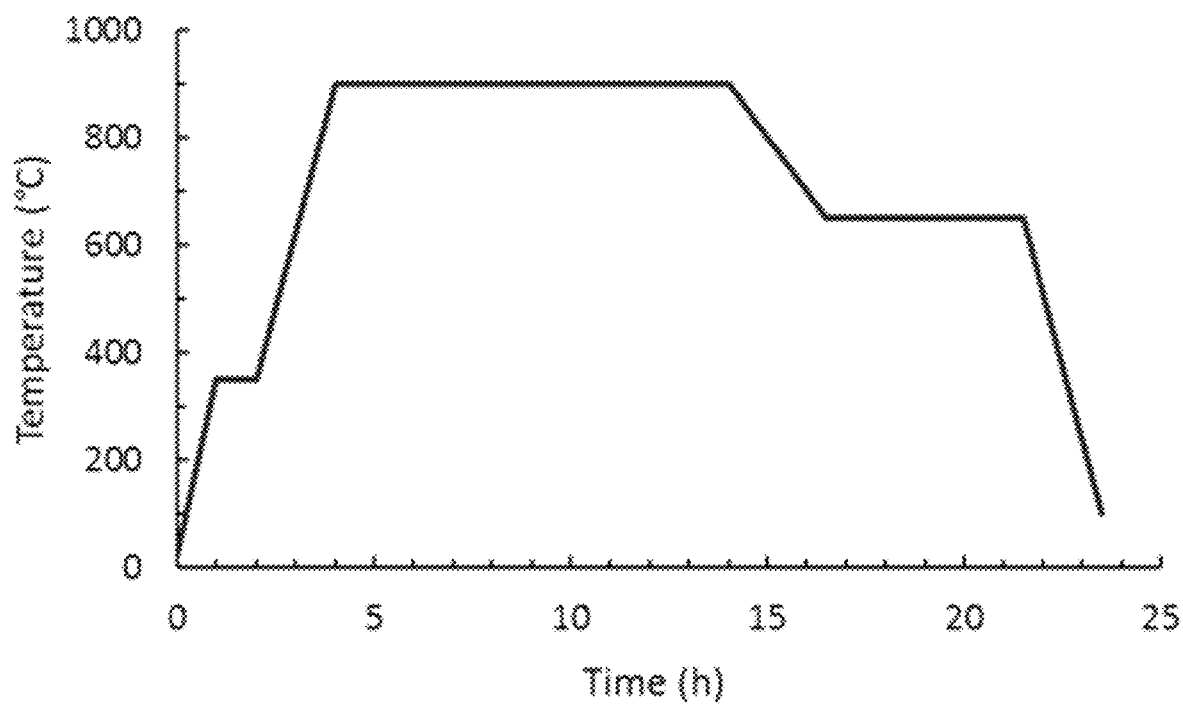
FIG. 16 is a graphical representation.
Figure 21:
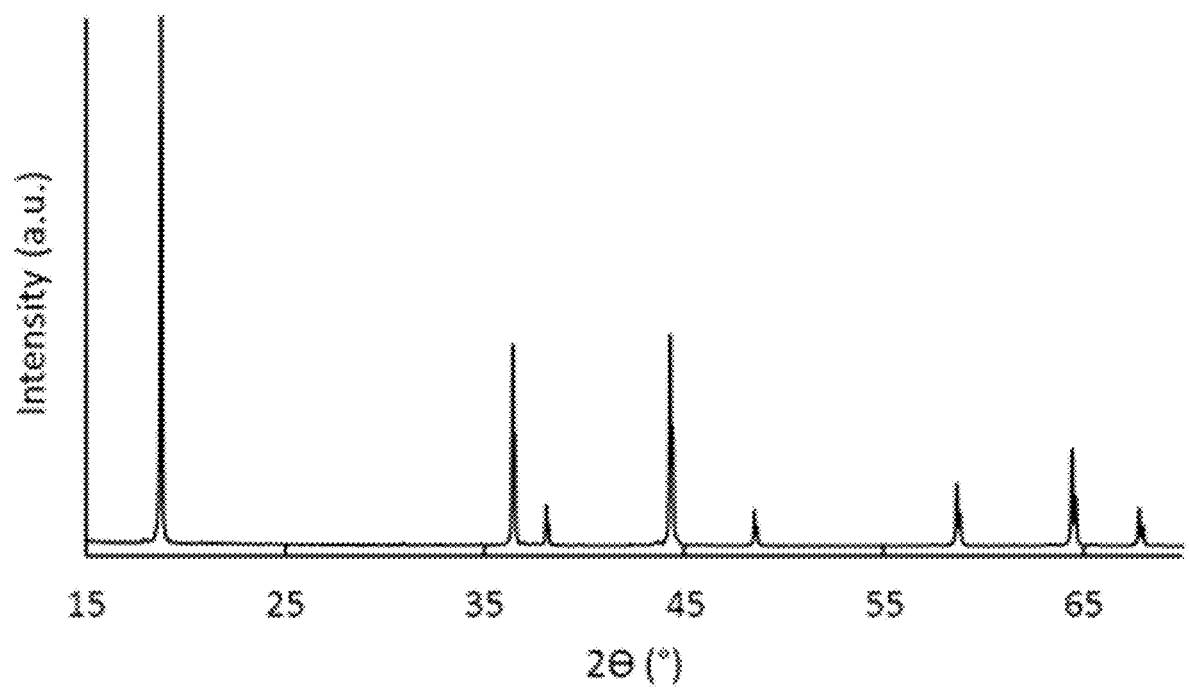
FIG. 21 is an XRD pattern.
Figure 22:
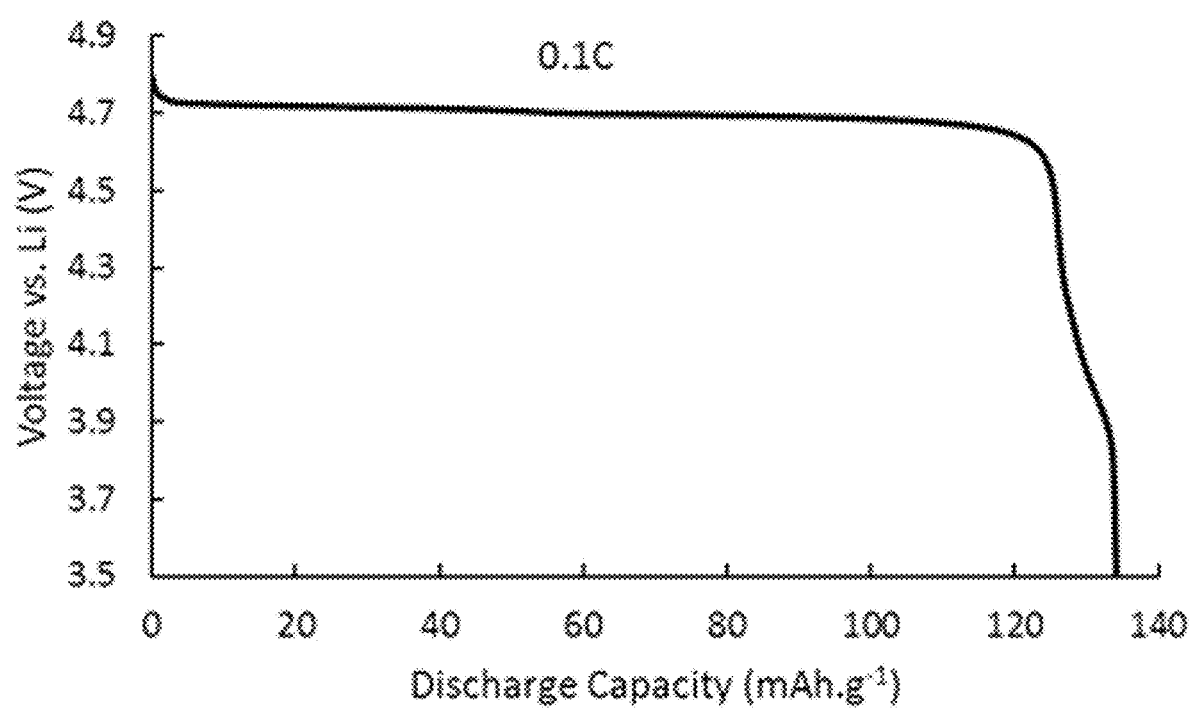
FIG. 22 is a graphical representation.
Figure 23:
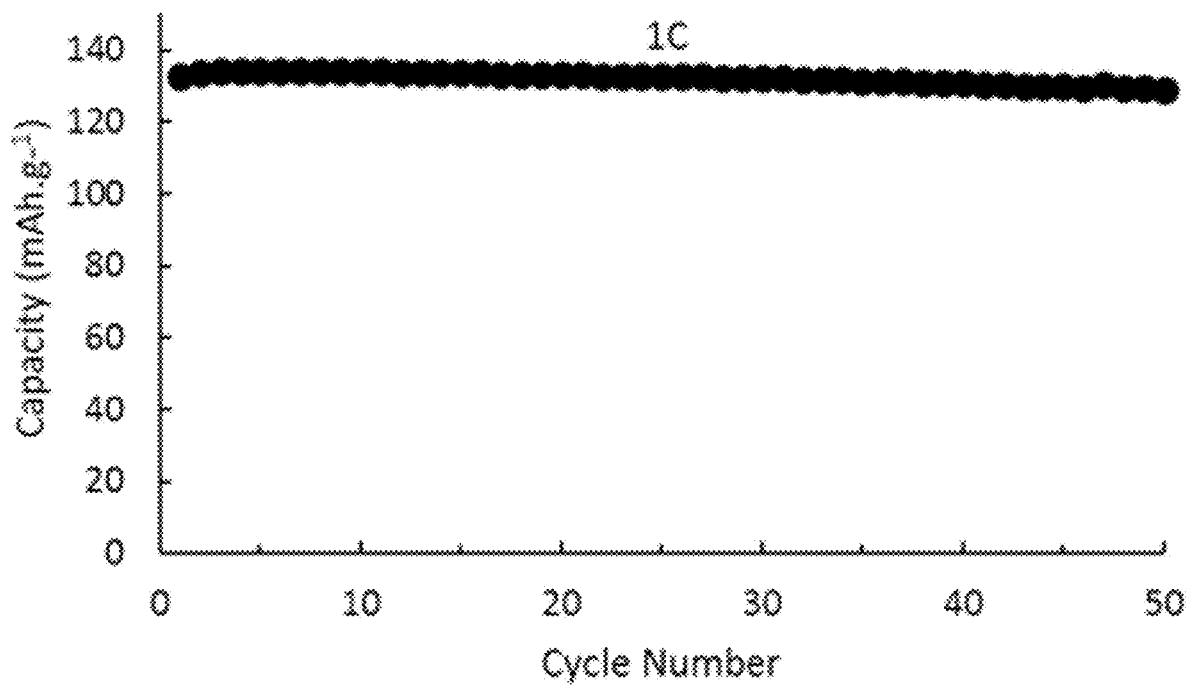
FIG. 23 is a graphical representation.

The precursor material of Example 4 was placed in alumina crucibles and fired in a box furnace in ambient atmosphere using the firing procedure illustrated in FIG. 16. The X-ray diffraction pattern of the resulting powder is provided in FIG. 21 and the lattice parameter of the spinel structure was calculated 8.169(1) Å. The electrochemical performance of the synthesized material was evaluated as the cathode in half cells versus lithium metal anodes. The voltage as a function of discharge capacity at a discharge rate of 0.1 C at 25° C. in a half cell is illustrated in FIG. 22. The specific capacity obtained at a 1 C discharge rate at 25° C. in a half cell is illustrated in FIG. 23.

Example 8

Figure 24:
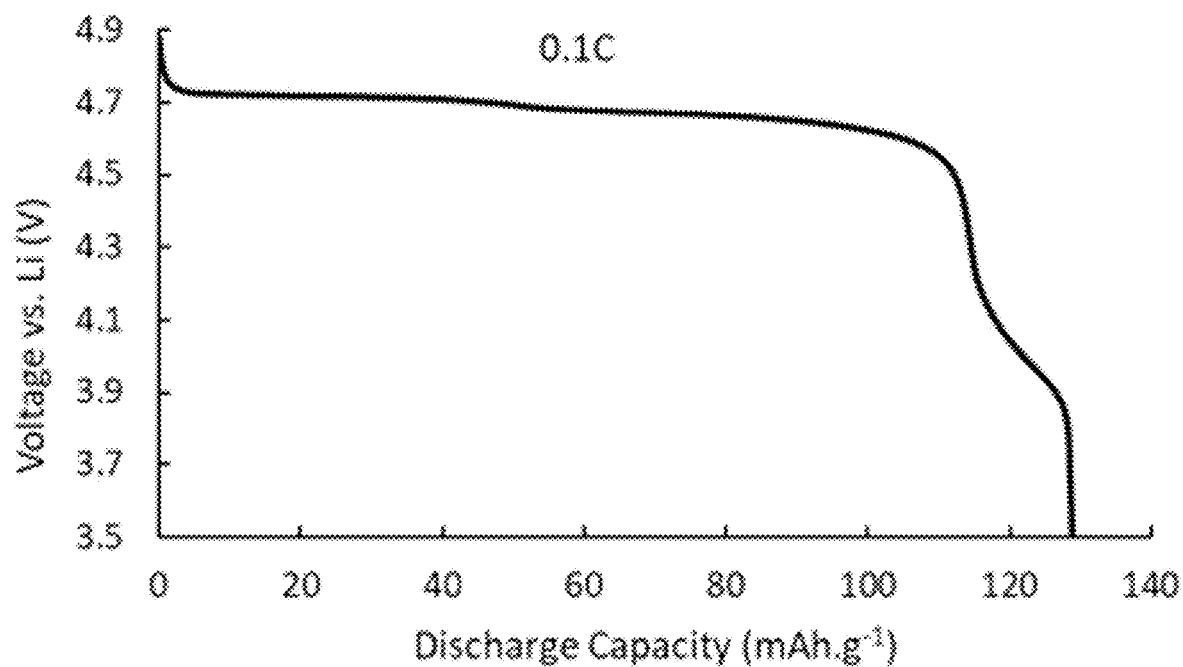
FIG. 24 is a graphical representation.

A precursor to a high voltage spinel having formula $LiNi_{0.5}Mn_{1.5}O_4$ was synthesized using 8.62 g of $MnCO_3$ (Alfa; Particle Size: 1-3 μm), 2.97 g of $NiCO_3$ (Alfa; Anhydrous), and 1.92 g of lithium carbonate as the starting materials. 16.4 g of oxalic acid dihydrate ($H_2C_2O_4 \cdot 2H_2O$) was used as the chelating agent. The metal carbonates were mixed with 20 mL of DI water to form a slurry in one beaker and the acid was added to 40 mL of DI water inside a separate beaker. The oxalic acid slurry was then heated to 40° C. and the carbonate slurry was added to the acid solution at a rate of 8.9 mL/hr to form the precursor. The precursor was dried using a spray drier. The dried precursor was fired in an alumina crucible at 900° C. for 15 hours in ambient atmosphere. The voltage as a function of discharge measured at a discharge rate of 0.1 C at 25° C. in a half cell is illustrated in FIG. 24.

Example 9

Figure 25:
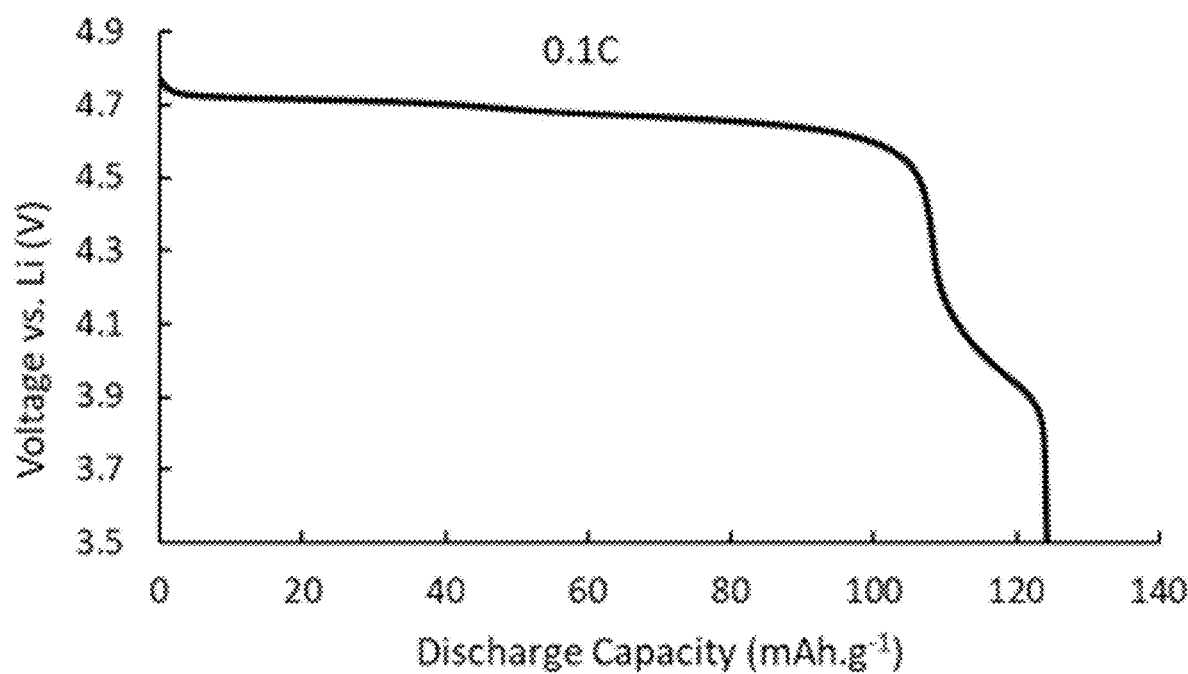
FIG. 25 is a graphical representation.

A precursor to a high voltage spinel with formula $LiNi_{0.5}Mn_{1.5}O_4$ was synthesized similarly to Example 8 except a $MnCO_3$ with a larger particle size was utilized (Sigma; Particle Size: ≤74 μm). The precursor was dried and fired similarly to Example 8. The voltage as a function of discharge measured at a discharge rate of 0.1 C at 25° C. in a half cell is illustrated in FIG. 25.

Example 10

Figure 26:
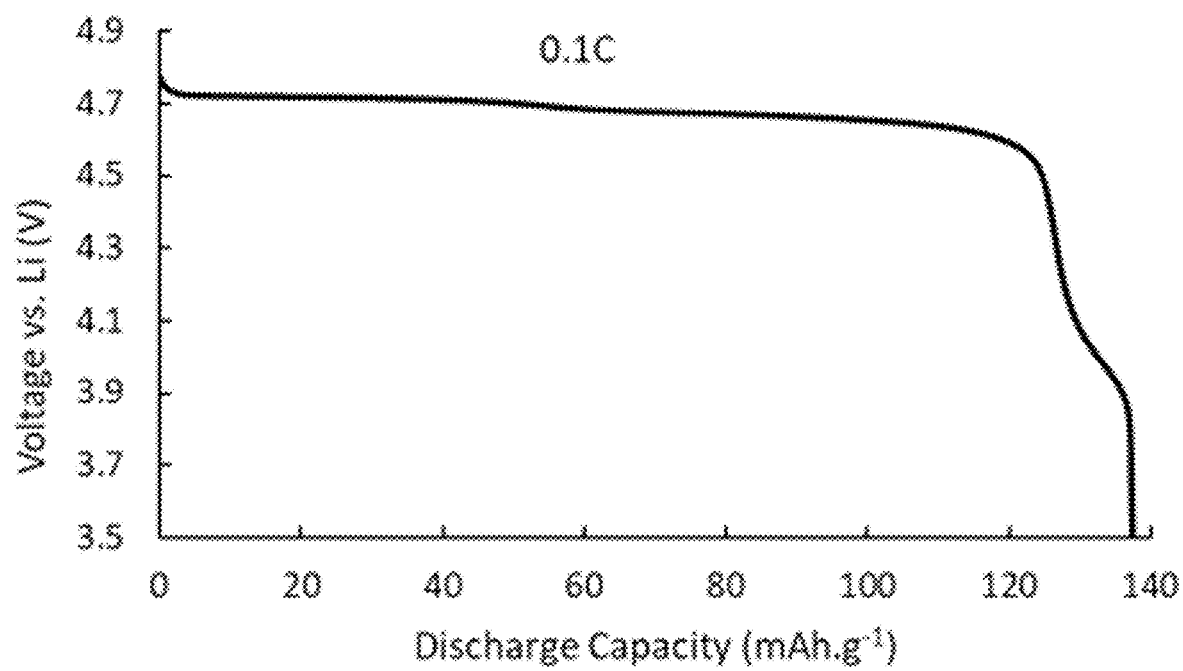
FIG. 26 is a graphical representation.

A precursor to a high voltage Spinel $LiNi_{0.5}Mn_{1.5}O_4$ was synthesized using 8.62 g of $MnCO_3$ (Sigma; Particle Size: ≤7 m), 2.97 g of $NiCO_3$ (Alfa; Anhydrous), and 1.92 g of lithium carbonate as the starting materials. 16.4 g of oxalic acid dihydrate ($H_2C_2O_4 \cdot 2H_2O$) was used as the chelating agent. The metal carbonates were mixed with 80 mL of DI water to form a slurry in one beaker and the acid was dissolved in 120 mL of DI water inside a separate beaker. The carbonate slurry was added to the oxalic acid solution at ambient temperature of about 25° C. at a rate of 16 mL/hr to form the precursor. The precursor was then dried using a spray drier. The dried precursor was fired in an alumina crucible at 900° C. for 15 hours in ambient atmosphere. The voltage as a function of discharge measured at a discharge rate of 0.1 C at 25° C. in a half cell is illustrated in FIG. 26.

Example 11

Figure 27:
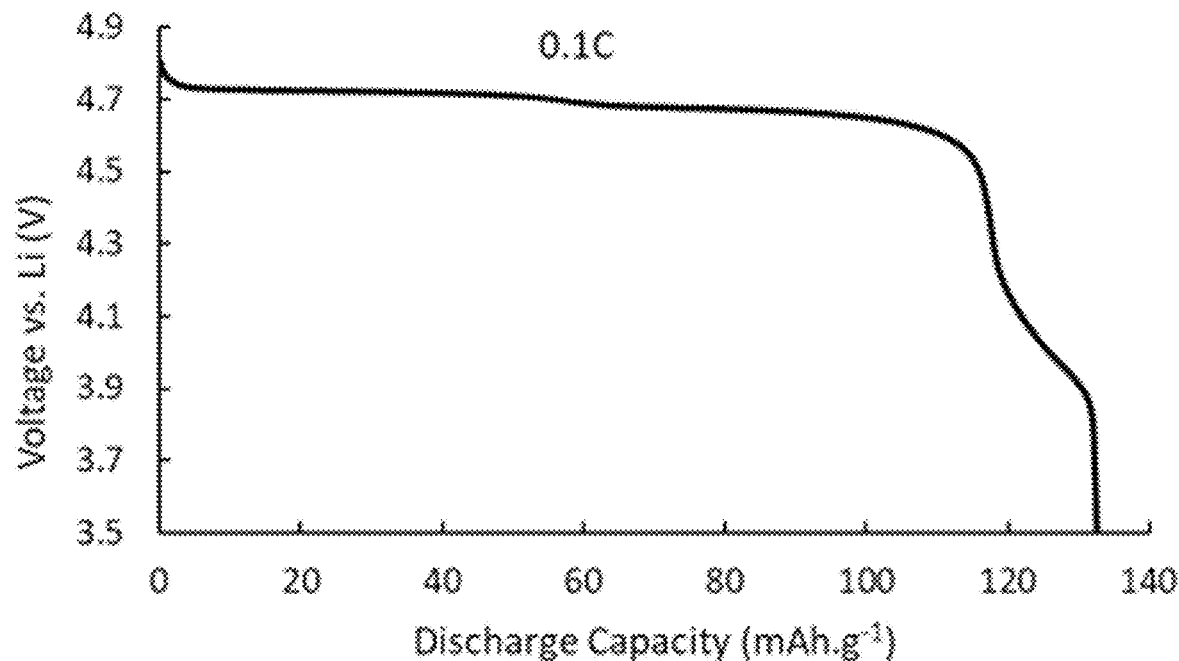
FIG. 27 is a graphical representation.

A precursor to a high voltage Spinel having formula $LiNi_{0.5}Mn_{1.5}O_4$ was synthesized similarly to Example 10 except less water was used in the reaction: the same amounts of metal carbonates were mixed with 12 mL of DI water and the same amount of oxalic acid was added to 28 mL of water. The carbonate slurry was added to the oxalic acid slurry at the rate of 3 mL/hr. The precursor was then dried and fired similarly to Example 7. The voltage as a function of discharge measured at a discharge rate of 0.1 C at 25° C. in a half cell is illustrated in FIG. 27. Example 11 demonstrates the ability to form the precursor with very low amounts of added water, and in some embodiments no water is added, since water is provided by digestion and the waters of hydration of the starting materials may be sufficient to initiate and complete the reaction.

Example 12

Figure 28:
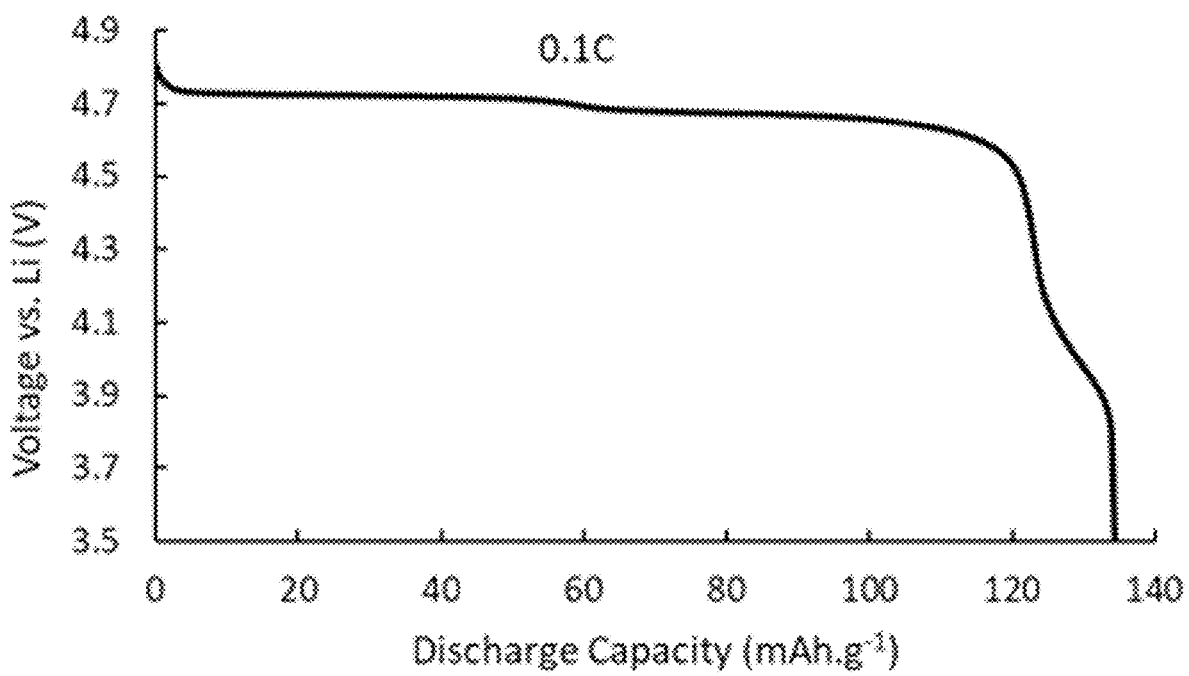
FIG. 28 is a graphical representation.

A precursor to a high voltage spinel having formula $LiNi_{0.5}Mn_{1.5}O_4$ was synthesized similarly to Example 11 except a basic nickel carbonate (Sigma; $NiCO_3 \cdot 2Ni(OH)_2 \cdot xH_2O$), source was used. The precursor was then dried and fired similarly to Example 11. The voltage as a function of discharge measured at a discharge rate of 0.1 C at 25° C. in a half cell is illustrated in FIG. 28.

Example 13

Figure 29:
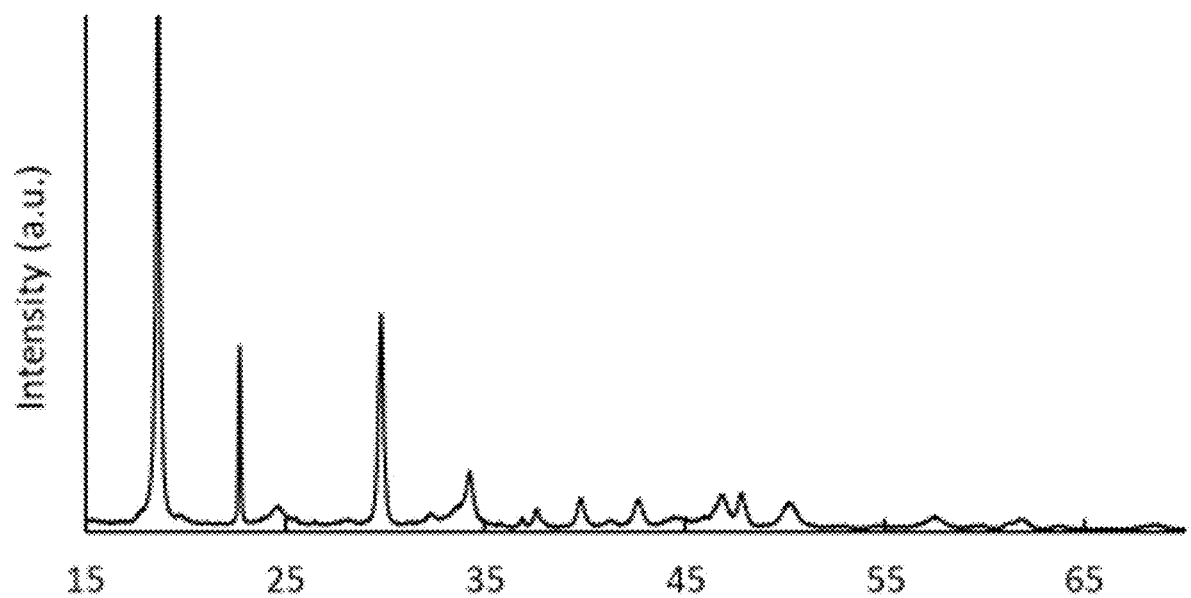
FIG. 29 is an XRD pattern.

A precursor to a high voltage spinel with formula $LiNi_{0.5}Mn_{1.5}O_4$ was synthesized using 8.62 g of $MnCO_3$ (Sigma; Particle Size: ≤74 μm), 2.97 g of $NiCO_3$ (Alfa; Anhydrous), and 1.92 g of lithium carbonate as the starting materials. 16.4 g of oxalic acid dihydrate ($H_2C_2O_4 \cdot 2H_2O$) was used as the chelating agent. The metal carbonates were mixed with 80 mL of DI water to form a slurry in one beaker and the acid was dissolved in 160 mL of DI water inside a separate beaker. The beaker with the dissolved oxalic acid was then placed inside an ice bath to maintain a temperature of about 5° C. The carbonate slurry was added to the oxalic acid solution at a rate of 23 mL/hr. An XRD pattern of the dried precursor is provided in FIG. 29.

Example 14

Figure 30:
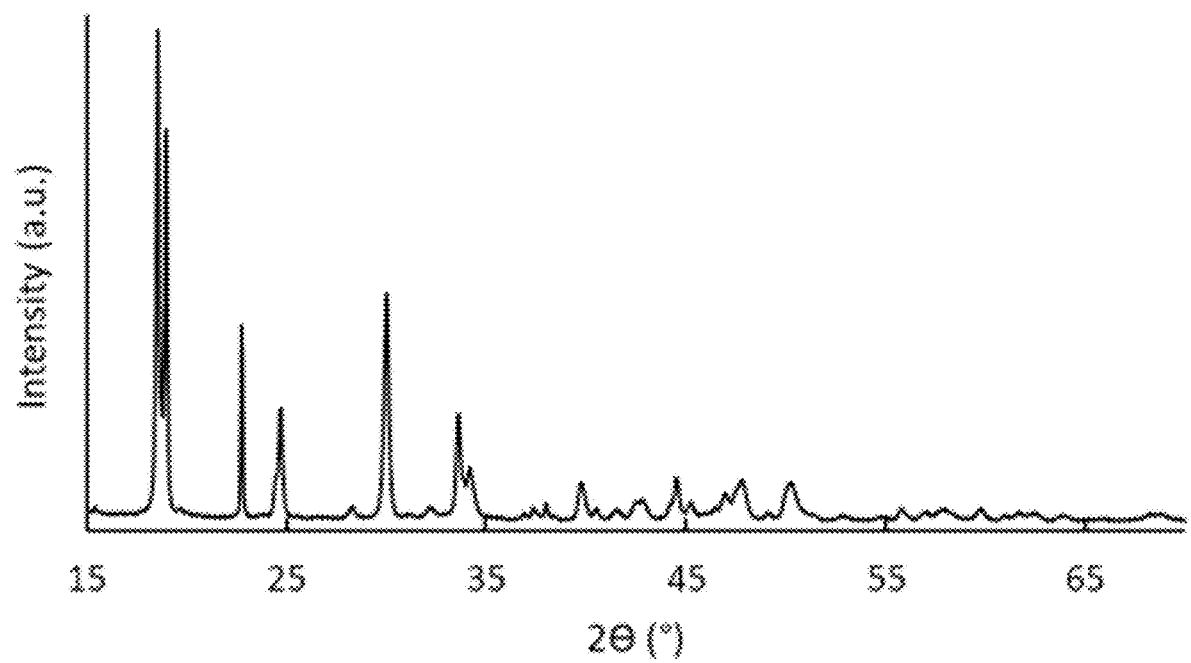
FIG. 30 is an XRD pattern.

A precursor to a high voltage spinel having formula $LiNi_{0.5}Mn_{1.5}O_4$ precursor was synthesized similarly to Example 13 except the synthesis was carried out at the boiling point of water (100° C.). A reflux condenser was used to maintain the water level of the reaction. An XRD pattern of the dried precursor is provided in FIG. 30.

Example 15

Figure 31:
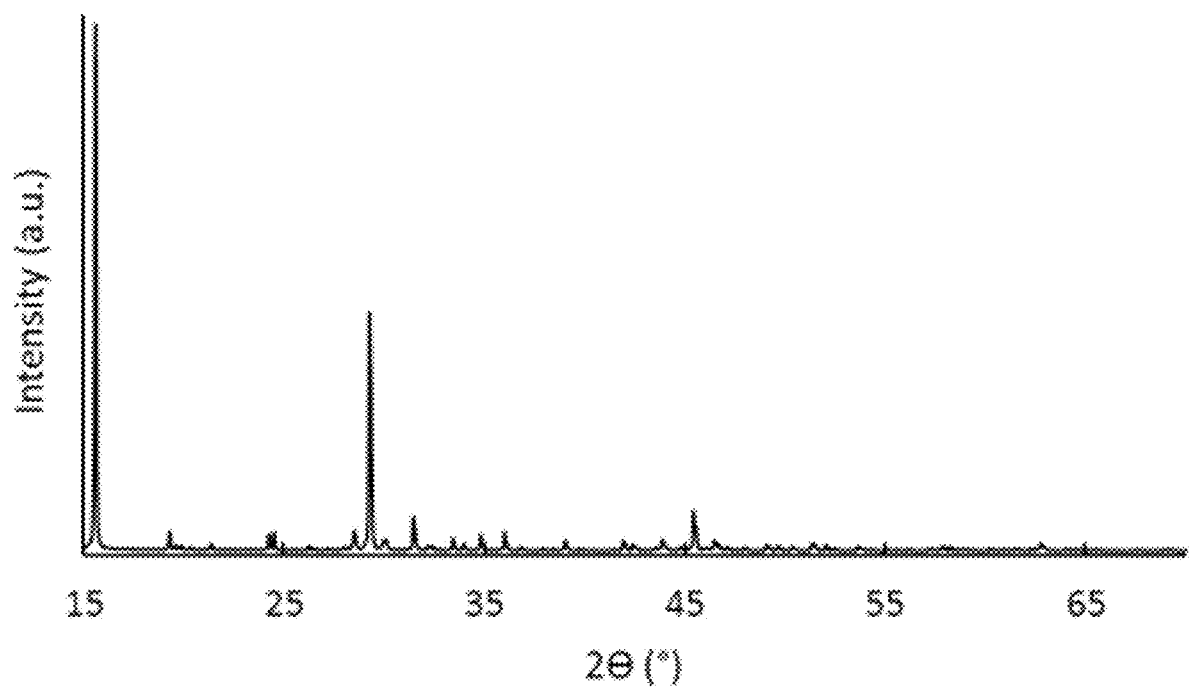
FIG. 31 is an XRD pattern.

A precursor to a spinel having formula $LiMn_2O_4$ was synthesized using lithium carbonate, manganese carbonate, and oxalic acid as starting materials. 16.39 g of $H_2C_2O_4 \cdot 2H_2O$ was added to 40 ml of water in a beaker. In a second beaker, $Li_2CO_3$ (1.85 g) and $MnCO_3$ (11.49 g) were mixed in 24 ml of deionized water. The carbonate mixture slurry was pumped into the oxalic acid slurry with a rate of 0.01 L/Hr. The mixture within the reactor was mixed at ambient temperature. The resulting slurry was dried by evaporating, producing the precursor to the $LiMn_2O_4$. The XRD pattern is provided in FIG. 31.

Figure 32:
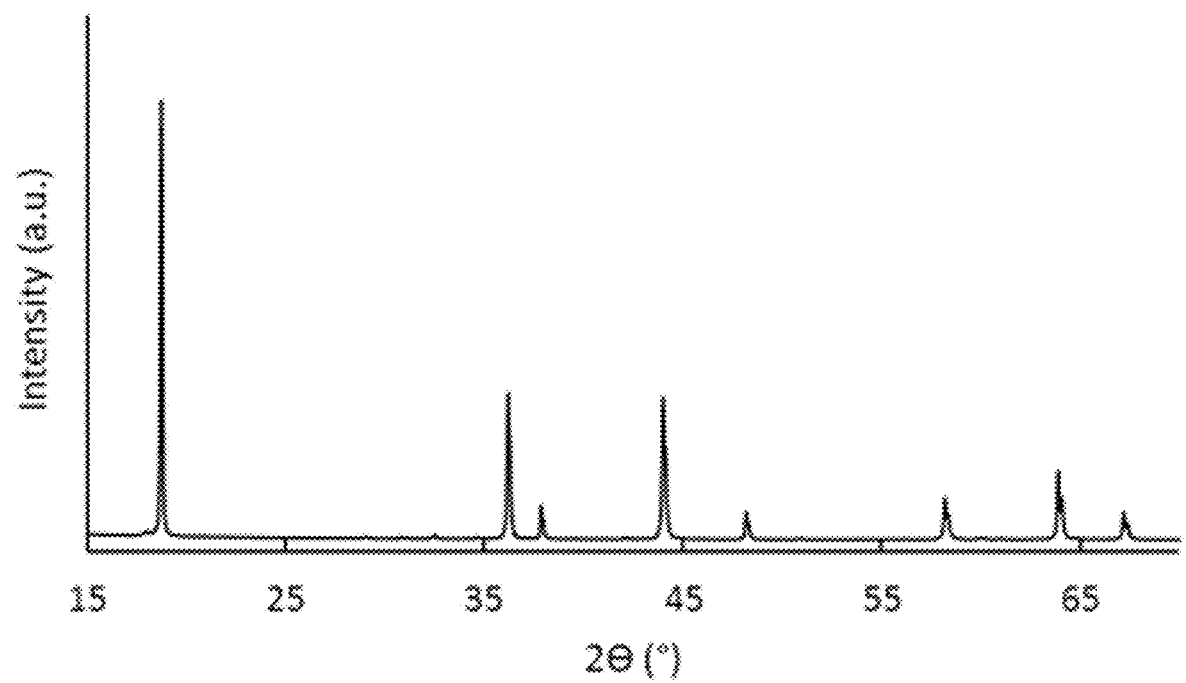
FIG. 32 is an XRD pattern.
Figure 33:
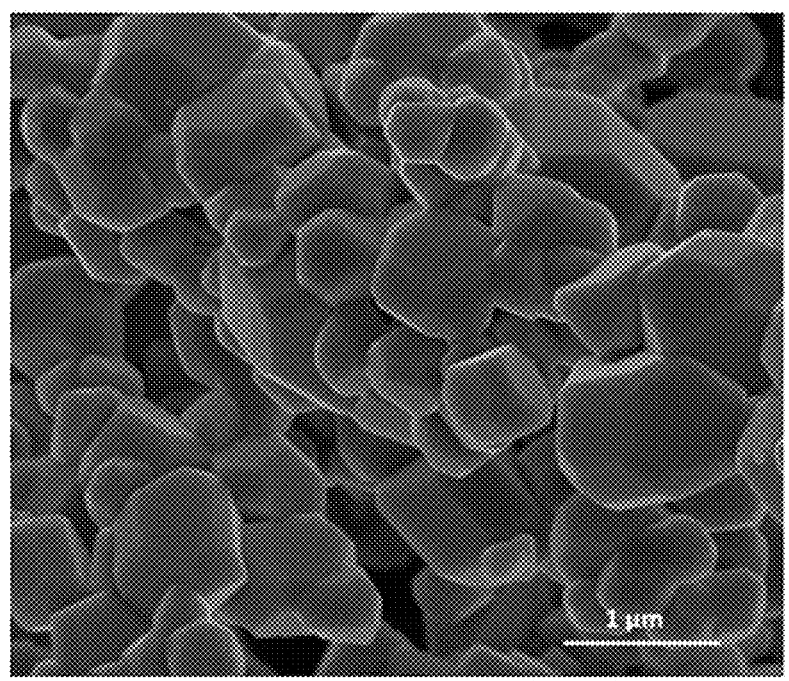
FIG. 33 is a SEM micrograph.

The precursor material was fired in a box furnace in air at 350° C. for 1 h and then 850° C. for 5 h. The X-ray diffraction pattern and scanning electron microscopy image of the fired material are shown in FIGS. 32 and 33, respectively.

Example 16

A precursor to a spinel of formula $LiMn_{1.9}M_{0.1}O_4$ (M: Mn, Al, Ni) was synthesized using metal carbonates and oxalic acid, in the amounts shown in Table 1.

Figure 34:
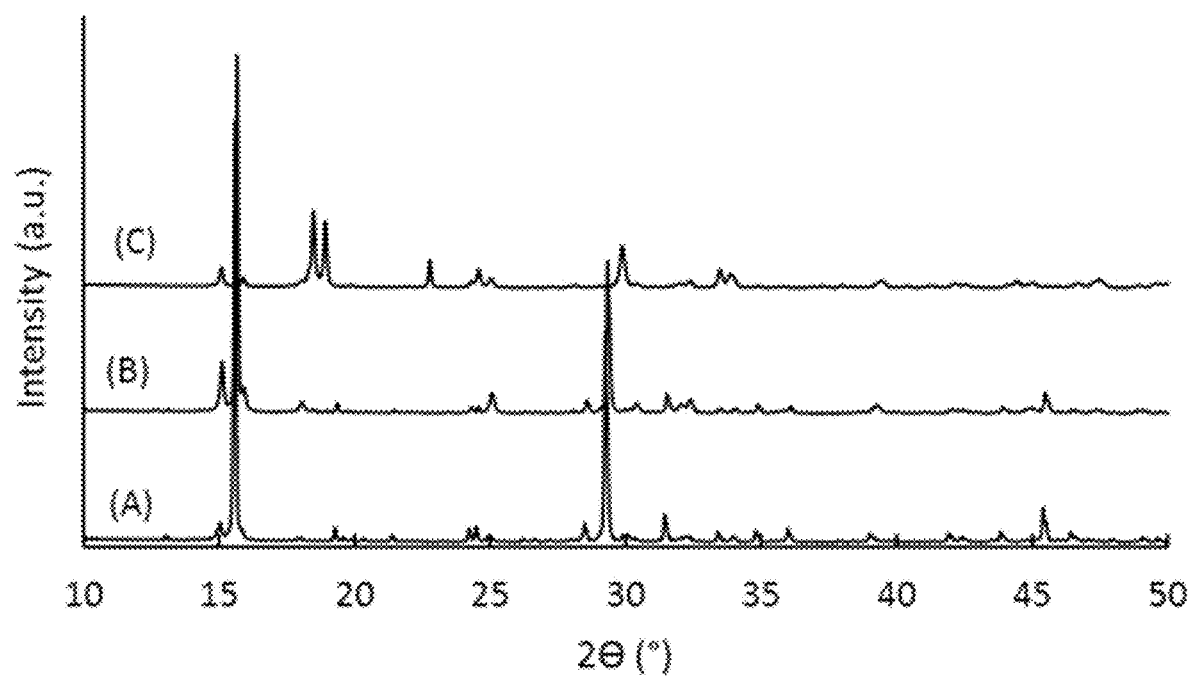
FIG. 34 is an XRD pattern.

The starting materials of each composition was mixed in 32 ml of deionized water for 6 h at ambient temperature. The resulting slurries were dried by evaporation. The X-ray diffraction patterns shown in FIG. 34 show that manganese oxalate dihydrate (Sample A), a precursor to $LiMn_2O_4$, and the precursor to $LiMn_{1.9}Al_{0.1}O_4$ (Sample B) crystalized in an orthorhombic space group ($P2_12_12_1$). The $LiMn_{1.9}Ni_{0.1}O_4$ (Sample C) crystallized in a monoclinic space group (C2/c).

TABLE 1

| Sample | $Li_2CO_3$ | $MnCO_3$ | $Al(OH)_3$ | $NiCO_3$ | $H_2C_2O_4 \cdot 2H_2O$ |
|---|---|---|---|---|---|
| A | 0.961 g | 5.745 g | 0 | 0 | 8.195 g |
| B | 0.961 g | 5.465 g | 0.195g | 0 | 8.195 g |
| C | 0.961 g | 5.465 g | 0 | 0.297 g | 8.195 g |

Example 17

Figure 35:
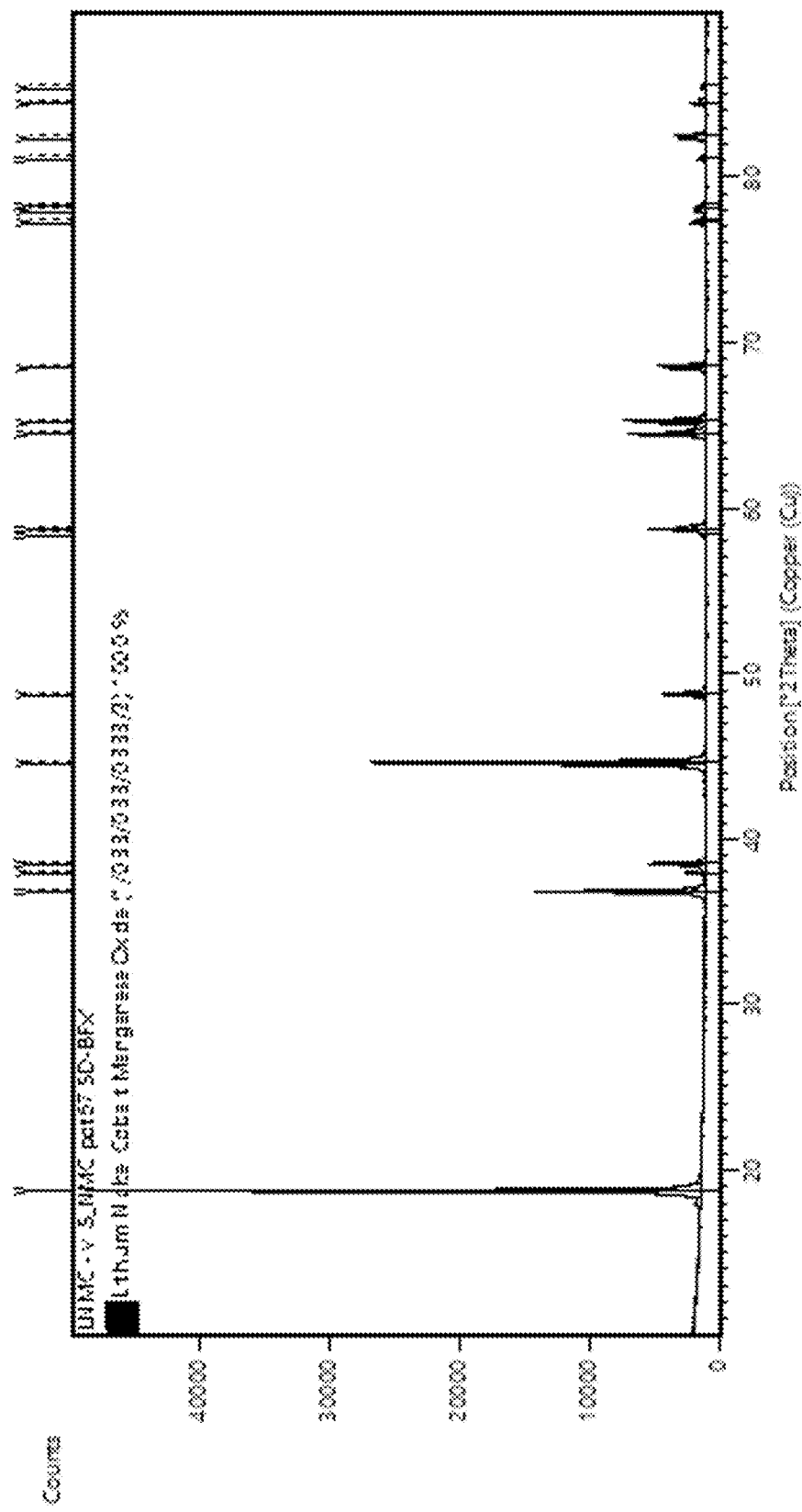
FIG. 35 is an XRD pattern.
Figure 36:
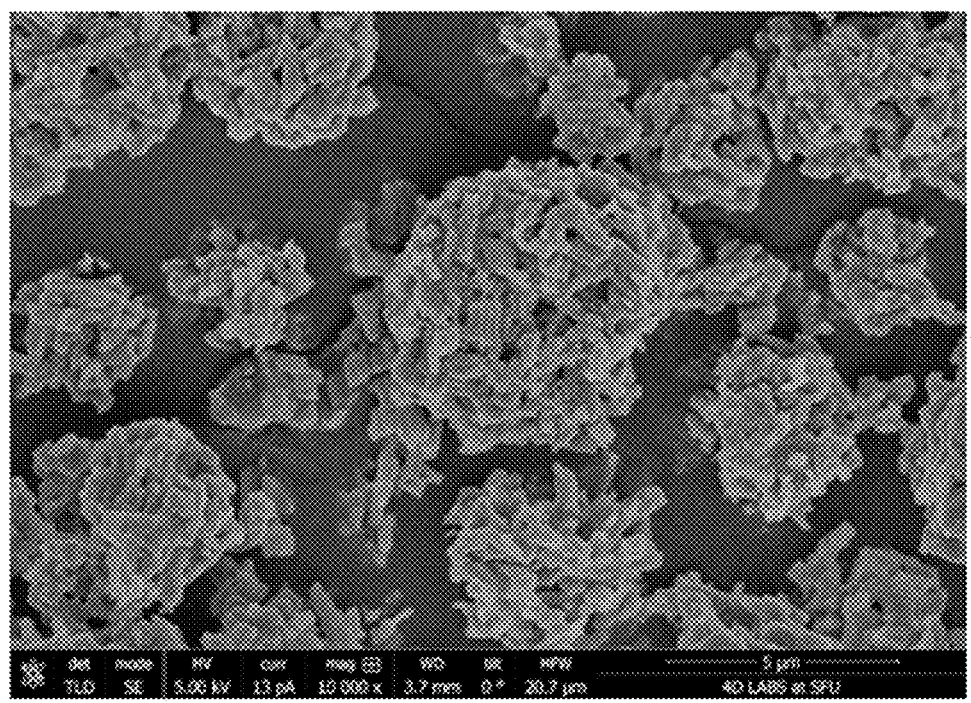
FIG. 36 is SEM micrograph.
Figure 37:
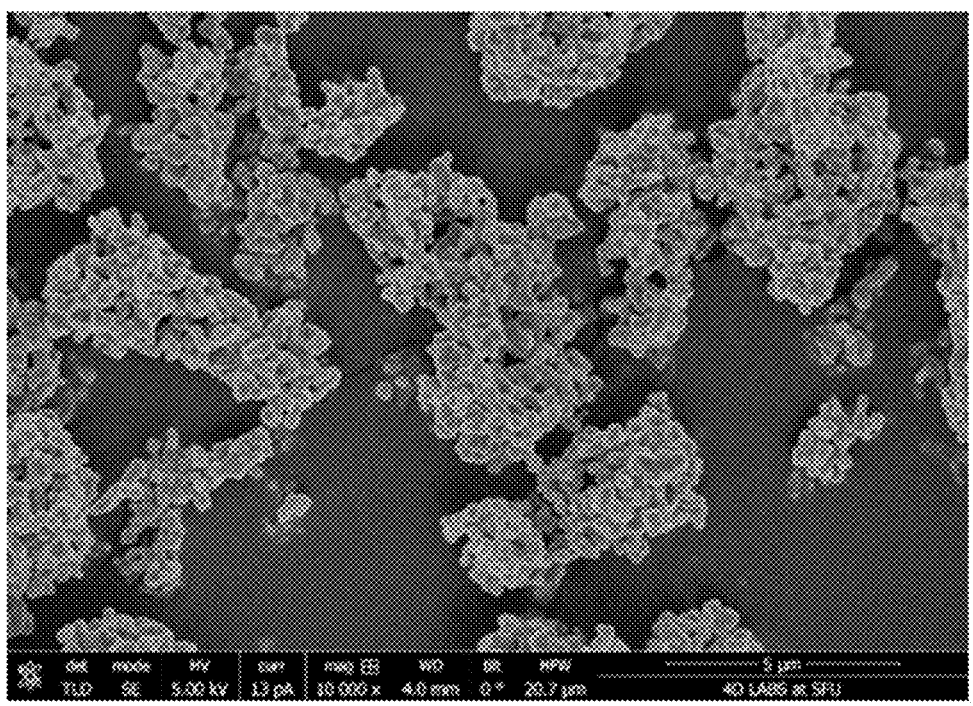
FIG. 37 is SEM micrograph of an embodiment of the invention.
Figure 38:
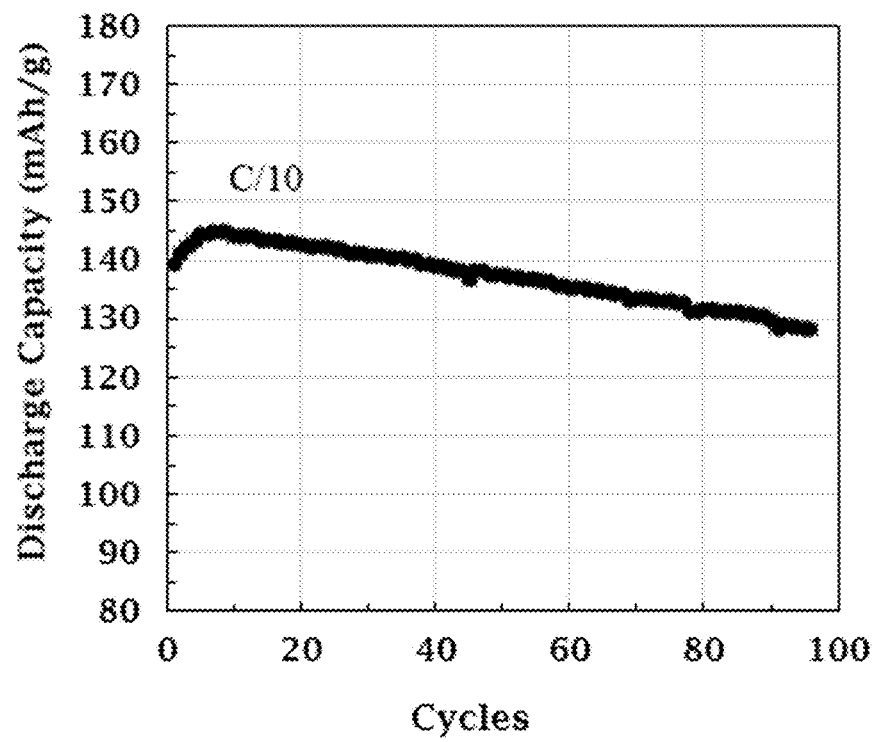
FIG. 38 is a graphical representation.

A precursor to NMC 111 having formula $LiNi_{0.333}Mn_{0.333}Co_{0.333}O_2$ was prepared from 3.88 g $Li_2CO_3$, 3.79 g $NiCO_3$, 3.92 g $MnCO_3$, 3.93 g $CoCO_3$ and 19.23 g of $H_2C_2O_4 \cdot 2H_2O$ dispersed in 240 mL of deionized water in a round-bottom flask. The mixture was heated under reflux for 6.5 hour and allowed to cool down. The final mixture had a solids content of approximately 13%. The powder was obtained by spray drying to obtain the precursor with the formula $LiNi_{0.333}Mn_{0.333}Co_{0.333}(C_2O_4)_{1.5}$. The precursor was heated at 110° C. for 1 h and calcined at 800° C. for 7.5 h in a box furnace to obtain NMC 111. An SEM of the precursor is provided in FIG. 36. The XRD pattern of the calcined powder is provided in FIG. 35 and the SEM of the calcined powder is provided in FIG. 37 wherein the nanostructure of the precursor is shown to be largely maintained. The discharge capacity as a function of cycles is illustrated in FIG. 38.

Example 18

Figure 39:
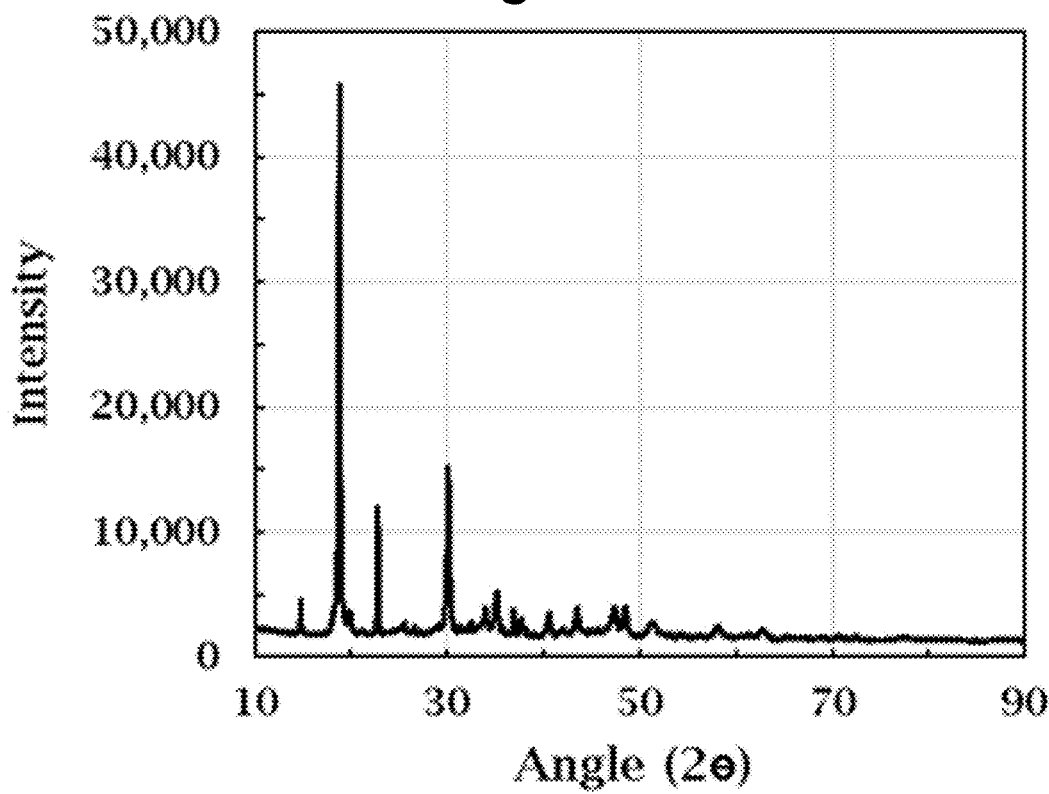
FIG. 39 is an XRD pattern.
Figure 40:
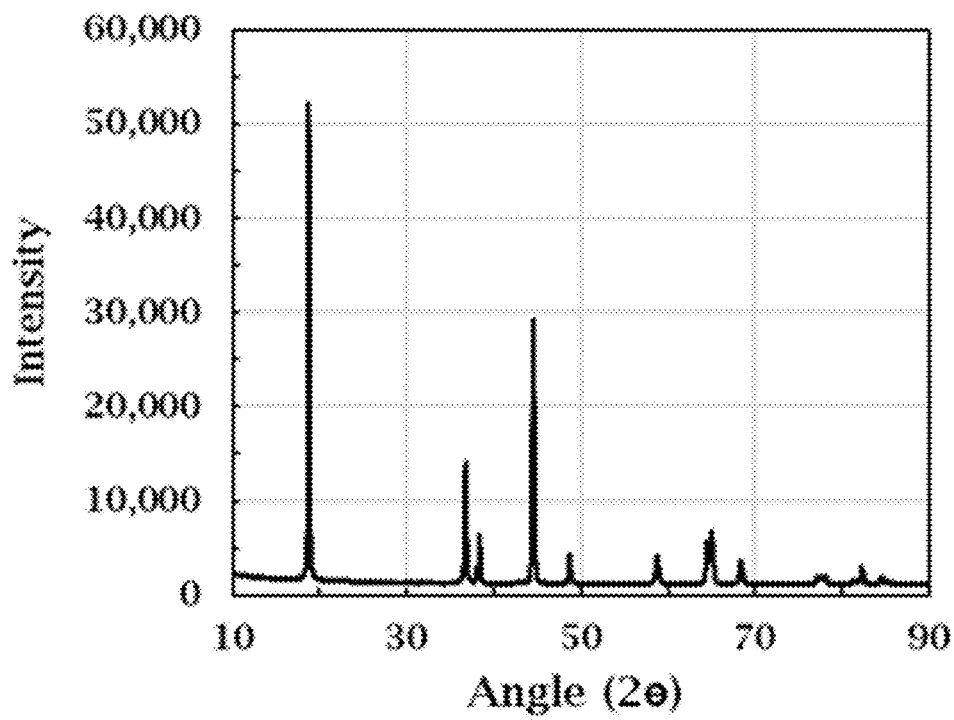
FIG. 40 is an XRD pattern.
Figure 41:
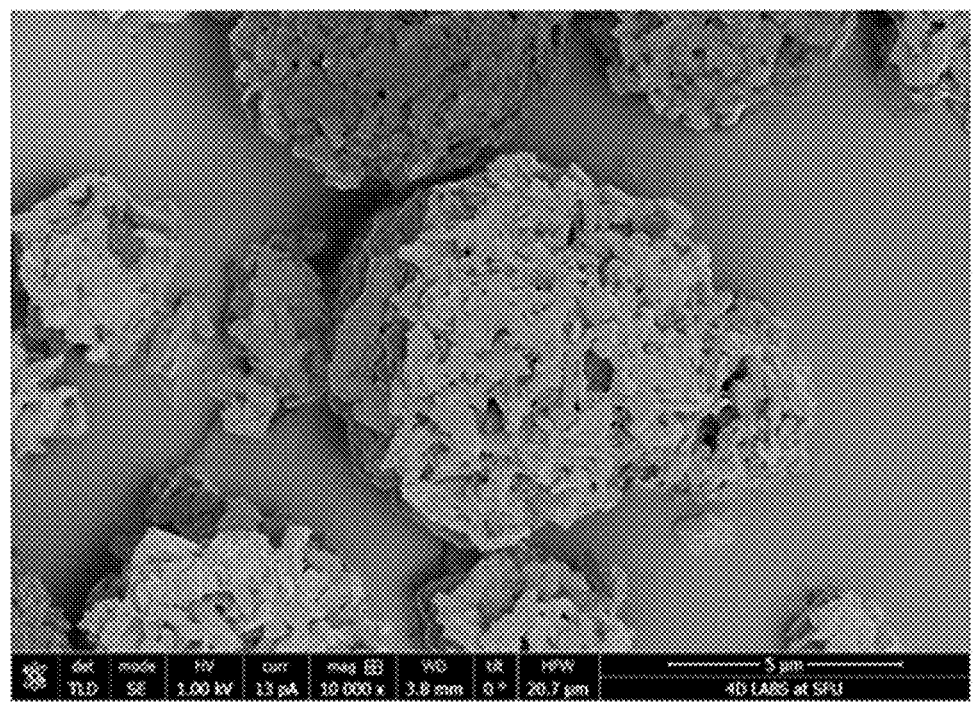
FIG. 41 is SEM micrograph.
Figure 42:
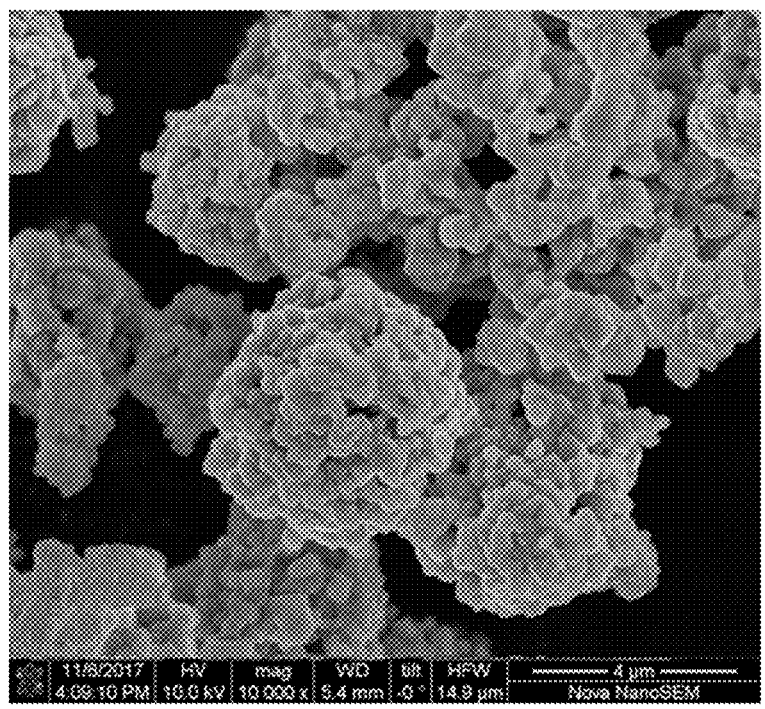
FIG. 42 is SEM micrograph.
Figure 43:
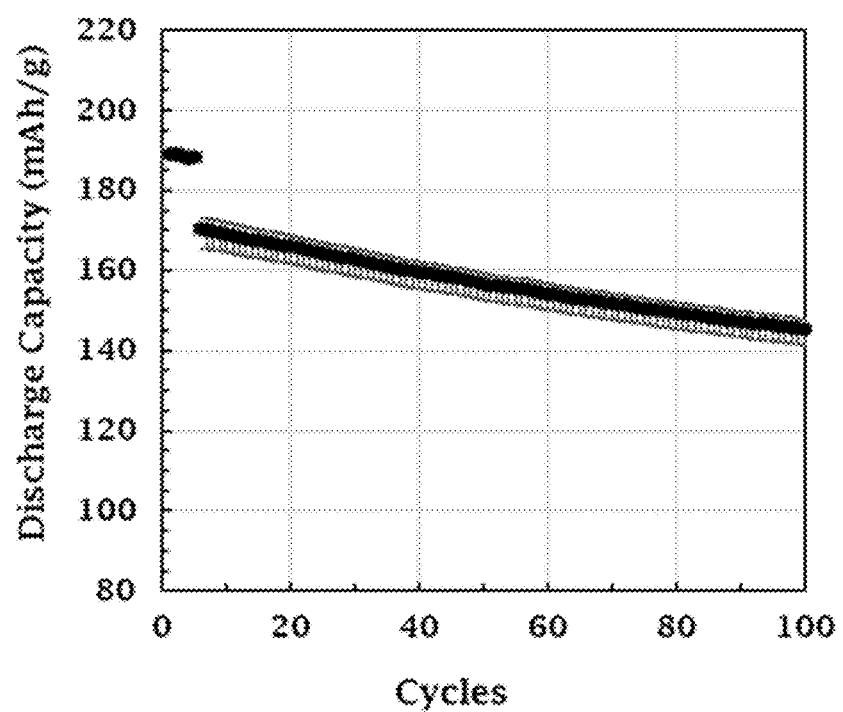
FIG. 43 is a graphical representation.
Figure 44:
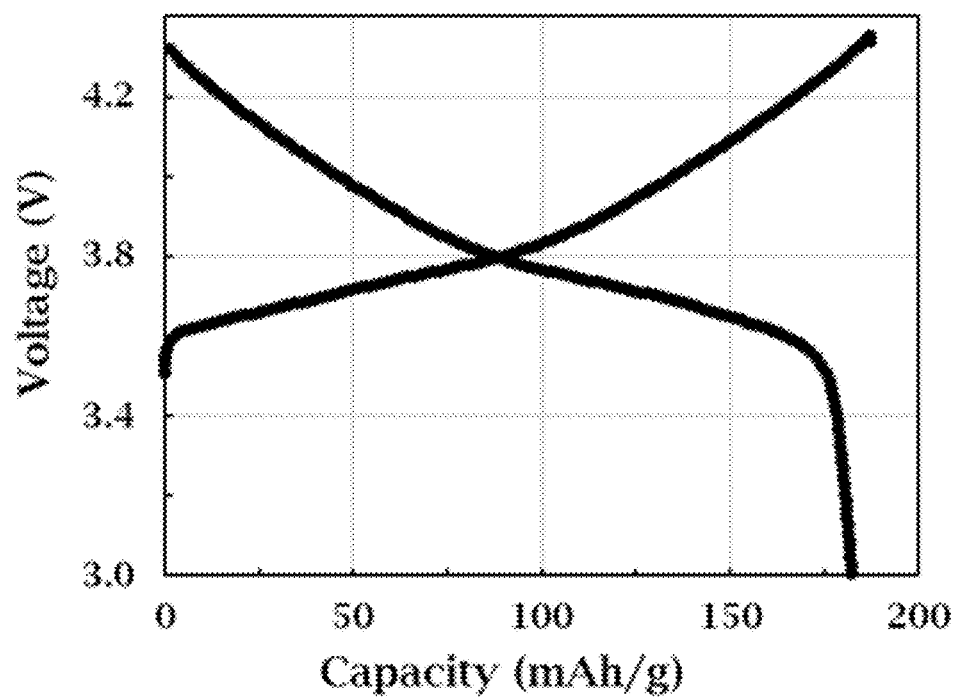
FIG. 44 is a graphical representation.

A precursor to NMC 622 having formula $LiNi_{0.6}Mn_{0.2}Co_{0.2}O_2$ was prepared from 39 g $Li_2CO_3$, 71 g $NiCO_3$, 23 g $MnCO_3$, and 24 g $CoCO_3$ dispersed in 200 mL of deionized water in a beaker. The mixture of carbonates was pumped into a separate beaker containing 201 g of $H_2C_2O_4 \cdot 2H_2O$ in 400 mL of deionized water at a rate of 0.38 moles of carbonates per hour. The reaction mixture was then stirred for 1 h. The final mixture, having a solids content of approximately 20%, was spray dried to obtain the precursor with the formula $LiNi_{0.6}Mn_{0.2}Co_{0.2}(C_2O_4)_{1.5}$. An XRD pattern of the precursor is provided in FIG. 39 and the SEM is provided in FIG. 41. The precursor was heated at 110° C. for 1 h and calcined at 800° C. for 7.5 h under air in a box furnace to obtain NMC 622 with an XRD pattern illustrated in FIG. 40 and an SEM of FIG. 42. The SEM demonstrates that the ordered nanostructure lattice of the precursor is substantially maintained in the calcined powder. The discharge capacity of a half cell at 25° C. at 1 C as a function of cycle number is shown in FIG. 43. FIG. 44 shows the initial charge and discharge voltage profiles as a function of capacity at 0.1 C.

Example 19

Figure 45:
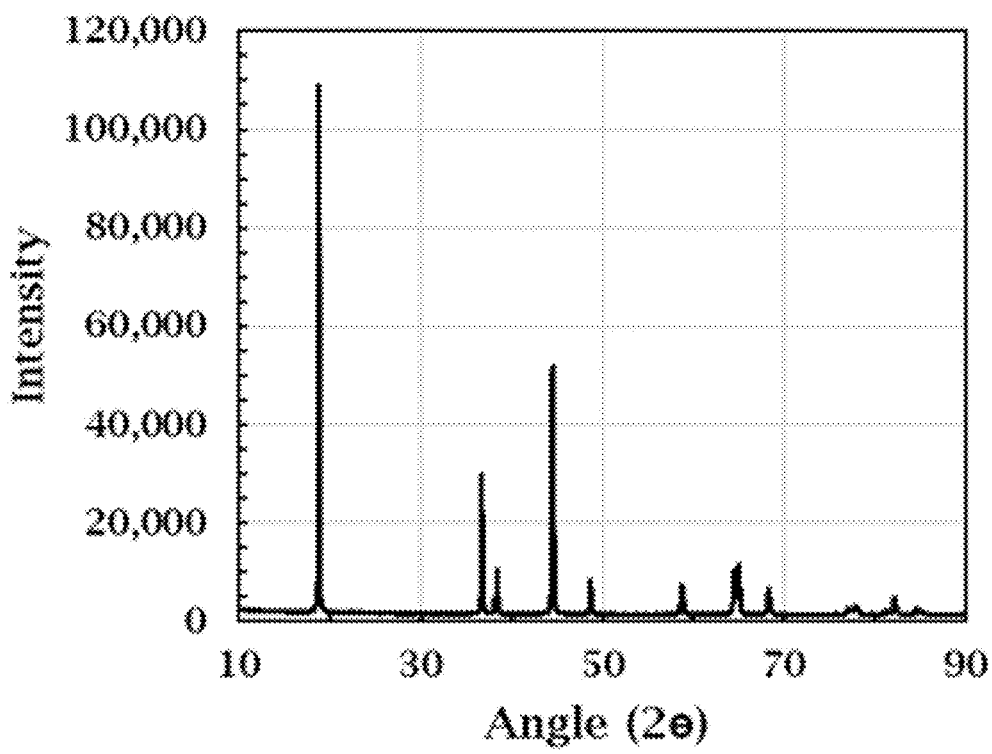
FIG. 45 is an XRD pattern.
Figure 46:
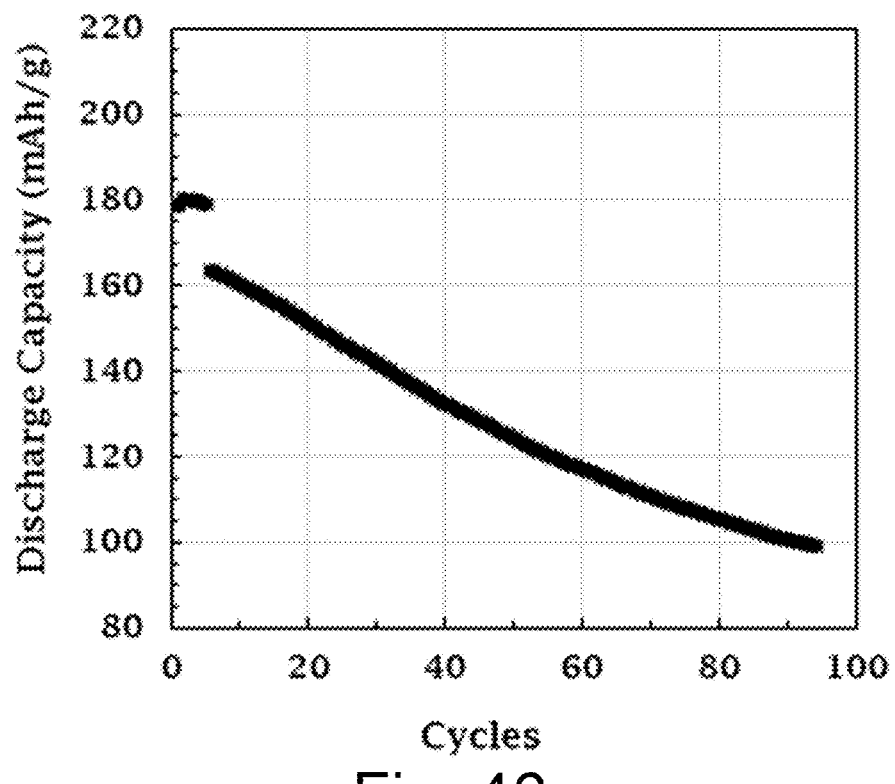
FIG. 46 is a graphical representation.
Figure 47:
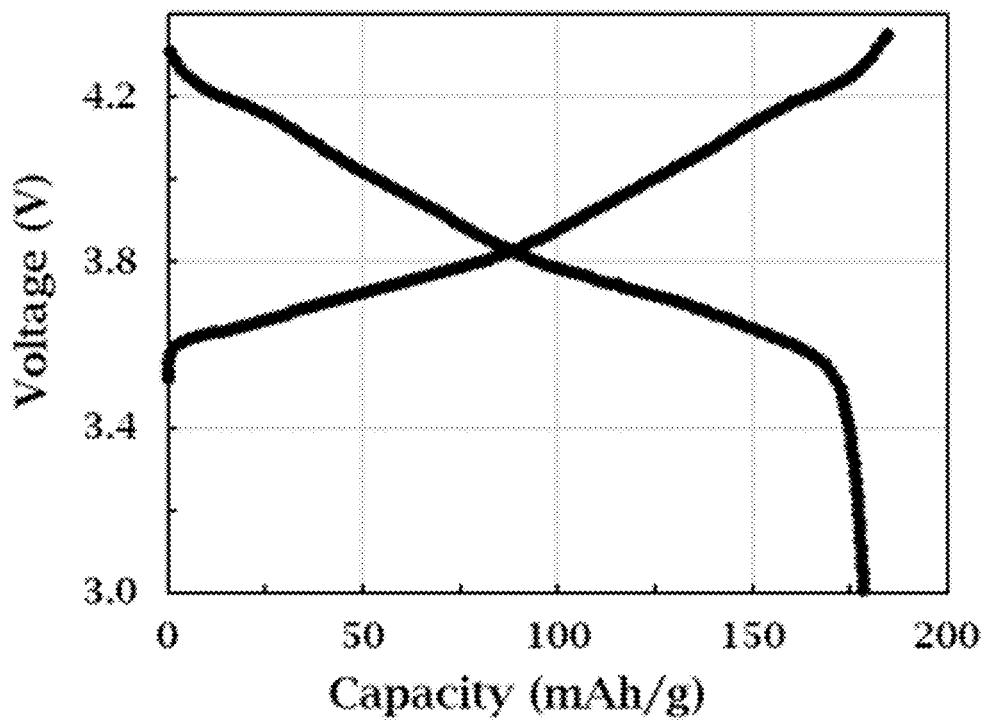
FIG. 47 is a graphical representation.
Figure 48:
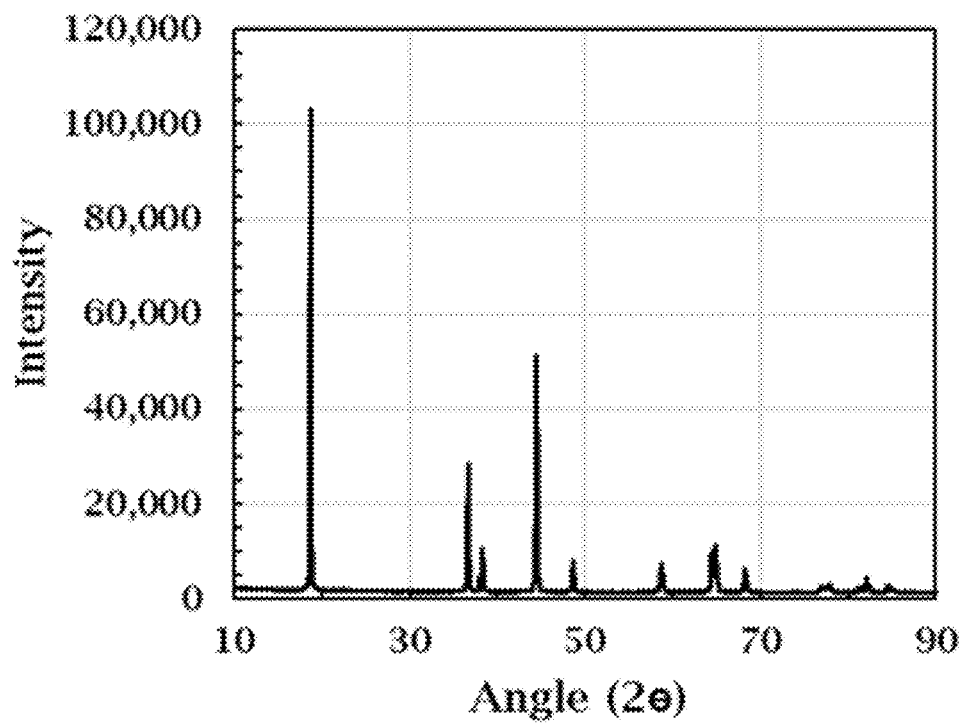
FIG. 48 is an XRD pattern.
Figure 49:
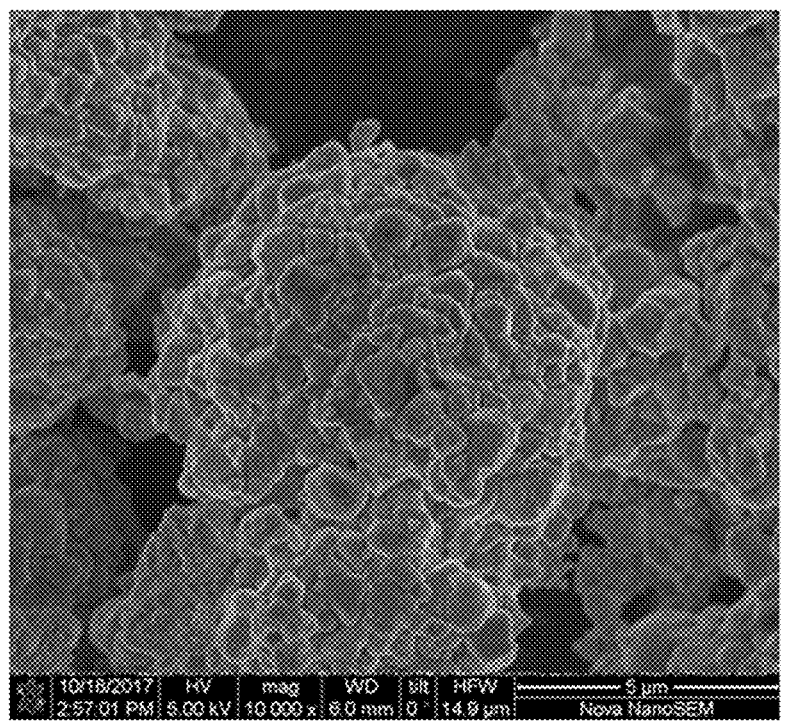
FIG. 49 is SEM micrograph.
Figure 50:
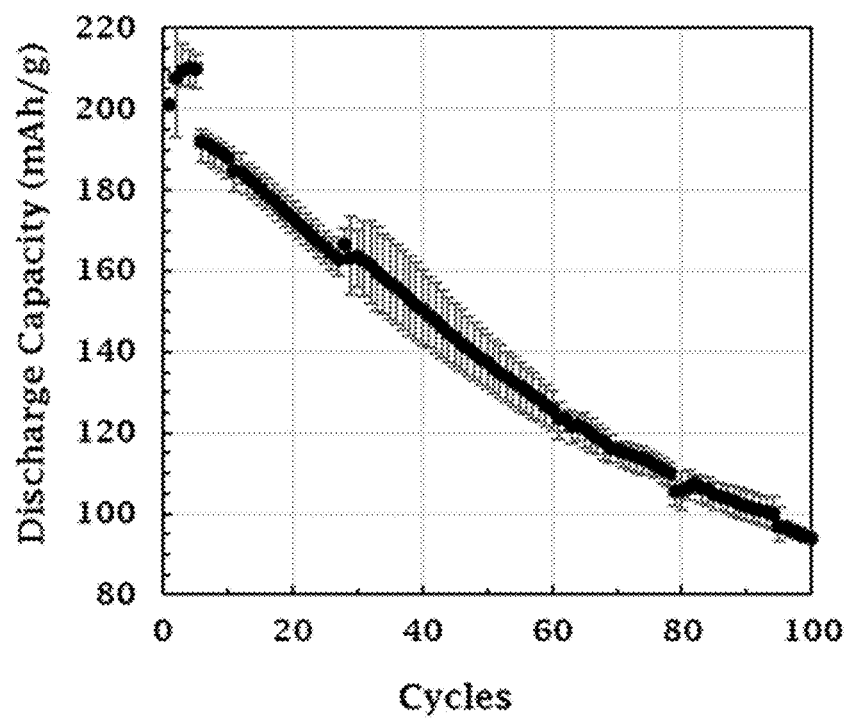
FIG. 50 is a graphical representation.

A precursor for NMC 811 having formula $LiNi_{0.8}Mn_{0.1}Co_{0.1}O_2$ was prepared from 39 g $Li_2CO_3$, 95 g $NiCO_3$, 12 g $MnCO_3$, and 12 g $CoCO_3$ dispersed in 200 mL of deionized water in a beaker. The mixture was pumped into a separate beaker containing 201 g of $H_2C_2O_4 \cdot 2H_2O$ in 400 mL of deionized water at a rate of 0.38 moles of carbonates per hour. The reaction mixture was then stirred for 1 h. The final mixture having a solids content of approximately 20% was spray dried to obtain the precursor with the formula $LiNi_{0.8}Mn_{0.1}Co_{0.1}(C_2O_4)_{1.5}$. The precursor was heated at 600° C. for 5 h under air in a box furnace, heated at 125° C. for 1 h under oxygen flow, and calcined at 830° C. for 15 h under oxygen flow in a tube furnace to obtain NMC 811. The XRD pattern of the NMC 811 oxide is provided in FIG. 45. The discharge capacity as a function of cycles is provided in FIG. 46 and the voltage profile as function of capacity is illustrated in FIG. 47. The NMC 811 was heated at 125° C. for 1 h and calcined at 830° C. for 15 h under oxygen flow in a tube furnace to form refired NMC 811. The XRD pattern of the refired XRD is provided in FIG. 48 and the SEM is provided in FIG. 49. The discharge capacity is provided in FIG. 50 wherein the solid curve represents the average capacity and the error bars represent the maximum and minimum capacities for a series of samples.

Example 20

Figure 51:
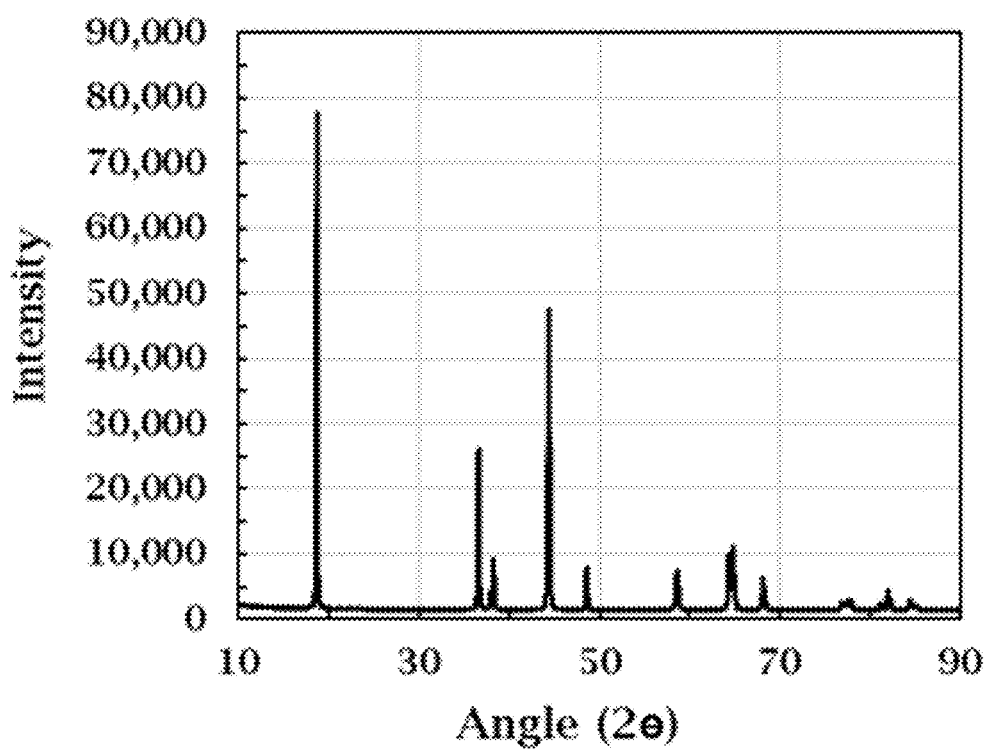
FIG. 51 is an XRD pattern.
Figure 52:
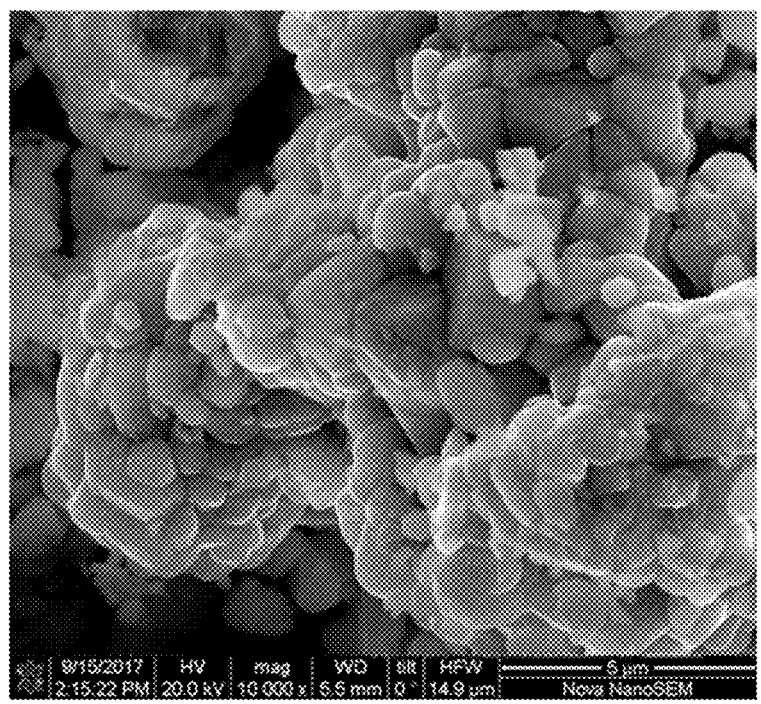
FIG. 52 is SEM micrograph.

A precursor for NCA with formula $LiNi_{0.8}Co_{0.15}Al_{0.05}O_2$ was prepared from 8 g $Li_2CO_3$, 19 g $NiCO_3$, 2 g $Al(OH)(CH_3COO)_2$ and 4 g $CoCO_3$ dispersed in 40 mL of deionized water in a beaker. The mixture was pumped into a separate beaker containing 40 g of $H_2C_2O_4 \cdot 2H_2O$ in 80 mL of deionized water at a rate of 0.08 moles of carbonates per hour. The reaction mixture was then stirred for 1 h. The final mixture having a solids content of approximately 20% was spray dried to obtain the precursor with the formula $LiNi_{0.8}Co_{0.15}Al_{0.05}O_2$. The precursor was heated at 125° C. for 1 h and then calcined at 830° C. for 15 h under oxygen flow in a tube furnace to obtain NCA. The XRD pattern is provided in FIG. 51 and an SEM is provided in FIG. 52 wherein the layered nanostructure originating in the precursor is readily observable.

Example 21

Figure 53:
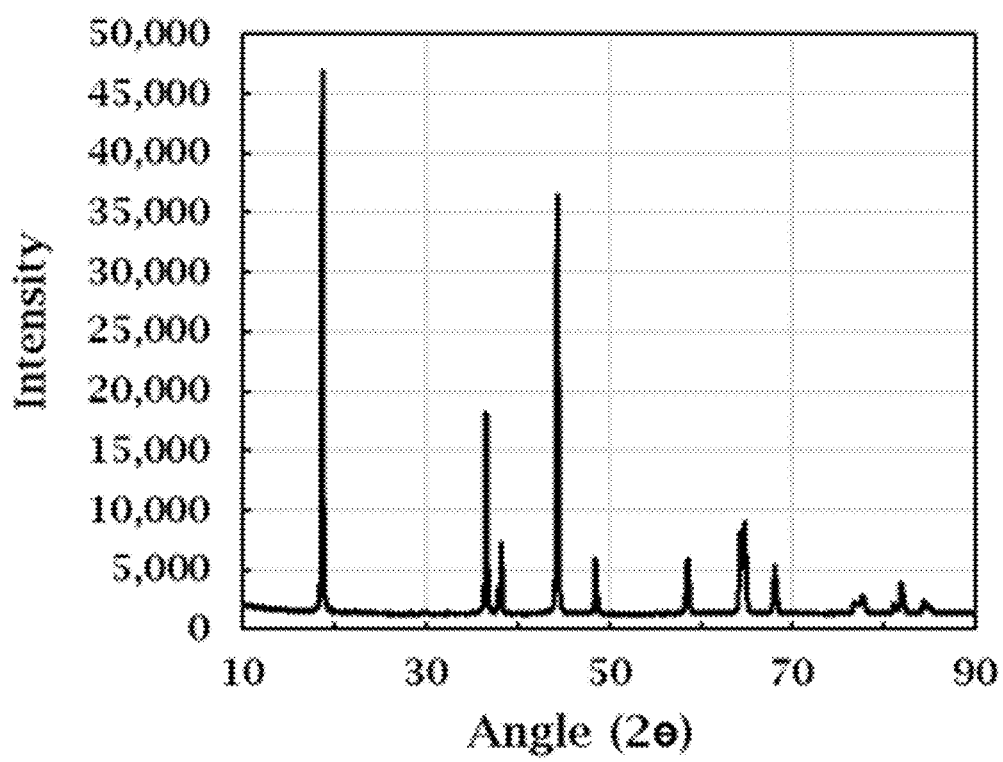
FIG. 53 is an XRD pattern.
Figure 54:
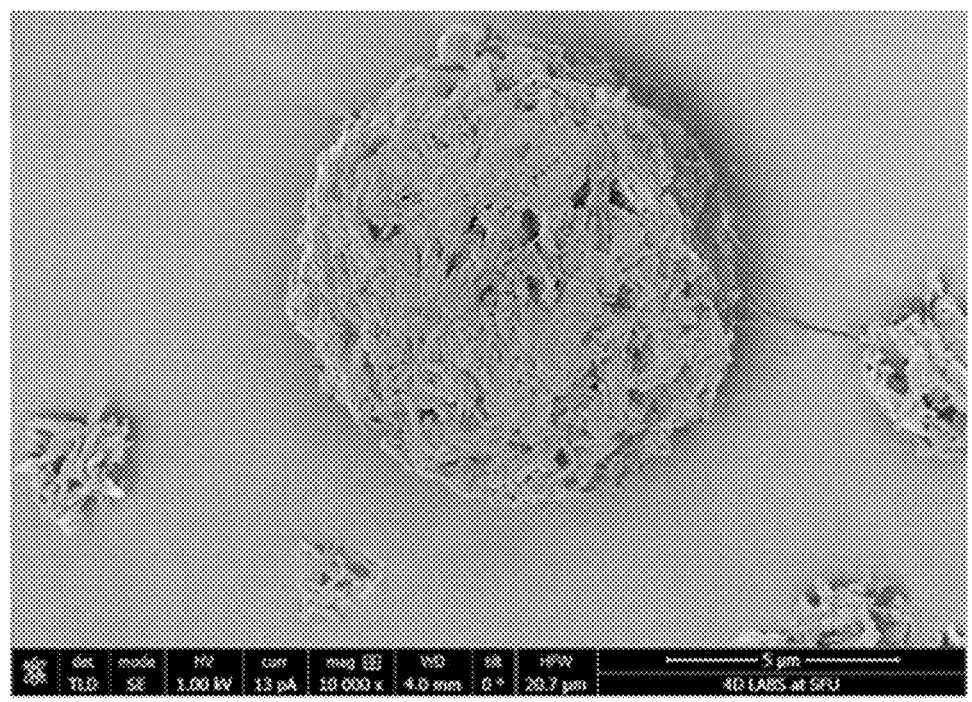
FIG. 54 is SEM micrograph.
Figure 55:
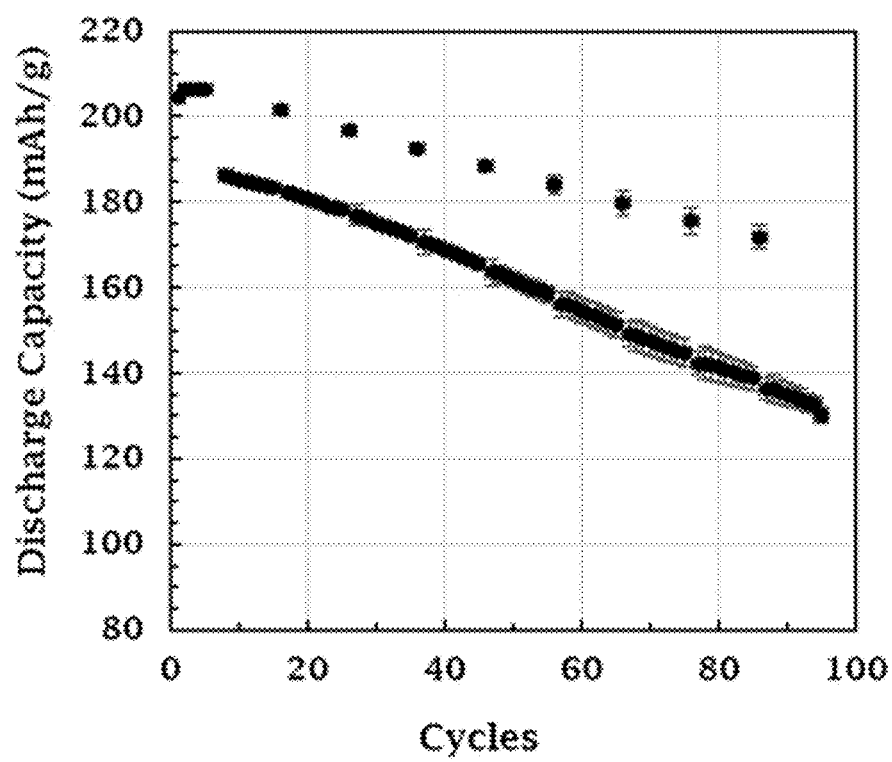
FIG. 55 is a graphical representation.
Figure 56:
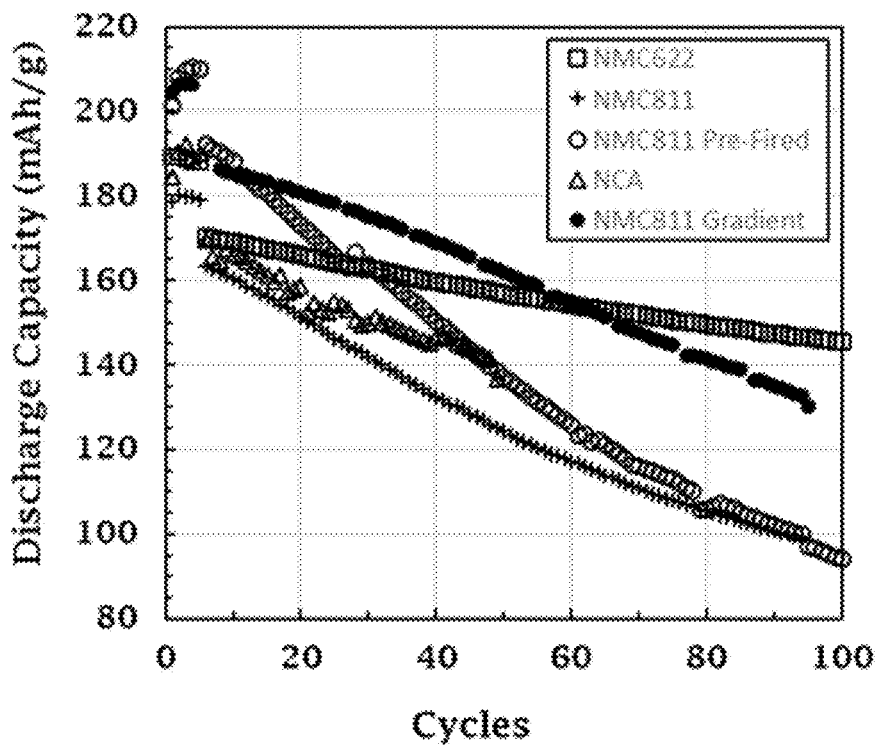
FIG. 56 is a graphical representation.
Figure 57:
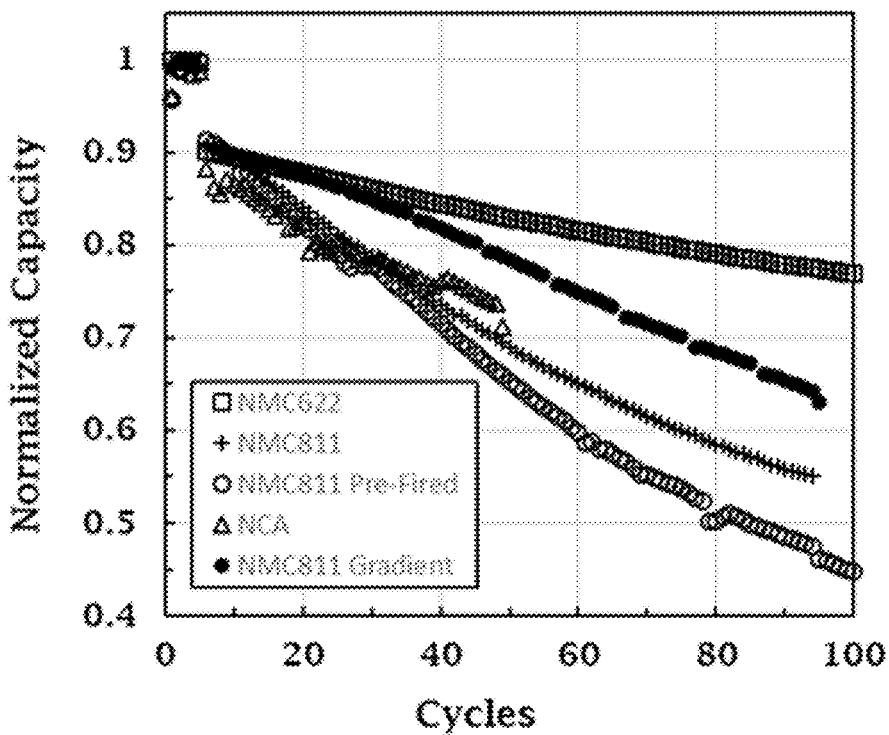
FIG. 57 is a graphical representation.

NMC 622 having overall formula $LiNi_{0.6}Mn_{0.2}Co_{0.2}O_2$ was prepared with a step-wise concentration gradient of transition metals from the central portion, or core, to the exterior. The precursor was prepared from 3.9 g $Li_2CO_3$, 9.5 g $NiCO_3$, 1.2 g $MnCO_3$, and 1.2 g $CoCO_3$ dispersed in 10 mL of deionized water in a beaker. The mixture is pumped into a separate beaker containing 40.4 g of $H_2C_2O_4 \cdot 2H_2O$ in 80 mL of deionized water to form the core precursor. Subsequently, a mixture comprising 1.0 g $Li_2CO_3$, 1.8 g $NiCO_3$, 0.6 g $MnCO_3$, and 0.6 g $CoCO_3$ dispersed in 5 mL of deionized water was pumped into the reaction mixture to form a first shell of precursor around the core. An additional mixture comprising 2.9 g $Li_2CO_3$, 3.0 g $NiCO_3$, 2.9 g $MnCO_3$, and 3.0 g $CoCO_3$ was dispersed in 10 mL of deionized water and pumped into the reaction mixture to form a third ratio in a second shell around the first shell. The addition rates were kept constant at 15 mL per hour for each solution. The reaction mixture was then stirred for 1 h and spray dried to obtain the precursor with the overall formula $LiNi_{0.6}Mn_{0.2}Co_{0.2}(C_2O_4)_{1.5}$. The precursor was then heated at 110° C. for 1 h and calcined at 800° C. for 7.5 h under air in a box furnace to obtain gradient NMC 622 with a nickel rich core NMC 811 core having a formula of $LiNi_{0.8}Mn_{0.1}Co_{0.1}O_2$, a first shell of NMC 622 having a formula of $LiNi_{0.6}Mn_{0.2}Co_{0.2}O_2$ representing the bulk of the volume, and an outer NMC 111 shell having the form $LiNi_{0.333}Mn_{0.333}Co_{0.333}O_2$. The invention thereby allows the surface characteristics to be different from the bulk. The XRD pattern for the step-wise NMC is provided in FIG. 53 and the SEM is provided in FIG. 54. The discharge capacity as a function of cycles is provided in FIG. 55. A comparative illustration of discharge capacity for NMC 622 (Example 15), NMC 811 (Example 16), NMC 811 fired twice (Example 16), NCA (Example 17) and NMC gradient (Example 18) is provided in FIG. 56 and normalized in FIG. 57.

Example 22: Preparation of Coated Spinel

A coated spinel was formed having a niobiate coating on the surface. The precursor was prepared by adding 16.39 g of $H_2C_2O_4 \cdot 2H_2O$ to 40 mL of water in a beaker. In a second beaker, $Li_2CO_3$ (1.92 g), $NiCO_3$ (2.97 g), $MnCO_3$ (8.62 g) were mixed in 24 mL of deionized water. The carbonate mixture slurry was slowly added to the oxalic acid slurry beaker (3 mL every 20 minutes) and mixed. The slurry was mixed at room temperature in ambient atmosphere overnight. The raw materials for $LiNbO_3$, 0.816 g of $Nb(HC_2O_4)_5 \cdot xH_2O$ (x=6.35 estimated from TGA) and 0.046 g of $Li_2CO_3$, were added to the slurry the next day. After 3 hours of mixing, the slurry was dried by a spray dryer. The precursor was fired for 5 h, followed by an annealing step at 750° C. for 24 h.

Figure 58:
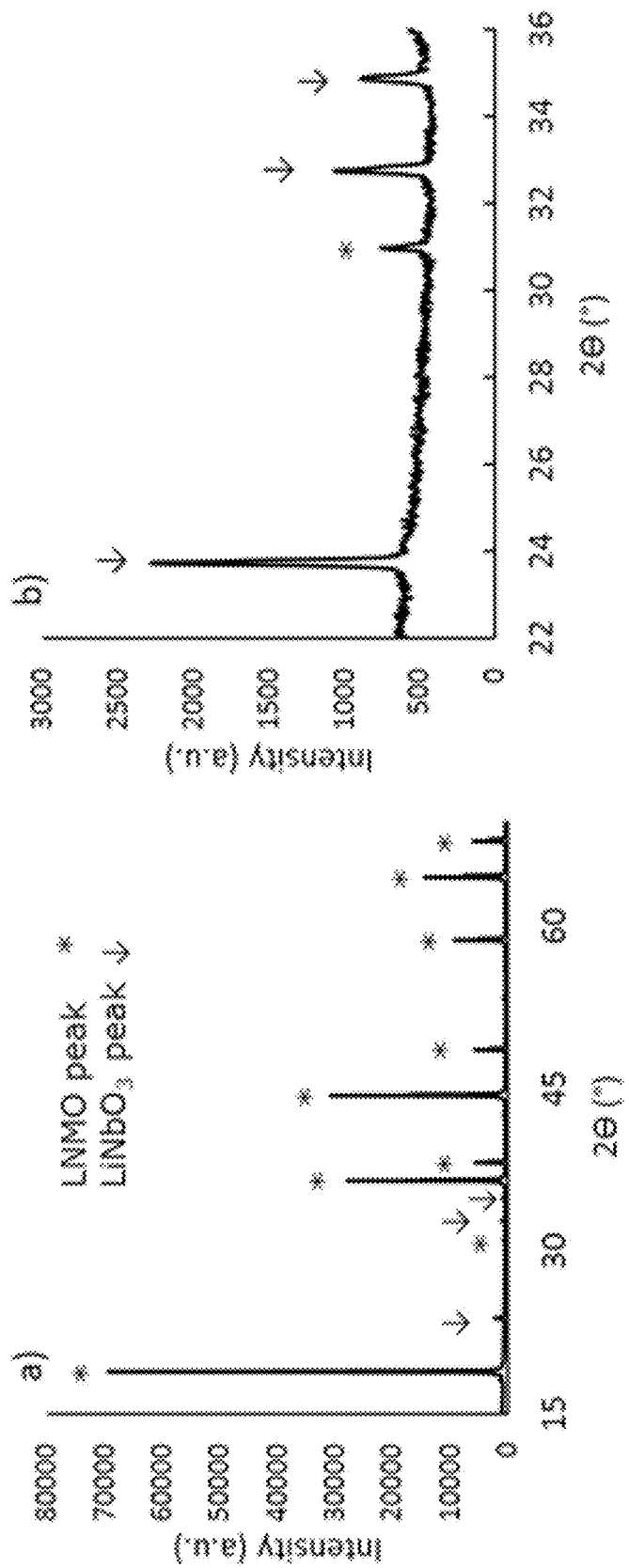
FIG. 58 is an XRD pattern.

The XRD pattern of the fired material, FIG. 58, shows the peaks of spinel LNMO as the main phase and the peaks of $LiNbO_3$ as the second phase. In FIG. 58 the XRD pattern of LNMO with a lithium niobite coated is illustrated wherein the second panel shows the lithium niobite peaks expanded.

Figure 59:
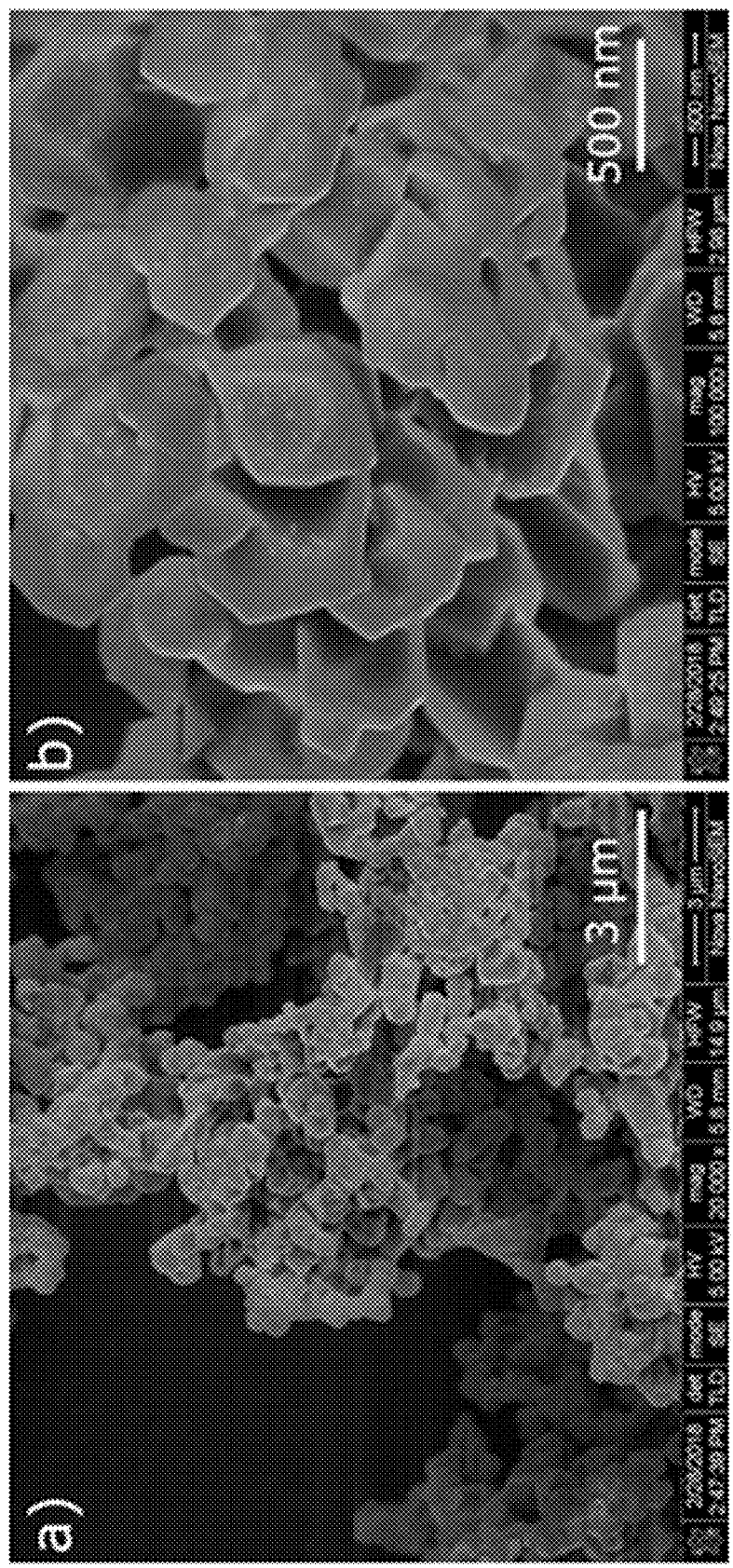
FIG. 59 is an SEM micrograph.

The SEM images of the material in FIG. 59 show particle sizes in the range of 500 nm-2 μm which is smaller than the other spinel materials possibly due to its lower synthesis temperature. The images show some speckles on the surface of the particles. These speckles are probably not related to $LiNbO_3$ because a pristine spinel sample analyzed the same day by SEM showed a similar feature. SEM images do not show any clear evidence of separate $LiNbO_3$ particles, suggesting a coating on the spinel particles.

Scanning Transmission Electron Microscope (STEM) analyses were carried out on individual secondary agglomerates sampled by drop-casting a propyl alcohol (PrOH) suspension of the fired material onto a 200 mesh Cu transmission electron microscope (TEM) grid with a carbon-impregnated formvar support. High-Angle Annular Dark Field (HAADF) image and Energy Dispersive Xray (EDX) map of Mn and Nb of one agglomerate showed separate primary crystallites of $LiNbO_3$ which were clearly visible. While crystallinity of the separated $LiNbO_3$ crystals was confirmed via High-Resolution TEM (HRTEM) the large size of the particles made it difficult to confirm the presence, crystallinity and thickness of any $LiNbO_3$ coating present.

In addition, quantification was done at high magnification for regions in two separate agglomerates. EDX maps showed a distinct outline of Nb around the primary particles along with an even, though lower intensity, distribution of Nb over the bulk of the particle. This is indicative of a very thin, though even $LiNbO_3$ coating. It is not possible to determine whether the Nb distribution in the sample bulk corresponds solely to surface Nb, or a doping of Nb throughout the bulk, however the peak concentration on the borders suggests the majority of the Nb is present on the surface and the metal in the surface is at least 95 wt % niobium. Overall, 5 regions over two separate agglomerates were sampled, yielding similar results.

Figure 60:
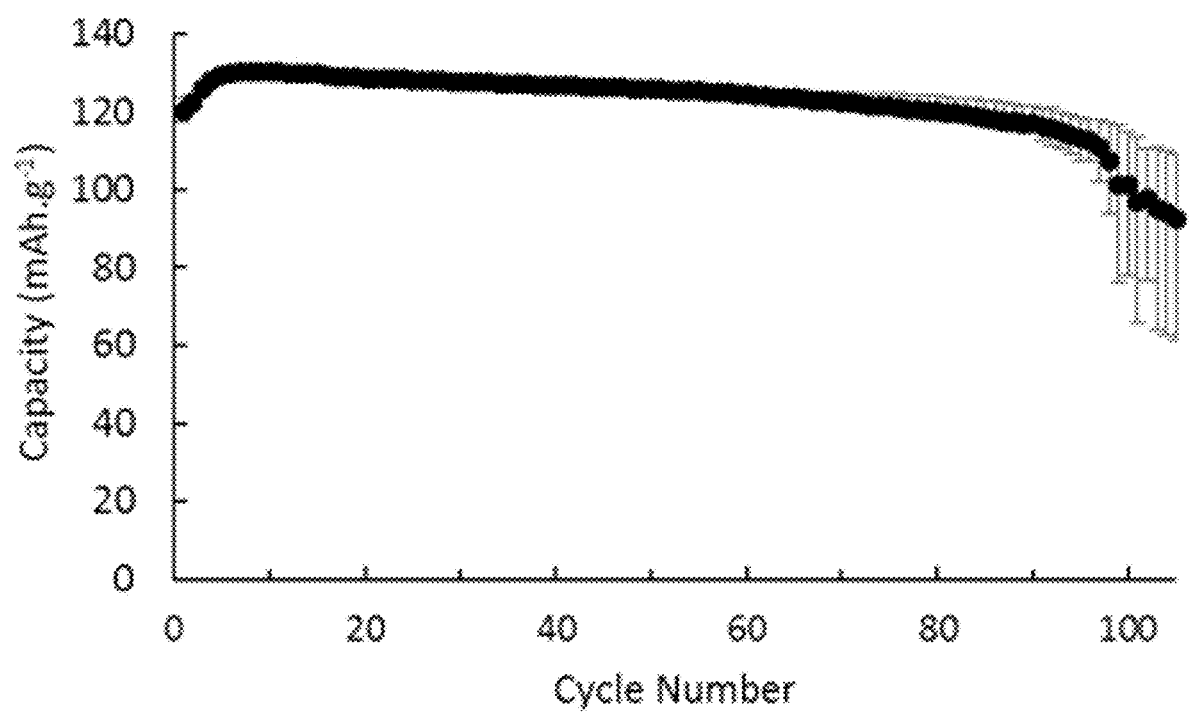
FIG. 60 is an graphical representation.

The $LiNbO_3$-coated LNMO material was evaluated as the cathode material in three half-cells, with Li as the anode and 1 M $LiPF_6$ in 7:3 (vol %) ethylene carbonate (EC):diethylene carbonate (DEC) was used as the electrolyte. The cells were cycled within the voltage range of 3.5-4.9 V at 0.1 C for 1 cycle and at 1 C for the next ones at 55° C. shows the average specific capacity over 100 cycles. This material shows improved capacity retention at 55° C., FIG. 60, over the baseline material, which usually fails when cycled above 50 cycles at the 1 C rate. This improved performance is probably due to the protection of LNMO particles from reaction with electrolyte at elevated temperature due to the coating layer.

Comparative Example C1

A precursor for NMC 811 having formula $LiNi_{0.8}Mn_{0.1}Co_{0.1}O_2$ was prepared from 39 g $Li_2CO_3$, 95 g $NiCO_3$, 12 g $MnCO_3$, and 12 g $CoCO_3$ dispersed in 200 mL of deionized water in a beaker. The mixture was pumped into a separate beaker containing 201 g of $H_2C_2O_4 \cdot 2H_2O$ in 400 mL of deionized water at a rate of 0.38 moles of carbonates per hour. The reaction mixture was then stirred for 1 h. The final mixture having a solids content of approximately 20% was spray dried to obtain the precursor with the formula $LiNi_{0.8}Mn_{0.1}Co_{0.1}(C_2O_4)_{1.5}$. The precursor was heated at 600° C. for 5 h under air in a box furnace, heated at 125° C. for 1 h under oxygen flow, and calcined at 830° C. for 15 h under oxygen flow in a tube furnace to obtain NMC 811. The NMC 811 was heated at 125° C. for 1 h and calcined at 830°

C. for 15 h under oxygen flow in a tube furnace to form refired NMC 811 referred to herein as "Pristine NMC811".

Inventive Example C1

A precursor to NMC 811 having formula $LiNi_{0.8}Mn_{0.1}Co_{0.1}O_2$ was prepared by adding 0.267 moles of nickel(II) carbonate hydrate (Alfa Aesar, 99.5% metal basis), 0.1 mole of cobalt(II) carbonate (Alfa Aesar, 99% metal basis) and 0.1 mole of manganese(II) carbonate (Sigma Aldrich ≥99.9% metal basis) and 0.525 mole of lithium carbonate (Alfa Aesar, 99%) to 200 mL deionized water with stirring for 30 minutes to prepare a carbonate slurry. In a separate beaker, 1.617 moles of oxalic acid dihydrate was added to 400 mL of deionized water with stirring for 30 minutes. The carbonate slurry was added dropwise to the oxalic acid dihydrate mixture over 5 hours an stirred for an additional 18 hours to prepare the oxalate slurry.

The coating solution was prepared by adding 0.005 moles of niobium(V) oxalate hydrate (Alfa Aeser) with stirring over-night. The coating solution was added to the oxalate slurry followed by stirring for an additional 2 hours prior to spray drying. The resulting powder was fired at 830° C. for 15 hours in a tube furnace under oxygen flow. The powder was ground to a sieve size of ≤45 μm and vacuum sealed in an aluminum bag. The resulting powder is referred to herein as 1-pot coated NMC811.

Figure 61:
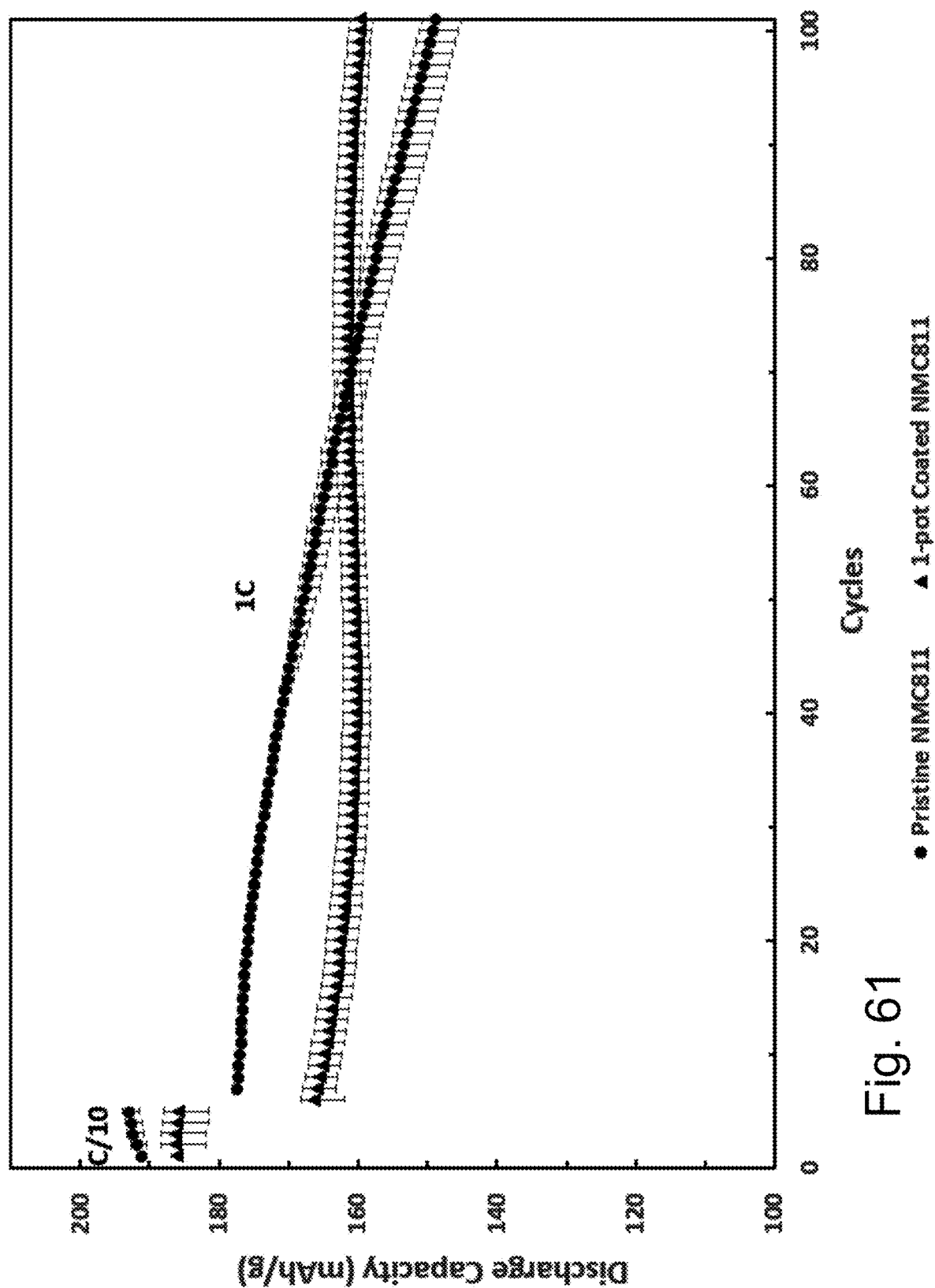
FIG. 61 is a graphical representation.
Figure 62:
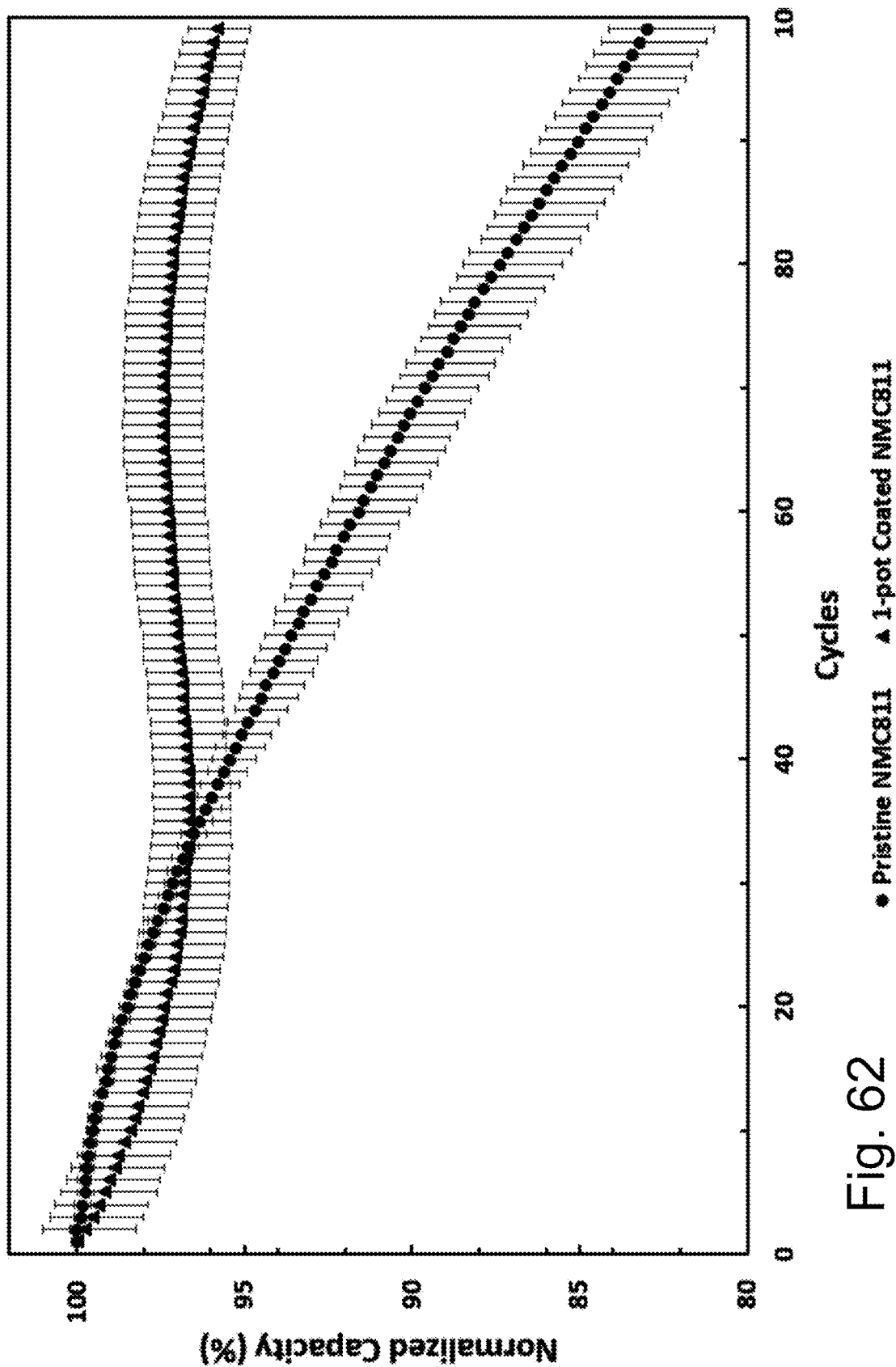
FIG. 62 is a graphical representation.
Figure 63:
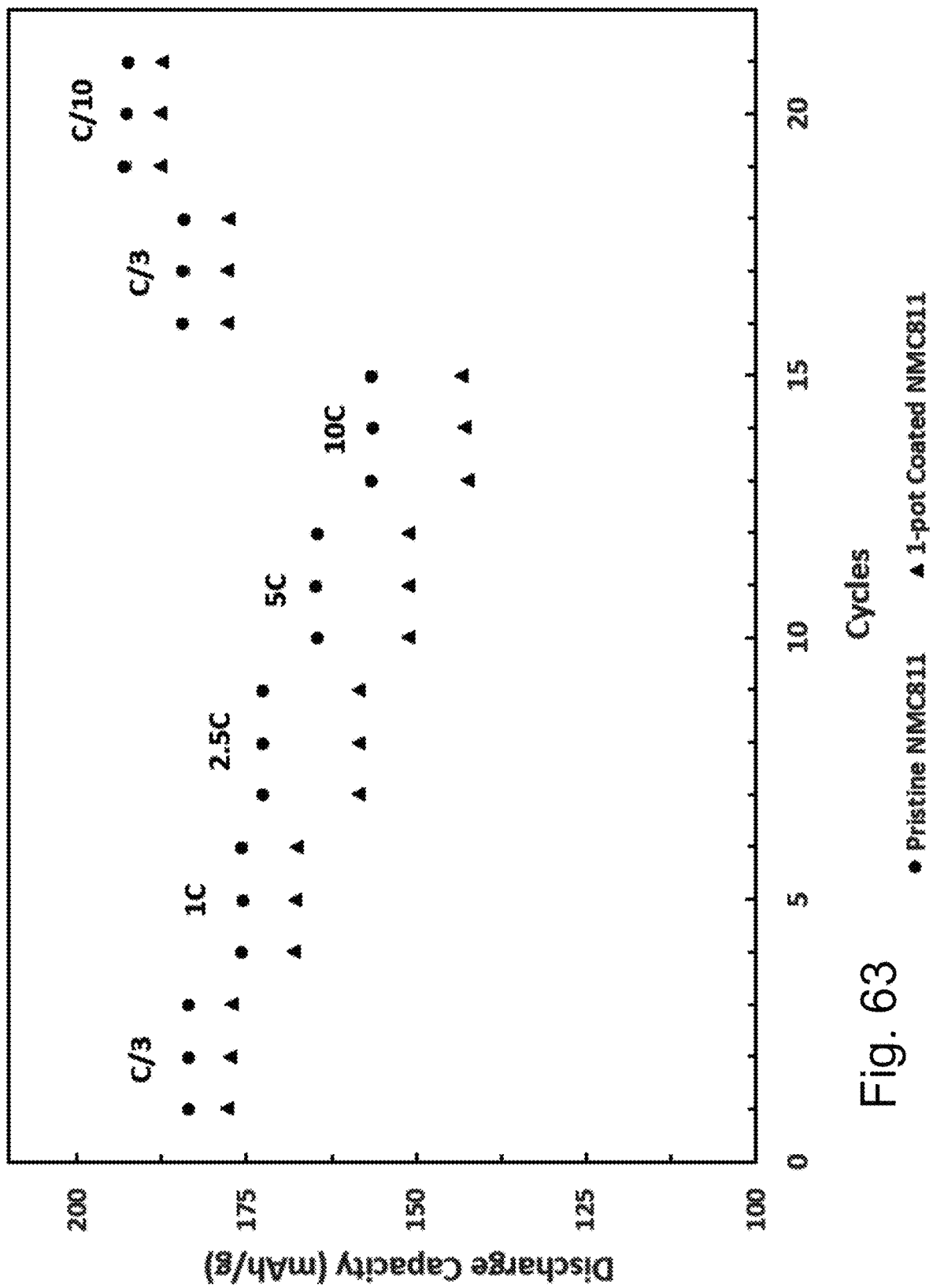
FIG. 63 is a graphical representation.

Inventive Example C1 and Comparative Example C1 would be characterized for electrical properties. Inventive Example C1 would show an improved discharge capacity after repeated cycling as illustrated graphically in representative FIG. 61 with the expected normalized discharge capacity illustrated graphically in representative FIG. 62. Expected improvements in the rate capability of the inventive example are illustrated in representative FIG. 63.

Comparative Example C2

A precursor to NMC 622 having formula $LiNi_{0.6}Mn_{0.2}Co_{0.2}O_2$ was prepared from 39 g $Li_2CO_3$, 71 g $NiCO_3$, 23 g $MnCO_3$, and 24 g $CoCO_3$ dispersed in 200 mL of deionized water in a beaker. The mixture of carbonates was pumped into a separate beaker containing 201 g of $H_2C_2O_4 \cdot 2H_2O$ in 400 mL of deionized water at a rate of 0.38 moles of carbonates per hour. The reaction mixture was then stirred for 1 h. The final mixture, having a solids content of approximately 20%, was spray dried to obtain the precursor with the formula $LiNi_{0.6}Mn_{0.2}Co_{0.2}(C_2O_4)_{1.5}$. The precursor was heated at 110° C. for 1 h and calcined at 800° C. for 7.5 h under air in a box furnace to obtain NMC 622.

Inventive Example C2

A precursor to NMC 622 having formula $LiNi_{0.6}Mn_{0.2}Co_{0.2}O_2$ would be prepared from 39 g $Li_2CO_3$, 71 g $NiCO_3$, 23 g $MnCO_3$, and 24 g $CoCO_3$ dispersed in 200 mL of deionized water in a beaker. The mixture of carbonates would be pumped into a separate beaker containing 201 g of $H_2C_2O_4 \cdot 2H_2O$ in 400 mL of deionized water at a rate of 0.38 moles of carbonates per hour. The reaction mixture would then stirred for 1 hour.

The coating would be prepared by adding 3.2 g Niobium (V) oxalate hydrate to the reaction mixture and leaving stirring for an additional 2 hours. The final mixture, having a solids content of approximately 20%, would be spray dried to obtain the precursor. The precursor would be heated at 110° C. for 1 h and calcined at 800° C. for 7.5 h under air in a box furnace to obtain a one-pot coated NMC 622.

Comparative Example C3

A precursor for NCA with formula $LiNi_{0.8}Co_{0.15}Al_{0.05}O_2$ was prepared from 39 g $Li_2CO_3$, 95 g $NiCO_3$, 8 g $Al(OH)(CH_3COO)_2$, and 18 g $CoCO_3$ was dispersed in 200 ml deionized water in a beaker. This mixture was pumped into a separate beaker containing 201 g oxalic acid hydrate in 400 ml deionized water at a rate of 0.38 moles of carbonates an hour. The reaction mixture was stirred for one hour. The precursor was heated at 125° C. for 1 h and then calcined at 830° C. for 15 h under oxygen flow in a tube furnace to obtain NCA.

Inventive Example C3

A precursor for NCA with formula $LiNi_{0.8}Co_{0.15}Al_{0.05}O_2$ was prepared from 39 g $Li_2CO_3$, 95 g $NiCO_3$, 8 g $Al(OH)(CH_3COO)_2$, and 18 g $CoCO_3$ dispersed in 200 ml deionized water in a beaker. This mixture was pumped into a separate beaker containing 201 g oxalic acid hydrate in 400 ml deionized water at a rate of 0.38 moles of carbonates an hour and then stirred for 1 hour.

The coating would be prepared by adding 3.2 g Niobium (V) oxalate hydrate to the reaction mixture and leaving stirring for an additional 2 hours. The final mixture, having a solids content of approximately 20%, would be spray dried to obtain the precursor. The precursor would be heated at 125° C. for 1 h and then calcined at 830° C. for 15 h under oxygen flow in a tube furnace to obtain one-pot coated NCA.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method of forming a battery comprising:
   forming a coated lithium ion cathode material comprising:
   in one pot;
   forming a first solution comprising a digestible feedstock of a first metal suitable for formation of a cathode oxide precursor and a multi-carboxylic acid;
   digesting said digestible feedstock to form a first metal salt in solution wherein said first metal salt precipitates as a salt of deprotonated said multi-carboxylic acid thereby forming an oxide precursor wherein said first metal salt comprises lithium and at least one of Mn, Ni, Co, Al or Fe;
   adding a coating metal precursor salt after said digestion; and
   heating said oxide precursor to form said lithium ion cathode material with an oxide of said coating metal precursor salt as a coating on said lithium ion cathode material; and
   providing an anode and an electrolyte;
   forming said anode and said cathode into a battery with said anode and said cathode separated by said electrolyte.

2. The method of forming a battery of claim 1 wherein said electrolyte has no more than 1 wt % of additional salts and additives.

3. The method of forming a battery of claim 2 wherein said electrolyte has no more than 0.5 wt % of said additional salts and additives.

4. The method of forming a battery of claim 3 wherein said electrolyte has no said additional salts and additives.

5. The method of forming a battery of claim 2 wherein said additional salts and additives are selected from the group consisting of lithium bis (trifluoromethanesulfonyl) imide; lithium hexafluorophosphate; lithium perchlorate; lithium tetrafluoroborate; lithium trifluoromethane sulfonate; tetraethyl-ammonium tetrafluoroborate; biphenyl; propane sultone; vinylene carbonate; methyl ethylene carbonate; lithium bis(oxalate) borate; lithium difluoro oxalate borate; lithium bis(fluorosulfonyl) imide, fluoroethylene carbonate; difluoroethylene carbonate; succinic anhydride and ethylene sulfate.

6. The method of forming a battery of claim 1 wherein said electrolyte comprises a solvent wherein said solvent is an alkyl carbonate.

7. The method of forming a battery of claim 1 wherein said electrolyte comprise a solvent selected from the group consisting of ethylene carbonate; dimethyl carbonate; diethyl carbonate; ethyl methyl carbonate 1,2-dimethoxyethane; 1,3-dioxolane; acetonitrile; ethyl acetate; fluoroethylene carbonate; propylene carbonate and tetrahydrofuran.

8. The method of forming a battery of claim 7 wherein said solvent is selected from ethylene carbonate; dimethyl carbonate; diethyl carbonate; ethyl methyl carbonate and combinations thereof.

9. The method of forming a battery of claim 8 wherein said solvent comprises ethylene carbonate.

10. The method of forming a battery of claim 9 wherein said solvent comprises ethylene carbonate and at least one of dimethyl carbonate, diethyl carbonate or ethyl methyl carbonate as a co-solvent.

11. The method of forming a battery of claim 9 wherein said solvent comprises at least 20 wt % ethylene carbonate to no more than 80 wt % ethylene carbonate with the balance being dimethyl carbonate, diethyl carbonate, ethyl methyl carbonate or combinations thereof.

12. The method of forming a battery of claim 11 wherein said solvent comprises at least 30 wt % ethylene carbonate to no more than 70 wt % ethylene carbonate with the balance being dimethyl carbonate, diethyl carbonate, ethyl methyl carbonate or combinations thereof.

13. The method of forming a battery of claim 1 wherein said electrolyte comprises $LiPF_6$.

14. The method of forming a battery of claim 1 wherein said $LiPF_6$ is present in a solvent at a concentration of at least 0.1 M to no more than 10 M.

15. The method of forming a battery of claim 14 wherein said $LiPF_6$ said concentration is at least 0.8 to no more than 1.2 M.

16. The method of forming a battery of claim 1 wherein said coating metal precursor salt comprises niobium.

17. The method of forming a battery of claim 16 wherein said oxide of said coating metal precursor salt is lithium niobate.

18. The method of forming a battery of claim 1 wherein said coating metal precursor salt comprises a multi-carbonate salt.

19. The method of forming a battery of claim 18 wherein said multi-carbonate is an oxalate.

20. The method of forming a battery of claim 1 wherein said coating comprises at least 95 wt % said coating metal.

21. The method of forming a battery of claim 1 wherein said coating comprises no more than 5 wt % said lithium ion cathode material.

22. The method of forming a battery of claim 1 wherein said digestible feedstock is a carbonate, hydroxide or acetate salt of said first metal wherein said first metal is selected from the group consisting of Li, Mn and Ni.

23. The method of forming a battery of claim 22 wherein said digestible feedstock comprises at least one of lithium carbonate, manganese carbonate and nickel carbonate.

24. The method of forming a battery of claim 23 wherein said digestible feedstock comprises lithium carbonate, manganese carbonate and nickel carbonate.

25. The method of forming a battery of claim 21 wherein said digestible feedstock further comprises at least one of cobalt carbonate or aluminum hydroxide.

26. The method of forming a battery of claim 1 wherein said multi-carboxylic acid is selected from the group consisting of oxalic acid, malonic acid, succinic acid, glutaric acid, adipic acid, citric acid, lactic acid, oxaloacetic acid, fumaric acid and maleic acid.

27. The method of forming a battery of claim 26 wherein said multi-carboxylic acid is oxalic acid.

28. The method of forming a battery of claim 1 wherein said cathode material is defined by the Formula I:

$$LiNi_xMn_yCo_zE_eO_4 \quad \text{Formula I}$$

wherein E is a dopant;
x+y+z+e=2; and
$0 \le e \le 0.2$.

29. The method of forming a battery of claim 28 wherein said Formula I is in a spinel crystalline form.

30. The method of forming a battery of claim 28 wherein neither x nor y are zero.

31. The method of forming a battery of claim 30 wherein said lithium ion cathode material is $LiNi_{0.5}Mn_{1.5}O_4$.

32. The method of forming a battery of claim 28 wherein said cathode material is defined by the formula $LiNi_xMn_yO_4$ wherein $0.5 \le x \le 0.6$ and $1.4 \le y \le 1.5$.

33. The method of forming a battery of claim 32 wherein said $0.5 \le x \le 0.55$ and $1.45 \le y \le 1.5$.

34. The method of forming a battery of claim 28 wherein said cathode material has a molar ratio of Mn to Ni of no more than 3.

35. The method of forming a battery of claim 34 wherein said cathode material has a molar ratio of Mn to Ni of at least 2.33 to less than 3.

36. The method of forming a battery of claim 35 wherein said cathode material has a molar ratio of Mn to Ni of at least 2.64 to less than 3.

37. The method of forming a battery of claim 28 wherein said dopant is selected from the group consisting of Al, Gd, Ti, Zr, Mg, Ca, Sr, Ba, Mg, Cr Fe, Cu, Zn, V, Bi, Nb and B.

38. The method of forming a battery of claim 37 wherein said dopant is selected from the group consisting of Al and Gd.

39. The method of forming a battery of claim 1 wherein said cathode material is defined by the Formula II:

$$LiNi_aMn_bX_cG_dO_2 \quad \text{Formula II}$$

wherein G is a dopant;
X is Co or Al;
wherein a+b+c+d=1; and
$0 \le d \le 0.1$.

40. The method of forming a battery of claim 39 wherein $0.5 \le a \le 0.9$.

41. The method of forming a battery of claim 40 wherein $0.58 \le a \le 0.62$ or $0.78 \le a \le 0.82$.

42. The method of forming a battery of claim 39 wherein a=b=c.

43. The method of forming a battery of claim 1 wherein said heating is in air.

44. The method of forming a battery of claim 1 wherein said first cathode oxide precursor forms a core.

45. The method of forming a battery of claim 44 wherein prior to said heating:
forming a second digestible feedstock of a second metal suitable for formation of additional cathode oxide precursor and a second multi-carboxylic acid; and
digesting said second digestible feedstock to form a second metal salt wherein said second metal salt precipitates as a shell on said core wherein said second metal is selected from the group consisting of Ni, Mn, Co, Al, Gd, Ti, Zr, Mg, Ca, Sr, Ba, Mg, Cr Fe, Cu, Zn, V, Bi, Nb and B.

46. The method of forming a battery of claim 45 wherein said second metal represents no more than 10 mol % of total moles of said first metal and said second metal.

47. The method of forming a battery of claim 46 wherein said second metal represents no more than 5 mol % of said total moles.

48. The method of forming a battery of claim 47 wherein said second metal represents no more than 1 mol % of said total moles.

49. The method of forming a battery of claim 45 wherein said second feedstock comprises Al.

50. The method of forming a battery of claim 45 wherein said first digestible feedstock comprises Ni and Mn in a first molar ratio and said second digestible feedstock comprise Ni and Mn in a second molar ratio.

51. The method of forming a battery of claim 50 wherein said first molar ratio and said second molar ratio are different.

52. The method of forming a battery of claim 51 wherein said first molar ratio has a higher molar ratio of Ni to Mn than said second molar ratio.

53. A method of forming a battery comprising:
forming a coated lithium ion cathode material comprising:
in one pot;
reacting lithium carbonate, manganese carbonate and nickel carbonate with oxalic acid, liberating $CO_{2(g)}$ and $H_2O_{(l)}$ to forming a precipitate comprising lithium oxalate, manganese oxalate and nickel oxalate to form an oxide precursor;
adding a coating metal precursor salt to said oxide precursor; and
heating said oxide precursor to form said coated lithium ion cathode material; and
providing an anode and an electrolyte;
combining said anode and said cathode into a package with said anode and said cathode separated by said electrolyte.

54. The method of forming a battery of claim 53 wherein said electrolyte has no more than 1 wt % of additional salts and additives.

55. The method of forming a battery of claim 54 wherein said electrolyte has no more than 0.5 wt % of said additional salts and additives.

56. The method of forming a battery of claim 55 wherein said electrolyte has no said additional salts and additives.

57. The method of forming a battery of claim 56 wherein said additional salts and additives are selected from the group consisting of lithium bis (trifluoromethanesulfonyl) imide; lithium hexafluorophosphate; lithium perchlorate; lithium tetrafluoroborate; lithium trifluoromethane sulfonate; tetraethyl-ammonium tetrafluoroborate; biphenyl; propane sultone; vinylene carbonate; methyl ethylene carbonate; lithium bis(oxalate) borate; lithium difluoro oxalate borate; lithium bis(fluorosulfonyl) imide, fluoroethylene carbonate; difluoroethylene carbonate; succinic anhydride and ethylene sulfate.

58. The method of forming a battery of claim 53 wherein said electrolyte comprises a solvent wherein said solvent is an alkyl carbonate.

59. The method of forming a battery of claim 53 wherein said electrolyte comprise a solvent selected from the group consisting of ethylene carbonate; dimethyl carbonate; diethyl carbonate; ethyl methyl carbonate 1,2-dimethoxyethane; 1,3-dioxolane; acetonitrile; ethyl acetate; fluoroethylene carbonate; propylene carbonate and tetrahydrofuran.

60. The method of forming a battery of claim 59 wherein said solvent is selected from ethylene carbonate; dimethyl carbonate; diethyl carbonate; ethyl methyl carbonate and combinations thereof.

61. The method of forming a battery of claim 60 wherein said solvent comprises ethylene carbonate.

62. The method of forming a battery of claim 61 wherein said solvent comprises ethylene carbonate and at least one of dimethyl carbonate, diethyl carbonate or ethyl methyl carbonate as a co-solvent.

63. The method of forming a battery of claim 61 wherein said solvent comprises at least 20 wt % ethylene carbonate to no more than 80 wt % ethylene carbonate with the balance being dimethyl carbonate, diethyl carbonate, ethyl methyl carbonate or combinations thereof.

64. The method of forming a battery of claim 61 wherein said solvent comprises at least 30 wt % ethylene carbonate to no more than 70 wt % ethylene carbonate with the balance being dimethyl carbonate, diethyl carbonate, ethyl methyl carbonate or combinations thereof.

65. The method of forming a battery of claim 53 wherein said electrolyte comprises $LiPF_6$.

66. The method of forming a battery of claim 53 wherein said $LiPF_6$ is present in a solvent at a concentration of at least 0.1 M to no more than 10 M.

67. The method of forming a battery of claim 66 wherein said $LiPF_6$ is present in a solvent at a concentration of at least 0.8 to no more than 1.2 M.

68. The method of forming a battery of claim 53 wherein said coating metal is niobium.

69. The method of forming a battery of claim 68 wherein said oxide of said coating metal is lithium niobate.

70. The method of forming a battery of claim 53 wherein said coating metal precursor salt comprises a multi-carbonate salt.

71. The method of forming a battery of claim 70 wherein said multi-carbonate is an oxalate.

72. The method of forming a battery of claim 53 wherein said coating comprises at least 95 wt % said coating metal.

73. The method of forming a battery of claim 53 wherein said coating comprises no more than 5 wt % said lithium ion cathode material.

74. The method of forming a battery of claim 53 wherein said manganese carbonate and said nickel carbonate are in a first molar ratio and said oxide precursor forms a core.

75. The method of forming a battery of claim 74 further comprising:
forming a second slurry comprising lithium carbonate, manganese carbonate and nickel carbonate in a second ratio; and
precipitating a shell of manganese oxalate and nickel oxalate on said core wherein said manganese oxalate and said nickel oxalate in said shell are in said second ratio.

76. The method of forming a battery of claim 75 wherein said second solution further comprises a dopant.

77. The method of forming a battery of claim 76 wherein said dopant is selected from Al, Gd, Ti, Zr, Mg, Ca, Sr, Ba, Mg, Cr, Fe, Zn, Cu, V, Bi, Nb and B.

78. The method of forming a battery of claim 77 wherein said second slurry comprises Al.

79. The method of forming a battery of claim 75 wherein a sum manganese oxalate and nickel oxalate in said shell represent less than 10 mole % of a sum of all manganese oxalate metal and nickel oxalate in said oxide precursor.

80. The method of forming a battery of claim 53 wherein said cathode material is defined by the Formula I:

$$LiNi_xMn_yCo_zE_eO_4 \qquad \text{Formula I}$$

wherein E is a dopant;
x+y+z+e=2; and
0≤e≤0.1.

81. The method of forming a battery of claim 80 wherein said Formula I is in a spinel crystalline form.

82. The method of forming a battery of claim 80 wherein neither x nor y are zero.

83. The method of forming a battery of claim 80 wherein said cathode material is $LiNi_{0.5}Mn_{1.5}O_4$.

84. The method of forming a battery of claim 80 wherein said cathode material is defined by the formula $LiNi_xMn_yO_4$ wherein 0.5≤x≤0.6 and 1.4≤y≤1.5.

85. The method of forming a battery of claim 84 wherein said 0.5≤x≤0.55 and 1.45≤y≤1.5.

86. The method of forming a battery of claim 80 wherein said cathode material has a molar ratio of Mn to Ni of no more than 3.

87. The method of forming a battery of claim 86 wherein said cathode material has a molar ratio of Mn to Ni of at least 2.33 to less than 3.

88. The method of forming a battery of claim 87 wherein said cathode material has a molar ratio of Mn to Ni of at least 2.64 to less than 3.

89. The method of forming a battery of claim 80 wherein said dopant is selected from the group consisting of Al, Gd, Ti, Zr, Mg, Ca, Sr, Ba, Mg, Cr, Fe, Zn, Cu, V, Bi, Nb and B.

90. The method of forming a battery of claim 89 wherein said dopant is selected from the group consisting of Al and Gd.

91. The method of forming a battery of claim 53 wherein said cathode material is defined by the Formula II:

$$LiNi_aMn_bX_cG_dO_2 \qquad \text{Formula II}$$

wherein G is a dopant;
X is Co or Al;
wherein a+b+c+d=1; and
0≤d≤0.1.

92. The method of forming a battery of claim 91 wherein 0.5≤a≤0.9.

93. The method of forming a battery of claim 92 wherein 0.58≤a≤0.62 or 0.78≤a≤0.82.

94. The method of forming a battery of claim 91 wherein a=b=c.

95. The method of forming a battery of claim 53 wherein said heating is in air, oxygen or mixtures thereof.

* * * * *